(12) United States Patent
Garty

(10) Patent No.: US 12,143,268 B2
(45) Date of Patent: *Nov. 12, 2024

(54) AUTOMATIC DISCOVERY OF CLOUD-BASED INFRASTRUCTURE AND RESOURCES

(71) Applicant: ServiceNow, Inc., Santa Clara, CA (US)

(72) Inventor: Asaf Garty, Petah Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,735

(22) Filed: Jan. 11, 2023

(65) Prior Publication Data

US 2023/0171155 A1 Jun. 1, 2023

Related U.S. Application Data

(63) Continuation of application No. 17/020,340, filed on Sep. 14, 2020, now Pat. No. 11,582,106.

(Continued)

(51) Int. Cl.
*G06F 15/177* (2006.01)
*H04L 12/24* (2006.01)
(Continued)

(52) U.S. Cl.
CPC ...... *H04L 41/0853* (2013.01); *H04L 41/0859* (2013.01); *H04L 47/70* (2013.01); *H04L 67/133* (2022.05)

(58) Field of Classification Search
CPC . H04L 41/0853; H04L 41/0859; H04L 47/70; H04L 67/40
See application file for complete search history.

(56) References Cited

U.S. PATENT DOCUMENTS

| 4,941,084 A | 7/1990 | Terada et al. |
| 5,185,860 A | 2/1993 | Wu |

(Continued)

FOREIGN PATENT DOCUMENTS

| EP | 0433979 | 6/1991 |
| EP | 1607824 | 12/2005 |

(Continued)

OTHER PUBLICATIONS

Office Action, U.S. Appl. No. 18/096,147, mailed Oct. 4, 2023.

*Primary Examiner* — Thu V Nguyen
*Assistant Examiner* — Golam Mahmud
(74) *Attorney, Agent, or Firm* — McDonnell Boehnen Hulbert & Berghoff LLP

(57) ABSTRACT

An embodiment may involve receiving an account identifier, wherein the account identifier is associated with a service account; transmitting a first API query to a remote computing system based on the account identifier; receiving first information associated with a first resource based on the first API query, wherein the first resource corresponds to a cloud orchestrator associated with a first service provided by the remote computing system; transmitting a first set of queries to the remote computing system based on the first information; receiving second information about a cluster of resources, associated with the first resource, based on the first set of queries, wherein a set of services related to the first service are deployed in one or more resources of the cluster of resources; generating a relationship map between the first resource and the cluster of resources based on the second information; and outputting the relationship map.

19 Claims, 24 Drawing Sheets

Related U.S. Application Data

(60) Provisional application No. 63/055,192, filed on Jul. 22, 2020.

(51) Int. Cl.
*H04L 12/743* (2013.01)
*H04L 12/803* (2013.01)
*H04L 12/819* (2013.01)
*H04L 41/0853* (2022.01)
*H04L 41/0859* (2022.01)
*H04L 47/70* (2022.01)
*H04L 67/133* (2022.01)

(56) References Cited

U.S. PATENT DOCUMENTS

| | | |
|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,539,197 B1 * | 9/2013 | Marshall .............. G06F 3/0613 711/112 |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,397,946 B1 * | 7/2016 | Yadav ................ H04L 45/7453 |
| 10,044,566 B1 * | 8/2018 | Grisco ................ G06F 9/45558 |
| 10,079,730 B2 * | 9/2018 | Subramanian ...... H04L 41/0806 |
| 10,178,045 B2 * | 1/2019 | Kumar ................. H04L 47/826 |
| 10,621,077 B2 * | 4/2020 | Wiener ..................... G06F 8/71 |
| 10,673,963 B1 | 6/2020 | Feiguine et al. |
| 10,719,503 B1 * | 7/2020 | Bar Oz .................. G06F 16/219 |
| 10,749,943 B1 | 8/2020 | Feiguine et al. |
| 10,771,344 B2 | 9/2020 | Bitterfeld et al. |
| 10,802,672 B2 * | 10/2020 | Kattamanchi ....... G06F 11/3409 |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 2002/0116340 A1 | 8/2002 | Hellberg et al. |
| 2002/0133584 A1 | 9/2002 | Greuel et al. |
| 2002/0138786 A1 | 9/2002 | Chefalas |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2006/0294104 A1 * | 12/2006 | Morrison ................ G06F 16/21 707/999.009 |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0177692 A1 * | 7/2009 | Chagoly ............. G06F 11/3495 |
| 2009/0228984 A1 | 9/2009 | Sterin |
| 2010/0110932 A1 | 5/2010 | Doran et al. |
| 2010/0235831 A1 | 9/2010 | Dittmer |
| 2011/0302290 A1 | 12/2011 | Westerfeld |
| 2012/0066681 A1 | 3/2012 | Levy |
| 2013/0086249 A1 * | 4/2013 | White .................... H04L 67/51 709/224 |

(56) References Cited

U.S. PATENT DOCUMENTS

| | | |
|---|---|---|
| 2015/0281225 A1* | 10/2015 | Schoen .................. H04L 63/08 |
| | | 726/9 |
| 2016/0254957 A1 | 9/2016 | Maes |
| 2017/0006135 A1 | 1/2017 | Siebel |
| 2017/0034023 A1 | 2/2017 | Nickolov |
| 2017/0093640 A1 | 3/2017 | Subramanian |
| 2017/0308601 A1* | 10/2017 | Massarenti ......... H04L 41/0816 |
| 2018/0113581 A1 | 4/2018 | Makovsky |
| 2018/0115462 A1 | 4/2018 | Makovsky |
| 2018/0123940 A1 | 5/2018 | Rimar et al. |
| 2018/0203736 A1* | 7/2018 | Vyas .................. G06F 9/45558 |
| 2018/0322599 A1 | 11/2018 | Srivastava |
| 2019/0095241 A1* | 3/2019 | Ago .................. G06F 16/24573 |
| 2019/0104020 A1* | 4/2019 | Tero .................. G06Q 30/0635 |
| 2019/0104023 A1* | 4/2019 | Rimar .................. H04L 43/045 |
| 2019/0104398 A1 | 4/2019 | Owen et al. |
| 2019/0354467 A1* | 11/2019 | Wiener ............... G06F 11/3688 |
| 2020/0043063 A1* | 2/2020 | London .................. G07C 5/008 |
| 2020/0050689 A1 | 2/2020 | Tal et al. |
| 2020/0204443 A1 | 6/2020 | Bar Oz et al. |
| 2020/0328941 A1* | 10/2020 | Feiguine ............ H04L 41/0895 |
| 2020/0404059 A1 | 12/2020 | Feiguine |
| 2021/0117859 A1* | 4/2021 | Rogers .................. H04L 41/082 |
| 2021/0194764 A1 | 6/2021 | Badyan et al. |
| 2021/0203731 A1* | 7/2021 | Garty .................. H04L 41/0853 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

\* cited by examiner

Users File 800A

| Username | User_id | Default_Tablespace | Temporary_Tablespace | Created | Profile | Expiry_date | Account_status | Common | Last_login | Machine_Id | DB_Name | Timestamp |
|---|---|---|---|---|---|---|---|---|---|---|---|---|
| Syskm | 212421 | System | Temp | 2017-01-26_13:53:27 | Default | 2017-01-26_13:53:27 | Expired & Locked | Yes | | lms15 | ORA122_DB2 | 2020_06_02_02:24:27 |
| Sysbackup | 12421 | System | Temp | 2017-01-26_13:53:27 | Defalut | 2017-01-26_13:53:27 | Expired & Locked | Yes | | lms15 | ORA122_DB2 | 2020_06_02_02:24:27 |
| Wmsys | 72 | Sysaux | Temp | 2017-01-26_14:49:21 | Defalut | 2017-01-26_14:49:2 | Expired & Locked | Yes | | lms15 | ORA122_DB1 | 2020_06_02_02:23:46 |
| Dvsys | 127990 | Sysaux | Temp | 2017-01-26_15:26:24 | Defalut | 2017-01-26_15:26:24 | Expired & Locked | Yes | | lms15 | ORA122_DB1 | 2020_06_02_02:23:46 |
| Audsys | 8 | System | Temp | 2017-01-26_13:53:26 | Defalut | 2017-01-26_13:53:26 | Expired & Locked | Yes | | lms15 | ORA122_DB1 | 2020_06_02_02:23:46 |
| Dip | 23 | Users | Temp | 2017-01-26_14:05:46 | Defalut | 2017-01-26_14:05:46 | Expired & Locked | Yes | 2020_06_01_01:17:12 | lms15 | ORA122_DB_ROOT | 2020_06_02_02:13:46 |
| Dbsnmp | 54 | Sysaux | Temp | 2017-01-26_15:05:32 | Defalut | 2017-01-26_15:05:32 | Expired | Yes | | lms15 | ORA122_DB_ROOT | 2020_06_02_02:33:06 |
| Sysakm | 231212 | Users | Temp | 2017-01-26_14:05:46 | Defalut | 2017-01-26_14:05:46 | Expired & Locked | Yes | | lms15 | ORA122_DB_ROOT | 2020_06_02_02:13:46 |

FIG. 8A

Options File 800B

| Machine_ID | DB_Name | Time stamp | Host Name | Instance_Name | Option_Name | Option_Query | Sql_err_code | Sql_err_message | Col010 | Col020 | Col030 | Col040 | Col050 | Col060 | Col070 | Col080 | Col090 | Col100 | Col120 | Col130 | Col140 | Col150 | Col160 |
|---|---|---|---|---|---|---|---|---|---|---|---|---|---|---|---|---|---|---|---|---|---|---|---|---|
| ORA lms 12 | ORA 183~ PDB 1 | 2020-06-01_08 :28:11 | lms 12 | ORA 183~ PDB 1 | Dba_feature_usage_statistics | 10g | | | Recover Table | 18.0 0.0 0 | 0 | 0 | False | | | | 604 800 | 120 144 8 | | | | | |
| ORA lms 12 | ORA 183~ PDB 1 | 2020-06-01_08 :28:11 | lms 12 | ORA 183~ PDB 1 | Dba_feature_usage_statistics | 10g | | | Recovery Area | 18.0 0.0 0 | 0 | 0 | False | | | | 604 800 | 120 144 8 | | | | | |
| ORA lms 12 | ORA 183~ PDB 1 | 2020-06-01_08 :28:11 | lms 12 | ORA 183~ PDB 1 | Dba_feature_usage_statistics | 10g | | | Partitioning (system) | 18.0 0.0 0 | 0 | 0 | False | | | | 604 800 | 120 144 8 | | | | | |
| ORA lms 12 | ORA 183~ PDB 1 | 2020-06-01_08 :28:11 | lms 12 | ORA 183~ PDB 1 | Dba_feature_usage_statistics | 10g | | | File Mapping | 18.0 0.0 0 | 0 | 0 | False | | | | 604 800 | 120 144 8 | | | | | |

FIG. 8B

Details File 800C

| R1_script_version | Time_stamp | Mach_ine_id | Vmach_ine_id | Banner | DB_name | User_count | Server_manufacturer | Server_model | Operating_system | Sockets_populated_phys | Total_physical_cores | Processor_id_entifier | Processor_speed | Total_logical_cores | Partitioning_method | DB_role | Install_Date |
|---|---|---|---|---|---|---|---|---|---|---|---|---|---|---|---|---|---|
| 19.1 | 2020-06-02 01:54:00 | lms8 | | | ORA 121N | 35 | VMware%2C Inc. | VMware Virtual Platform | Linux Red Hat | 4 | 1 | Intel(R) Xeon(R) CPU E5-2670 0 @ 2.60GHz | 2600 | 4 | bytes | Primary | 2019-07-17_08 :49:49 |
| 19.1 | 2020-06-02 02:25:00 | lms15 | | | ORA 122R | 36 | VMware%2C Inc. | VMware Virtual Platform | Linux Red Hat | 4 | 1 | Intel(R) Xeon(R) CPU E5-2670 0 @ 2.60GHz | 2600 | 4 | bytes | Primary | 2019-07-18_03 :00:26 |
| 19.1 | 2020-05-31 04:54:00 | lms3 | | | ORA 112SE | 0 | VMware%2C Inc. | VMware Virtual Platform | Linux Ubuntu | 2 | 1 | Intel(R) Xeon(R) CPU E5-2670 0 @ 2.60GHz | 2600 | 2 | Linux swap / Solaris | Primary | 2019-07-11_23 :36:31 |
| 19.1 | 2020-05-31 05:40:00 | lms6 | | | ORA 12D BV | 37 | VMware%2C Inc. | VMware Virtual Platform | Linux Ubuntu | 2 | 1 | Intel(R) Xeon(R) CPU E5-2670 0 @ 2.60GHz | 2600 | 2 | Linux swap / Solaris | Primary | 2019-07-14_18 :13:21 |

FIG. 8C

License File 800

| Sessions_max | Sessions_warning | Sessions_current | Sessions_highwater | CPU_count_current | CPU_count_highwater | Users_max | Machine_ID | DB_Name | Timestamp |
|---|---|---|---|---|---|---|---|---|---|
| 0 | 0 | 7 | 26 | 4 | 4 | | lms9 | EMREP121 | 2020_06_02_02:24:27 |
| 0 | 0 | 10 | 27 | 2 | 2 | | lms3 | ORA112SE | 2020_06_02_02:24:27 |
| 0 | 0 | 4 | 21 | 4 | 4 | | lms14 | ORA122R1~PDB1 | 2020_06_02_02:23:46 |
| 0 | 0 | 5 | 17 | 2 | 2 | | lms5 | ORA12SE~PDB1 | 2020_06_02_02:23:46 |
| 0 | 0 | 1 | 18 | 4 | 4 | | lms10 | ORA122SE~PDB1 | 2020_06_02_02:23:46 |
| 0 | 0 | 10 | 20 | 4 | 4 | | lms1 | ORA102 | 2020_06_02_02:13:46 |
| 0 | 0 | 1 | 14 | 4 | 4 | | lms12 | ORA183~PDB1 | 2020_06_02_02:33:06 |
| 0 | 0 | 13 | 26 | 4 | 4 | | lms2 | ORA111 | 2020_06_02_02:13:46 |

FIG. 8D

Overview File 800E

| Host_Name | Assigned_on_level | Oracle_product_category | Physical_or_virtual_machine_id | Virtual_machine_id | Database_License_edition | Database_name | Database_path_name | Version | Options_installed | Options_Packs_in_use | Packs_generated | Application_type | Environment_used_in_data_sets | User_code | User_count | Server_machine_model | Server_OS_type | Sockets_populated | Total_physical_cores | Processor_identifier | Processor_speed | Socket_capacity_physical | Total_logical_cores | Partitioning_method | Primary_database | Sessions | Instance_sessions_highwater | Thread_data | Message_sent | Timestamp |
|---|---|---|---|---|---|---|---|---|---|---|---|---|---|---|---|---|---|---|---|---|---|---|---|---|---|---|---|---|---|
|  |  |  |  |  |  |  |  |  |  |  |  |  |  |  |  |  |  |  |  |  |  |  |  |  |  |  |  |  |  |
| host9 |  | Database | host9 |  | Enterprise Processor | EBSREP01 | 21 | 12.1.0.2.0 | RAC IS OL AA DV RAT ADG AC DM | OL AA RAT ADG AC DM |  |  | 30 |  | VMware ESXi Inc. | VMware Virtual Platform Linux Red Hat | 4 | 1 | Intel(R) Xeon(R) CPU E5-2670 0 @ 2.60GHz | 2600 | 4 | 4 | bytes |  | 26 |  |  | 2020-05-31 09:57:00 |
| host15 |  | Database | host15 |  | Enterprise Processor | ORA1121R | | 12.2.0.1.0 | RAC IS OL AA DV RAT ADG AC DM | RAC OL AA RAT ADG AC DM |  |  | 36 |  | VMware ESXi Inc. | VMware Virtual Platform Linux Red Hat | 4 | 1 | Intel(R) Xeon(R) CPU E5-2670 0 @ 2.60GHz | 2600 | 4 | 4 | bytes |  | 18 |  |  | 2020-06-02 02:25:00 |
| host1 |  | Database | host1 |  | Enterprise Processor | ORA1102 | | 10.2.0.1.0 | RAC IS OL DM | OL DM |  |  | 0 |  | VMware ESXi Inc. | VMware Virtual Platform Linux Red Hat | 4 | 1 | Intel(R) Xeon(R) CPU E5-2670 0 @ 2.60GHz | 2600 | 4 | 4 | bytes |  | 20 |  |  | 2020-05-31 06:04:00 |

FIG. 8E

Sessions File 800F

| SADDR | SID | PADDR | User# | Username | Command | Status | Server | Schema name | OSUser | Process | Machine | Terminal | Program | Type | Last_call_et | Log_on_time | Mach_ine_ID | DB_Name | Timestamp |
|---|---|---|---|---|---|---|---|---|---|---|---|---|---|---|---|---|---|---|---|
| 00000000F40F1EC8 | 361 | 00000000F5B566C8 | 0 | | 0 | Active | Dedicated | SYS | oracle | 31922 | lms8 | Unknows | oracle@lms8 (LGWR) | Background | 20806 | 2020-06-01 20:06:44 | lms8 | ORA121N2~PDB1 | 2020-06-02_01:53:29 |
| 000000006C4254F0 | 396 | 000000006DD2CC60 | 0 | | 0 | Active | Dedicated | SYS | oracle | 17772 | lms1 | Unknows | oracle@lms1 (Q004) | Background | 27606 320 | 2019-07-16 22:46:44 | lms1 | ORA183SE-PDB1 | 2020-05-31_11:11:58 |
| 0000000075D1CD00 | 129 | 000000007EC93108 | 0 | | 0 | Active | Dedicated | SYS | oracle | 16653 | lms10 | Unknows | oracle@lms10 (SCMN) | Background | 27596 703 | 2019-07-16 23:31:22 | lms10 | ORA122SE-PDB1 | 2020-05-31_09:16:26 |

FIG. 8F

| File 902 | Field 904 | Value in First Output Information 906 | Value in Second Output Information 908 | Change 910 |
|---|---|---|---|---|
| Details | TOTAL_PHYSICAL_CORES | 8 cores | 5 cores | 3 cores reduced |
| Overview | PROCESSOR_SPEED | 5 GHz | 4 GHz | 1 GHz reduced |
| Users | ACCOUNT_STATUS | OPEN | EXPIRED | Account Expired |
| License | USERS_MAX | 35 | 30 | 5 users reduced |

AUTOMATIC DISCOVERY OF CLOUD-BASED INFRASTRUCTURE AND RESOURCES

CROSS-REFERENCE TO RELATED APPLICATIONS/INCORPORATION BY REFERENCE

This application is a continuation of and claims priority to U.S. patent application Ser. No. 17/020,340, filed Sep. 14, 2020, the entire content of which is hereby incorporated herein by reference.

U.S. patent application Ser. No. 17/020,340 claims priority to U.S. Provisional Patent Application No. 63/055,192 filed on Jul. 22, 2020, the entire content of which is hereby incorporated herein by reference.

BACKGROUND

With the advancement of platform as a service (or PaaS), an organization (such as a company) have a capability to employ multiple computing resources (e.g., virtual machines, storage capacity, etc.) in cloud-based networks. These computing resources are hosted remotely and are managed by a third party. Usually in the cloud-based networks, the computing resources are associated with one or more projects that may be owned or administered by an organization. The organization may have tools with which the organization may be able to discover and manage all the devices and services on its own on-premise network. Such tools, however, are insufficient for discovering and managing all the computing resources in cloud-based networks that are employed by the organization. As a consequence, the organization is unable to account for all of its computing assets (resources) in a unified fashion.

The subject matter claimed herein is not limited to embodiments that solve any disadvantages or that operate only in environments such as those described above. Rather, this background is only provided to illustrate one example technology area where some embodiments described herein may be practiced.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A remote computing system may be configured to provide computing resources on behalf of a managed computer network. These computing resources may include, but is not limited to, a virtual computing device, a load balancer, and a storage volume that may be distributed across one or more availability zones (e.g., datacenters) disposed within one or more geographic regions. These computing resources may define a cloud-based computing environment that the managed network can use to host software applications, store, and serve data, and provide other web-based software services.

The computing resources in the remote computing system may be organized in a resource hierarchy. The resource hierarchy may include an organization resource, a folder resource, a project resource, and the computing resource. The organization resource may be a root node of the resource hierarchy and may represent the managed computer network (the organization). The folder resource may contain one or more project resources or other folders. In some embodiments, the folder resource may contain a combination of both the one or more project resources and the other folders. The project resource may represent the software applications and other web-based applications that may be hosted or deployed in the remote computing system. Each project resource may have an identifier known as a Project identifier (ID), and the project ID may be unique for each project under the organization. The project resources may contain the one or more computing resources that may be allocated to the project. The computing resources may be at the bottom of the resource hierarchy and may represent the virtual computing devices, the load balancers, and the storage volumes, etc.

A discovery computing system may be capable to discover and/or map all the computing resources in the project resource that make up the service infrastructure by way of which the cloud-based computing environment is provided. The discovery computing system may obtain attributes of the computing resources in different regions and availability zones by way of application programming interfaces (APIs) provided by the remote computing system. Based on the attributes, the discovery computing system may be configured to generate relationships among the computing resources and represent these relationships in a map. The map may indicate, for example, a distribution of virtual computing devices across one or more availability zones, storage volumes utilized by the virtual computing devices, load balancers configured to distribute traffic among the virtual computing devices, attributes of physical computing hardware by which the different resources are executed, and/or operating system images utilized by the virtual computing devices, among other aspects.

However, to discover and/or map all the computing resources in a first project resource, a service account in the discovery computing system may be required. The service account may be related to the first project resource in the remote computing network and may be created manually by a user at an end of the discovery computing system. The service account may be created based on a first service account of the first project. The first service account may be generated automatically by the remote computing system, when a first computing resource of the first project may be instantiated.

Due to dynamic nature of the organization, the organization may have multiple projects in the remote computing system. To discover the computing resources in each of these multiple projects, a corresponding service account for each project may be required to be created manually in the discovery computing system. The manual creation of the multiple service accounts for the projects in the organization may be cumbersome as well as time-consuming task. Therefore, there is a need to automatically create the service account for each project under an organization, and further discover and/or map all the computing resources in each of the multiple projects under the organization. The automatic creation of the multiple service accounts (may in hundreds or thousands in number), by the discovery computing system, may save the significantly effort and time to manually create the service accounts Accordingly, a first example embodiment may involve the discovery computing system. The discovery computing system may include a persistent storage that may be configured to store, as one or more configuration items and on behalf of a managed network, a set of resources provided by the remote computing system to the managed network. The discovery computing system may be configured to receive an account identifier (ID) and a set of credentials required to access a first service account associated with the account ID. The first service account may be associated with a project in an organization registered with the remote computing system. The discovery computing system may be further configured to transmit a first application programming interface (API) query to the remote computing system based on the received account ID and the set of credentials. The discovery computing system may be further configured to receive an organization identifier (ID) of the organization from the remote computing system based on the transmitted first API query. The discovery computing system may be further configured to transmit a second API query to the remote computing system based on the received organization ID. The discovery computing system may be further configured to receive information about a set of projects in the organization from the remote computing system based on the transmitted second API query, wherein the set of projects may include the project. The discovery computing system may be further configured to generate a set of service accounts each associated with a corresponding project of the set of projects, and further determine the set of resources, in the remote computing system, associated with each of the generated set of service accounts. The discovery computing system may further store the determined set of resources, as the configuration items, in the persistent storage.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 8A-8F collectively illustrate exemplary information in a plurality of files generated based on application discovery command, in accordance with example embodiments.

DETAILED DESCRIPTION

Automatic Discovery of Cloud-Based Infrastructure and Resources:

A large organization is a complex entity with many interrelated departments that may further have different projects. Some of these departments that are found across the organization are, but not limited to, a human resources (HR) department, a supply chain department, information technology (IT) department, and a finance department, etc. However, each organization may have its own unique departments and projects that may provide essential capabilities and/or create competitive advantages.

To support widely-implemented projects in multiple departments, organizations typically use off-the-shelf software applications, such as, but not limited to, customer relationship management (CRM) and human capital management (HCM) packages that may have a huge amount data associated with it. A large organization often has dozens or hundreds of these applications. Nonetheless, the advantages provided by the embodiments herein are not limited to large organizations and may be applicable to an organization, or any other type of enterprise, of any size.

To efficiently host the applications and to store the data associated with the applications, organizations would benefit from a remotely-hosted platform that may eliminate unnecessary hardware requirement at an on-premise network of the organization. The goal of such a platform would be, but not limited to, to reduce purchase of expensive computing resources, provide scalability and security so that software engineers and individuals in the organization can focus on developing unique, high-value features. In order to achieve this goal, the concept of a Platform as a Service (PaaS) is introduced, to provide computing resources to the organization. The computing resources in the PaaS is hosted remotely from the organization, but may access data, applications, and services within the organization by way of secure connections.

In some embodiments, the PaaS may also support a rich set of pre-defined functionality that can be added to the applications hosted in the remote computing system (i.e. that may provide a cloud-based computing environment). These functionalities include support for searching, email, templating, workflow design, reporting, analytics, social media, scripting, mobile-friendly output, and customized GUIs.

The following embodiments describe architectural and functional aspects of example PaaS systems, as well as the features and advantages thereof.

Figure 1:
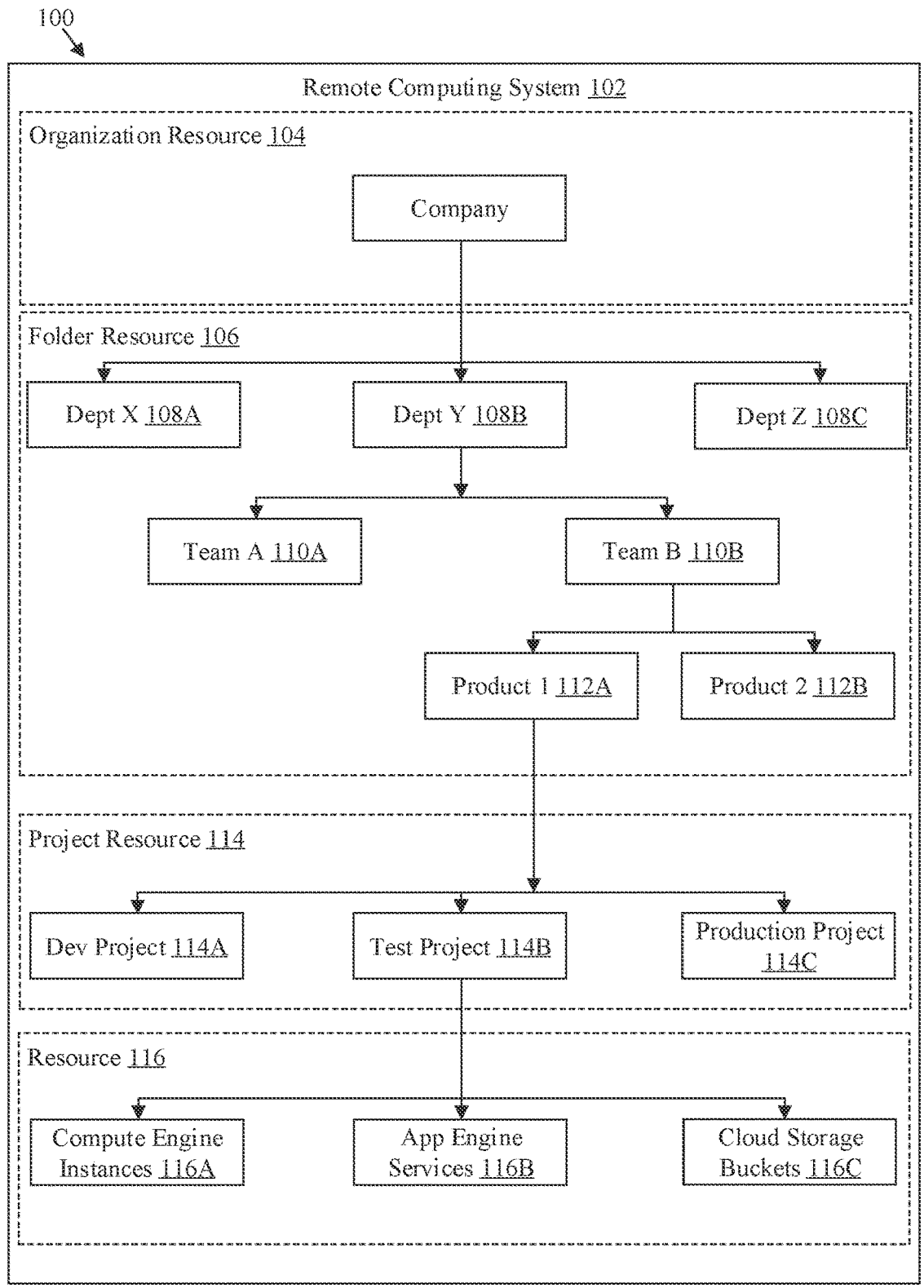
FIG. 1 illustrates a resource hierarchy of a remote computing system, in accordance with example embodiments.

The computing resources in the remote computing system may be organized hierarchically as shown in FIG. 1. This hierarchy may provide a provision to map the operation structure of the organization to the cloud-based network, and to manage access control and permissions for groups of related resources.

FIG. 1 illustrates a resource hierarchy of a remote computing system, in accordance with example embodiments. With reference to FIG. 1, there is shown a resource hierarchy 100 in a remote computing system 102. The resource hierarchy 100 may include an organization resource 104, a folder resource 106, a project resource 114, and a resource 116. Each resource(s) in the resource hierarchy 100 may be arranged hierarchically where the organization resource 104 may be a top-level node (or a root node) and the resource 116 may be a bottom-level node (or a leaf node).

The organization resource 104 may represent the organization (for example, a company) and all computing resources may be grouped under the organization resource 104. The organization resource 104 may provide central visibility and control over all resources further down the resource hierarchy 100. The organization resource 104 may have an associated organization information. The organization information may include, but is not limited to, an organization Identifier (ID), an organization name, and an owner of the organization resource 104. The organization Identifier (ID) may a unique identifier for the organization.

The folder resource 106 may be the child node of the organization resource 104 and may provide an additional grouping mechanism and isolation boundaries between the projects and may be visualized as sub-organizations within the organization. The folder resource 106 may be used to model different legal entities, departments, and teams within the organization. In some embodiments, the folder resource 106 may be visualized as a set of enterprises that may be purchased/owned by the organization (i.e. represented by the organization resource 104). For example, a first level of folders may be used to represent main departments in the organization. The folder resource 106 may contain the projects and other folders, where each folder may further include other sub-folders that may represent different teams.

As shown in FIG. 1, the folder resource 106 may include a set of departments that may include a first department 108A, a second department 108B, a third department 108C. The first department 108A may represent "Dept X" within the organization. The second department 108B may represent "Dept Y" within the organization. Similarly, the third department 108C may represent "Dept Z" within the organization, as shown in FIG. 1.

In some embodiments, the set of departments may be further categorized into one or more teams. For example, the second department 108B may be categorized into a first team 110A and a second team 110B. The first team 110A may represent "Team A" in the organization (say in "Dept Y") and the second team 110B may represent "Team B" in the organization (say in "Dept Y"). In an embodiment, the one or more teams may be further categorized into one or more products. By way of example and not limitation, the second team 110B may include a first product 112A and a second product 112B. The first product 112A may represent a "Product 1" of the organization and the second product 112B may represent a "Product 2" of the organization, as shown in FIG. 1.

The project resource 114 may be considered as a base-level organizing entity. The organization resource 104 and the folder resource 106 may contain one or more projects. The project resource 114 may be required to use the remote computing system 102 and may form a basis for creating, enabling, and using all services of the remote computing system 102. Each project resource 114 in the remote computing system 102 may have an associated project identifier (ID) and a project number. The project ID may be a unique identifier for the project in the organization. The project number may be automatically generated by the remote computing system 102 and may not be modified. By way of example and not limitation, the first product 112A may include a set of projects including a first project 114A, a second project 114B, and a third project 114C. As an example, the first project 114A may represent a "Dev Project", the second project 114B may represent a "Test Project", and the third project 114C may represent a "Production Project", as shown in FIG. 1.

The resource 116, shown in FIG. 1, may correspond to one or more computing resources in the remote computing system 102. The one or more computing resources may be allocated to a project and may be at the bottom of the resource hierarchy 100. The one or more computing resources may include, but is not limited to, resources related to compute, storage, databases, networking, operations, data analytics, AI and machine learning, API management, serverless computing, containers, media, and gaming. By way of example and not limitation, the second project 114B may include, but not limited to, a first computing resource 116A that may correspond to "Compute Engine Instances", a second computing resource 116B that may correspond to "App Engine Services", and a third computing resource 116C that may correspond to "Cloud Storage Buckets".

Figure 2:
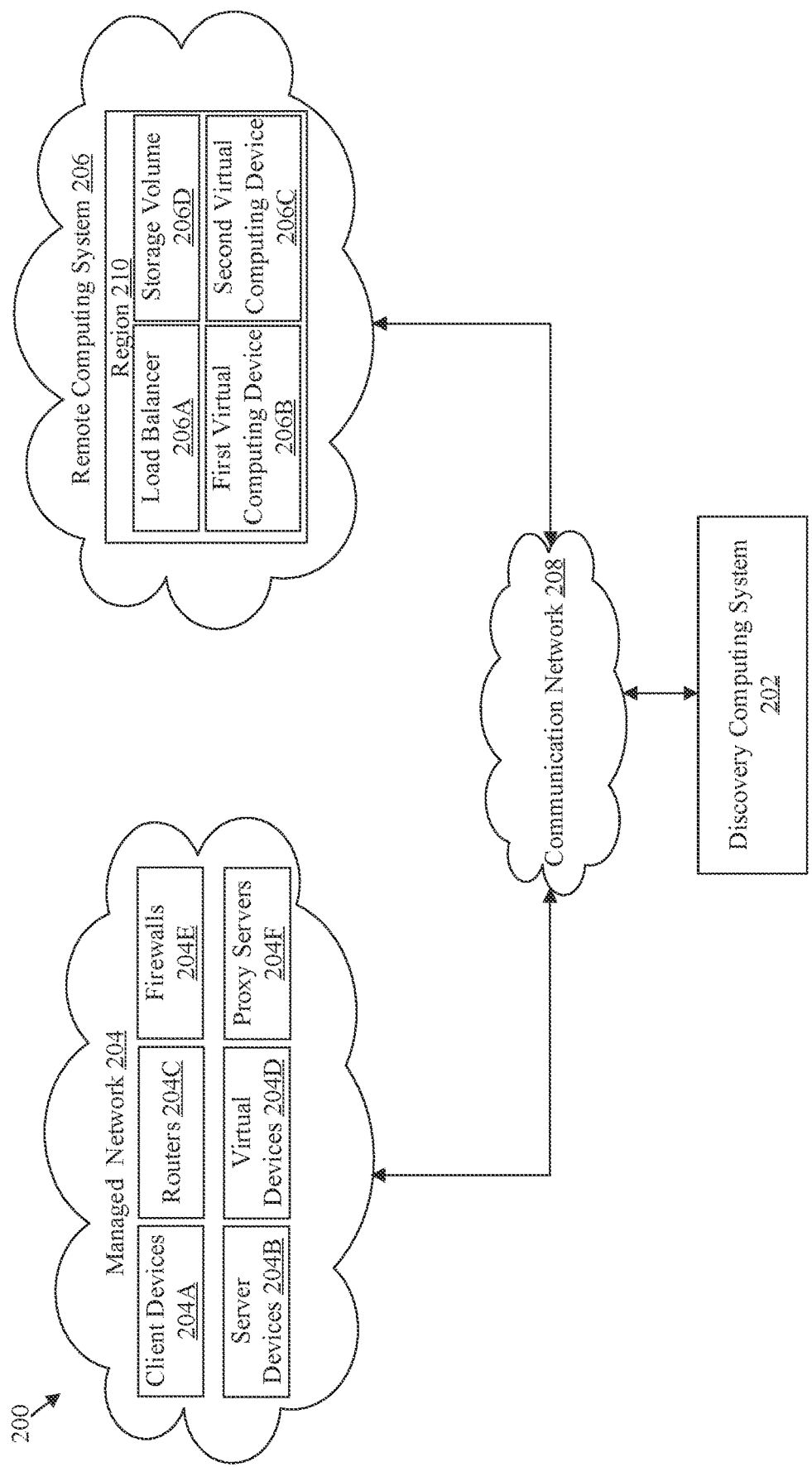
FIG. 2 illustrates a schematic drawing of a communication environment for automatic discovery of cloud-based infrastructure and resources, in accordance with example embodiments.

FIG. 2 illustrates a schematic drawing of a communication environment for automatic discovery of cloud-based infrastructure and resources, in accordance with example embodiments. With reference to FIG. 2, there is shown a communication environment 200. There is further shown a discovery computing system 202, a managed network 204, and a remote computing system 206. The discovery computing system 202, the managed network 204, and the remote computing system 206 may communicate with each other via a communication network 208.

The discovery computing system 202 may include suitable code, logic, circuitry and/or interfaces that may be configured to discover cloud based infrastructure and resources. The discovery computing system 202 may be configured to receive an account identifier (ID) and a set of credentials required to access a first service account associated with the account ID. The discovery computing system 202 may be further configured to transmit a set of application programming interface (API) queries to the remote computing system 206 based on the received account ID and the set of credentials to determine a set of resources associated with the account ID. Example implementations of the discovery computing system 202 may include, but are not limited to, a computing device, a computer work station, an application server, a database server, a mainframe server, a cloud server (e.g., a hybrid, a private, or a public cloud), or a web server.

The managed network 204 may be, for example, an enterprise network used by an entity for computing and communications tasks, as well as storage of data. Thus, managed network 204 may include various client devices 204A, server devices 204B, routers 204C, virtual machines 204D, firewalls 204E, and/or proxy servers 204F. Client devices 204A may be embodied by a computing system (such as the discovery computing system 202), the server devices 204B may be embodied by the computing system, and the routers 204C may be any type of router, switch, or gateway.

Virtual machines 204D may be embodied by a computing system. In general, a virtual machine may be an emulation of the computing system, and may mimic functionality (e.g., processor, memory, and communication resources) of a physical computer. A single physical computing system may support up to thousands of individual virtual machines. In some embodiments, virtual machines 204D may be managed by a centralized server device or application that facilitates allocation of physical computing resources to individual virtual machines, as well as performance and error reporting. In some embodiments, the enterprises often employ one or more virtual machines 204D in order to allocate computing resources in an efficient, as needed fashion.

The firewalls 204E may be one or more specialized routers or server devices that may protect the managed network 204 from unauthorized attempts to access the devices, applications, and services therein, while allowing authorized communication that may be initiated from the managed network 204. The firewalls 204E may also provide intrusion detection, web filtering, virus scanning, application-layer gateways, and other applications or services. In some embodiments, the managed network 204 may include one or more virtual private network (VPN) gateways with which it communicates with the remote computing system 206.

The managed network 204 may also include one or more proxy servers 204F. An embodiment of the proxy servers 204F may be a server device that facilitates communication and movement of data between the discovery computing system 202, the managed network 204, and the remote computing system 206. In particular, the proxy servers 204F may be able to establish and maintain secure communication sessions with one or more computational instances of the remote computing system 206. By way of such a session, the remote computing system 206 may be able to discover and manage aspects of the architecture and configuration of managed network 204 and its components.

Firewalls, such as the firewalls 204E, typically deny all communication sessions that may be incoming by way of the communication network 208, unless such a session has been ultimately initiated from behind the firewalls 204E (i.e., from a device on managed network 204) or the firewalls 204E has been explicitly configured to support the session. By placing the proxy servers 204F behind the firewalls 204E (e.g., within the managed network 204 and protected by the firewalls 204E), the proxy servers 204F may be able to initiate these communication sessions through the firewalls 204E. Thus, the firewalls 204E might not have to be specifically configured to support the incoming sessions from the remote computer system 206, thereby avoiding potential security risks to the managed network 204.

In some embodiments, the managed network 204 may include a few devices and a small number of networks. In other deployments, the managed network 204 may span multiple physical locations and include hundreds of networks and hundreds of thousands of devices. Thus, the architecture depicted in FIG. 2 is capable of scaling up or down by orders of magnitude.

Furthermore, depending on the size, architecture, and connectivity of the managed network 204, a varying number of the proxy servers 204F may be deployed therein. For example, each one of the proxy servers 204F may be responsible for communicating with the remote computing system 206 regarding a portion of the managed network 204. Alternatively or additionally, sets of two or more proxy servers 204F may be assigned to such a portion of the managed network 204 for purposes of load balancing, redundancy, and/or high availability.

The remote computing system 206 may provide a cloud-based computing environment that allows the managed network 204 to host software applications, store data, and otherwise utilize remotely-hosted computing resources. The cloud-based computing environment may be provided atop an infrastructure of various computing resources that allow the computing environment to be defined, modified, and otherwise tailored to the needs of the managed network 204. The remote computing system 206 may be GOOGLE CLOUD PLATFORM®, IBM CLOUD®, MICROSOFT® AZURE®, and/or AMAZON WEB SERVICES®, among other possible cloud providers.

The cloud-based computing environment may be configured to automatically scale as demand for the computing resources vary over time. Accordingly, the state of the infrastructure of computing resources may also fluctuate over time to allow for such scaling. The extent of scaling and fluctuation in the computing resources dedicated to the managed network 204 may indicate a popularity (e.g., absolute popularity and/or relative popularity) of the services provided by the managed network 204. This may result in a variable cost of using the cloud-based computing environment. Thus, maintaining an accurate and an up-to-date map of the service infrastructure dedicated by the remote computing system 206 to the managed network 204 may allow the managed network 204 to utilize the cloud-based computing environment more effectively and/or efficiently. To that end, the managed network 204 may utilize a discovery application to discover and map the service infrastructure, and subsequently modify aspects thereof to reach a target state.

The computing infrastructure provided by the remote computing system 206 may be organized into multiple different geographic regions. Each geographic region may encompass a geographic area in which multiple different and physically separate data centers are located. For example, the regions may include United States South (i.e., US-South), US-East, European Union Great Britain (i.e., EU-GB), EU-Germany, and Asia Pacific North (i.e., AP-North), among other possibilities. Different remote computing systems may implement a different set of regions. Allocating computing resources within a particular geographic region allows client devices within or nearby this region to more quickly communicate with the computing resources therein.

A region 210 is an example region into which the remote computing system 206 may be or organized. Although not shown, the remote computing system 206 may include multiple geographically-distributed instantiations of region 210 and one or more of its components. The managed network 204 may be assigned a plurality of computing resources within the region 210 that make up at least part of the cloud-based computing environment. Namely, the region 210 may include one or more availability zones (not shown), each of which may represent a corresponding physical data center. In some implementations, the underlying hardware that makes up a first availability zone may be physically isolated, such that outages (e.g., power outages) associated with the first availability zone do not affect the other availability zones in the one or more availability zones. Accordingly, the one or more availability zones may provide redundancy within a single geographic region.

Each availability zone of the one or more availability zones may be part of network that may be dedicated to the managed network 204 by the remote computing system 206. The network may allow client devices (e.g., computing devices external to the remote computing system 206) access to computing resources in the one or more availability zones and may also allow these computing resources to communicate with one another. In some embodiments, the network may be referred to as a Virtual Private Cloud (VPC). Each of the one or more availability zones may be assigned a corresponding subnet, thus allowing for a logical division (e.g., based on IP address) of the computing resources provided by each availability zone. That is, the first availability zone may be assigned a first subnet while a second availability zone may be assigned a second subnet.

The network may also include an Internet gateway, a route table, and a network access control list (NACL) for the subnet. The Internet gateway may provide an interface between components of network and the communication network 208. The route table and the NACL may provide network traffic control to the subnet. Among other network parameters, the route table and the NACL may define permitted destinations for and permitted types of traffic originating out of computing resources in the subnet, as well as permitted sources and permitted types of traffic addressed to computing resources in the subnet. For example, the route table and the NACL may indicate whether the subnet is accessible to the computing devices outside of the network (i.e., whether the subnet is public or private). The route table and the NACL may define similar rules for the subnet.

The Internet gateway, as well as the route table and the NACL, may represent logical components of the remote computing system 206. That is the Internet gateway, the route table and the NACL may be implemented by one or more physical devices (e.g., gateways and routers) of the remote computing system 206. Additionally, in some implementations of the remote computing system 206, the network may extend across, cover, or include multiple different instantiations of the region.

Each availability zone may include therein a corresponding plurality of computing resources. Namely, the availability zone may include therein a load balancer 206A, a first virtual computing device 206B, a second virtual computing device 206C, and a storage volume 206D. The first virtual computing device 206B and/or second virtual computing device 206C may be alternatively be referred to as a virtual machine.

In some implementations, the load balancer 206A, the first virtual computing device 206B, the second virtual computing device 206C, and the storage volume 206D may represent physical computing resources of the remote computing system 206. For example, the first virtual computing device 206B and the second virtual computing device 206C may represent a physical computing device used exclusively for computation, but not other tasks such as providing storage or load balancing. Alternatively, each of these computing resources may represent a virtual computing resource (e.g., software processes that isolate the implementation of the computing resource from the underlying physical hardware). Thus, for example, each physical computing device within the remote computing system 206 may execute and provide multiple virtual computing resources, including computation, load balancing, and storage.

The load balancer 206A may be configured to distribute network traffic (e.g., web traffic generated by various software applications) or other types of requests among the first virtual computing device 206B and the second virtual computing device 206C. Thus, the load balancer 206A may balance traffic within a single availability zone. In another embodiment, the load balancer 206A may be configured to distribute network traffic among the first virtual computing device 206B, and the second virtual computing device 206C. Thus, the load balancer 206A may be configured to balance traffic across multiple availability zones. When the load balancers 206A is accessible by computing devices outside of the network (or one or more other networks in other geographic regions of the remote computing system 206), they may be considered as a public load balancer. On the other hand, when load balancers 206A is accessible only by computing resources within the network, they may be considered as a private load balancer.

The first virtual computing device 206B and the second virtual computing device 206C may be configurable to provide a target amount of computing resources. For example, the number of processor cores dedicated to execution of each virtual computing device, the amount of memory available to each virtual computing device, and the operating system executed by each virtual computing device may be adjustable for both the first virtual computing device 206B and the second virtual computing device 206C. The first virtual computing device 206B and the second virtual computing device 206C may utilize storage volumes to store various data associated with the software executed by the first virtual computing device 206B and the second virtual computing device 206C.

The managed network 204 may use the remote computing system 206 to deploy applications and services to its clients and customers. For instance, if the managed network 204 provides online music streaming services, then the remote computing system 206 may store the music files and provide web interface and streaming capabilities. In this way, the organization of the managed network 204 does not have to build and maintain its own servers for these operations.

It should be noted that the communication between the discovery computing system 202, the managed network 204, and the remote computing system 206 may be performed via the communication network 208. The communication network 208 may include a communication medium through which the discovery computing system 202 may communicate with the managed network 204, and the remote computing system 206 and/or different devices (not shown). Examples of the communication network 208 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the communication environment 200 may be configured to connect to the communication network 208, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

In operation, the discovery computing system 202 (i.e. that may include a discovery application or a discovery server) may be configured to receive an account identifier (ID) from a device of the managed network 204. The discovery computing system 202 may be further configured to receive a set of credentials required to access a first service account associated with the received account ID. The first service account may be associated with a project in an organization registered with the remote computing system 206. The first service account may be a service account associated with the project in the remote computing system 206 and may have a special permission of an organization administrator. The organization administrator may have special privileges for management of the all the folders, projects, and resources which are employed by the organization.

The first service account may be the special account that may belong to an application or a project, instead of an individual end user. The application may use the service account to call other API's of other services provided by the remote computing system 206, so that the users are not directly involved. The service account may be given permissions to access the computing resources it may need. In an embodiment, the service account may be considered as the identity of the service, and the service account's permissions control which resources the service can access. The service account may be identified by its email address, which is unique to the account. The service accounts may differ from user accounts in a few ways as the service account do not have passwords and therefore, cannot log in via browsers or cookies. Moreover, the service account may be associated with private/public Rivest-Shamir-Adleman (RSA) key-pairs that may be used for authentication.

As an example, a set of user accounts and service accounts (i.e. with associated roles/permissions) for the organization (such as "peakyblinders.me") in the remote computing system 206, may be provided in Table 1.

TABLE 1

User accounts and Service accounts in remote computing system.
Permission for Organization "Peakyblinders.me"

| Type | Members | Name | Role |
| --- | --- | --- | --- |
| User Account | patterns@peakyblinders.me | "ABC" | Access Temporary Admin Browser Folder Admin Organization Administrator Owner Project IAM Admin |
| Organization Account | peakyblinders.me | | Billing Account Creator Project Creator |
| Service Account | Sn-service-account1@sn-project-1.am.gserviceacoun.com | SN_service_account1 | Owner Organization Administrator |

With reference to Table 1, a first account with member "patterns@peakyblinders.me" may be a user account. The account type associated with the first account may correspond to a user account. The first account may have permissions to "access transparency admin", "Browser", "Owner", "Folder Admin", "Organization Administrator", and "Project IAM Admin". A second account with member "peakyblinders.me" in Table 1 may be an organization account. The account type associated with the second account may correspond to an organization account. The second account may have roles of "Billing Account Creator" and "Project Creator". A third account with member "sn-service-account1@sn-project-1.iam.gserviceaccount.com" in Table 1 may be the service account associated with a "project 1" in (or registered with) the organization "peakyblinders.me". The third account may have permissions/roles of "Owner" and "Organization Administrator".

Further in operations, the discovery computing system 202 may be further configured to receive the set of credentials to access the third account of Table 1 in the remote computing system 206. The third account may be a first service account and may have privilege of the "Organization Administrator" to discover the computing resources employed by the organization "peakyblinders.me" in the remote computing system 206.

The discovery computing system 202 may be further configured to receive datacenter information as a user input provided at the discovery computing system 202. The datacenter information may include a datacenter uniform resource locator (URL) and a datacenter type. The datacenter information may be required by the discovery computing system 202 to transmit a set of API queries (for example, Representational state transfer (REST) API queries) to the remote computing system 206 and receive a set of API responses, in response to the transmitted set of API queries, from the remote computing system 206.

Based on the receipt of the account ID, the set of credentials, and the datacenter information, the discovery computing system 202 may be further configured to transmit a first API query to the remote computing system 206 to retrieve organization information associated with the organization (for example peakyblinders.me of Table 1) that administer the project.

The remote computing system 206 may receive the first API query from the discovery computing system 202 and determine the project associated with the first service account. The remote computing system 206 may further determine the organization to which the determined project belongs. The remote computing system 206 may further determine organization information and transmit the determined organization information to the discovery computing system 202. In other words, the discovery computing system 202 may receive the organization information from the remote computing system 206 in response to the transmitted first API query. The organization information may include, but is not limited to, an organization ID, and an organization name. The organization ID may be a unique identifier for the organization and may be automatically created by the remote computing system 206.

The discovery computing system 202 may be further configured to extract the organization ID from the received organization information. The discovery computing system 202 may be further configured to transmit a second API query to the remote computing system 206. The second API query may be transmitted to fetch information about a set of projects that may belong to the same organization (i.e. indicated by the organization ID).

In response to the transmitted second API query, the discovery computing system 202 may receive the information about the set of projects in the organization from the remote computing system 206. The information about each of the set of projects may include, but is not limited to, a name of the project, a project ID, and a project number. The discovery computing system 202 may be further configured to automatically generate a set of service accounts each associated with corresponding project of the set of projects, based on the received information about the set of projects. The generated set of service accounts may belong to the remote computing system 206 and a network associated with the remote computing system 206. Each of the generated set of service accounts may have same credentials as those of the first service account. A corresponding service account associated with a first project of the set of projects (i.e. in the remote computing system 206) may be required to discover all the resources (or computing resources) allocated to the first project.

As an example, the generated set of service accounts in the discovery computing system, may be provided in Table 2.

TABLE 2

Generated set of Service Accounts.

| Name | Account ID | Discovery Credentials | Datacenter Type | Datacenter URL | Parent Account | Is master Account |
|---|---|---|---|---|---|---|
| 123 | 1234123 | cred_A | Datacenter 'A' | auth.os.com | (empty) | False |
| Abc | 7512120 | cred_B | Datacenter 'B' | | (empty) | False |
| Cloud Network | 7451210 | cred_C | Datacenter 'C' | | (empty) | False |
| Folder 1 | Folder-1 | cred_D | Datacenter 'D' | | (empty) | False |
| SN_Project_1 | sn-project1 | cred_F | Datacenter 'F' | | (empty) | False |
| SN_Project_2 | sn-project2 | cred_F | Datacenter 'F' | | (empty) | False |

With reference to Table 2, column 'Name' may correspond to a name of the service account. Column 'Account ID' may correspond to an identifier of the service account in the discovery computing system 202. The discovery credentials may be the credentials associated with the service account and may be used to run discovery on the service account. Column 'Datacenter Type' may correspond to the type of datacenter and may indicate the remote computing system 206. Column 'Datacenter URL' may correspond to the URL of the datacenter. Column 'Parent Account' may indicate whether the corresponding service account is a parent of any other service account of the generated set of service accounts. Column 'Is master account' may indicate whether the service account is a master account or not. The master account may have the permission of 'Organization Administrator'.

The discovery computing system 202 may be further configured to generate an organization configuration item (CI). A configuration item may refer to any or all of client devices, server devices, routers, and virtual machines, any applications or services executing thereon, as well as relationships between devices, applications, and services. Thus, the term "configuration items" may be shorthand for any physical or virtual device, or any application or service remotely discoverable or managed by computational instance, or relationships between discovered devices, applications, and services. The configuration items may be represented in a configuration management database (CMDB) related to the organization that may be stored in the persistent storage (shown in FIG. 4) included in the discovery computing system 202.

The persistent storage may include computer-readable storage media for carrying or having computer-executable instructions or data structures stored thereon. Such computer-readable storage media may include any available media that may be accessed by a general-purpose or special-purpose computer, such as a processor of the discovery computing system 202. By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Computer-executable instructions may include, for example, instructions and data configured to cause the processor to perform a certain operation or group of operations associated with the discovery computing system 202.

In an embodiment, the generated organization CI may include the received organization ID and the organization name. The organization CI may be stored in a "cloud_org" table (also referred as a first table) of the CMDB. The "cloud_org" table may be used to represent the organization in the discovery computing system 202.

The discovery computing system 202 may be further configured to generate a CI for each of the generated set of service accounts, to generate a set of CIs. The CI may be stored in a "cloud_service_account" table (also referred as a second table) in the CMDB stored in the persistent storage. The "cloud_service_account" table may include, but is not limited to, the name of the project, a project ID, and the received set of credentials required to access the service account associated with the account ID.

In order for the discovery computing system 202 to administer the computing resources employed by the managed network 204, the discovery computing system 202 may determine a plurality of computing resources in the organization in the remote computing system 206, the configurations and operational statuses of these computing resources, and the applications and services provided by the computing resources. Each resource related to one or more compute, storage, databases, networking, operations, data analytics, AI and machine learning, API management, serverless computing, Internet of Things (IoT), health care and services, containers, media, and gaming may be referred to as a configuration item. The process of defining configuration items within the remote computing system 206 may be referred to as the discovery.

The discovery may proceed in four logical phases: scanning, classification, identification, and exploration. Each phase of the discovery involves various types of probe messages being transmitted by the discovery computing system 202 to the remote computing system 206. The responses to these probes may be received and processed by the discovery computing system 202, and representations thereof may be transmitted to the CMDB. Thus, each phase can result in more configuration items being discovered and stored in the CMDB.

In the scanning phase, the discovery computing system 202 may probe each IP address in the specified range of IP addresses for open Transmission Control Protocol (TCP) and/or User Datagram Protocol (UDP) ports to determine the general type of resource. The presence of such open ports at an IP address may indicate that a particular application is operating on the resource that is assigned the IP address, which in turn may identify the operating system used by the resource. For example, if TCP port 135 is open, then the resource is likely executing a WINDOWS® operating system. Similarly, if TCP port 22 is open, then the resource is likely executing a UNIX® operating system, such as LINUX®. If UDP port 161 is open, then the resource may be able to be further identified through the Simple Network Management Protocol (SNMP). Once the presence of a resource at a particular IP address and its open ports have been discovered, these configuration items are saved in the CMDB.

In the classification phase, the discovery computing system 202 may further probe each discovered resource to determine the version of its operating system. The probes used for a particular resource are based on information gathered about the resources during the scanning phase. For example, if a resource is found with TCP port 22 open, a set of UNIX®-specific probes may be used. Likewise, if a resource is found with TCP port 135 open, a set of WINDOWS®-specific probes may be used. For either case, an appropriate set of tasks may be placed in task list for the discovery computing system 202 to carry out. These tasks may result in the discovery computing system 202 logging on, or otherwise accessing information from the particular resource. For instance, if TCP port 22 is open, the discovery computing system 202 may be instructed to initiate a Secure Shell (SSH) connection to the particular resource and obtain information about the operating system thereon from particular locations in the file system. Based on the obtained information, the operating system may be determined. As an example, a UNIX® resource with TCP port 22 open may be classified as AIX®, HPUX, LINUX®, MACOS®, or SOLARIS®. This classification information may be stored as one or more configuration items in the CMDB.

In the identification phase, the discovery computing system 202 may determine specific details about a classified resource. The probes used during the identification phase may be based on information gathered about the particular resources during the classification phase. For example, if a resource was classified as LINUX®, a set of LINUX®-specific probes may be used. Likewise, if a resource was classified as WINDOWS® 2012, as a set of WINDOWS®-2012-specific probes may be used. As the case for the classification phase, an appropriate set of tasks may be placed in task list for the discovery computing system 202 to carry out. These tasks may result in the discovery computing system 202 to read information from the particular resource, such as basic input/output system (BIOS) information, serial numbers, network interface information, media access control address(es) assigned to these network interface(s), IP address(es) used by the particular resource and so on. This identification information may be stored as one or more configuration items in the CMDB.

In the exploration phase, the discovery computing system 202 may determine further details about the operational state of a classified resource. The probes used during the exploration phase may be based on information gathered about the particular resources during the classification phase and/or the identification phase. An appropriate set of tasks may be placed in the task list for the discovery computing system 202 to carry out. These tasks may result in discovery computing system 202 to read additional information from the particular resource, such as processor information, memory information, lists of running processes (applications), and so on. Once more, the discovered information may be stored as one or more configuration items in the CMDB.

In further operations, the discovery computing system 202 may be further configured to determine a set of resources (in the remote computing system 206) associated with each of the generated set of service accounts, by executing the discovery on each of the generated set of service accounts of the set of projects in the organization. In some embodiments, the discovery computing system 202 may be further configured to fetch all the organization CIs from the "cloud_org table". The discovery computing system 202 may be further configured to fetch all the service accounts associated with each of the fetched organization CI. The discovery computing system 202 may be further configured to execute the discovery on each of the service account to determine the set of resources associated with each of the service account.

The discovery computing system 202 may be further configured to store the determined set of resources, as the configuration items in the persistent storage. In some embodiments, the stored configuration items may be further presented to the user of the managed network 204 for management and visualization purposes. Thus, all the resources under the organization may be automatically discovered and further presented to the user of the managed network 204 efficiently, without a need of creating a service account, for each individual project manually, in the discovery computing system 202.

In another embodiment, based on the generation of the set of service accounts in the discovery computing system 202, a job "Discover-SubAccounts" may be created and may be scheduled to be executed at a particular time. The job may include a call to include script known as "CloudDiscover-ServiceAccountWrapper" that may perform a set of actions. The set of actions may include fetch all the Organization CI from the "cloud_org" table (i.e. first table), and for each fetched Organization CI, run and fetch its belonging service accounts and further execute the discovery on each service account (i.e. associated with corresponding project in the organization) to determine the set of resources (i.e. in the remote computing system 206) that may be associated with each of the generated set of service accounts.

Modifications, additions, or omissions may be made to the communication environment 200 without departing from the scope of the present disclosure. For example, in some embodiments, the communication environment 200 may include any number of other components that may not be explicitly illustrated or described.

Figure 3:
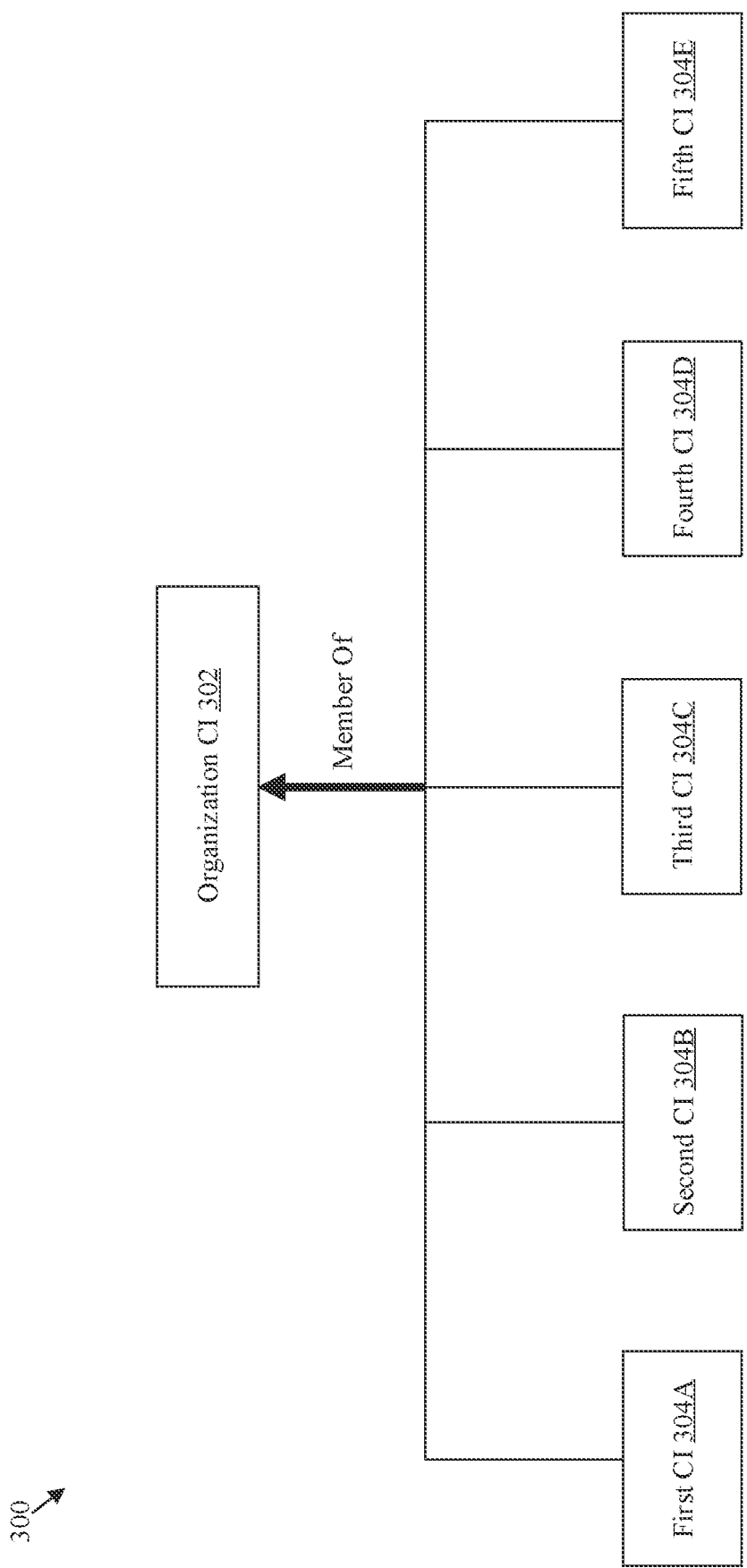
FIG. 3 is a diagram that illustrates an exemplary relationship between an organization configuration item (CI) and a set of configuration items (CIs), in accordance with example embodiments.

FIG. 3 is a diagram that illustrates an exemplary relationship between an organization configuration item (CI) and a set of configuration items (CIs), in accordance with example embodiments. With reference to FIG. 3, there is shown an organization configuration item 302 and a set of CI's associated with the set of service accounts. The set of CI's may include a first CI 304A, a second CI 304B, a third CI 304C, a fourth CI 304D, and a fifth CI 304E.

In accordance with FIG. 3, the first CI 304A may be associated with a first service account of the generated set of service accounts. The second CI 304B may be associated with a second service account of the generated set of service accounts. The third CI 304C may be associated with a third service account of the generated set of service accounts. The fourth CI 304D may be associated with a fourth service account of the generated set of service accounts and the fifth CI 304E may be associated with a fifth service account of the generated set of service accounts. Each of the set of CI's may include, but not limited to, a project name associated with the corresponding CI, a corresponding project identifier (ID) associated with the corresponding CI, and the received account ID.

The organization CI may be associated with the organization that may represented by the organization resource 104 and may include the organization ID and the organization name. Each of the set of CI's associated with the set of service accounts may include, but not limited to, the name of a corresponding project, the corresponding project ID, and the received set of credentials required to access the service account associated with the account ID.

The discovery computing system 202 may be further configured to determine a relationship between the generated organization CI and the set of CI's each of which is associated with the generated set of service accounts. Since the set of projects are child nodes of the organization in the remote computing system 206, therefore, each of the set of CI's (i.e. the second table) may be the 'members of' the organization CI (i.e. the first table). In some embodiments, the discovery computing system 202 may be configured to store the determined relationship, as the CI, in the persistent storage.

Figure 4:
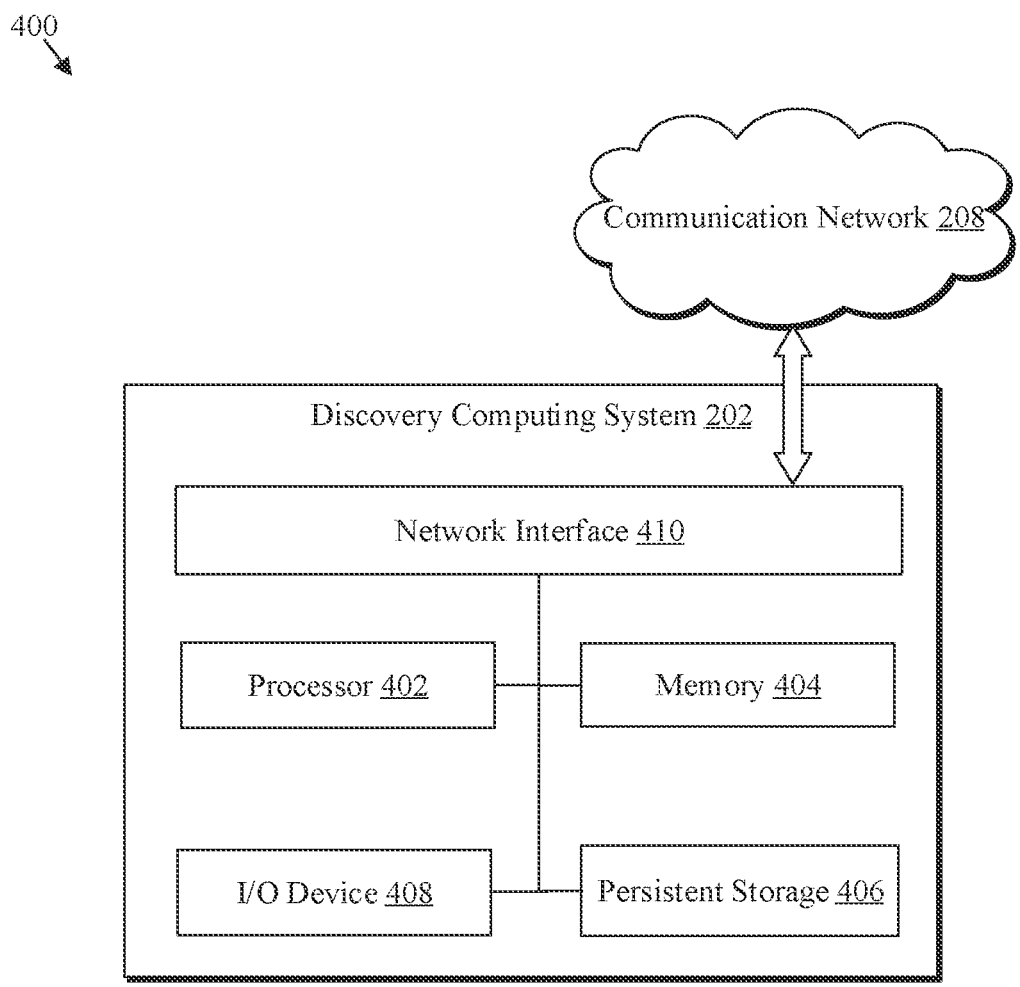
FIG. 4 is a block diagram of a discovery computing system for automatic discovery of cloud-based infrastructure and resources, in accordance with example embodiments.

FIG. 4 is a block diagram of a discovery computing system for automatic discovery of cloud-based infrastructure and resources, in accordance with example embodiments. FIG. 4 is explained in conjunction with elements from FIG. 1, FIG. 2, and FIG. 3. With reference to FIG. 4, there is shown a block diagram 400 of the discovery computing system 202. The discovery computing system 202 may include a processor 402, a memory 404, and a persistent storage 406. The discovery computing system 202 may further include an input/output (I/O) device 408, and a network interface 410.

The processor 402 may include suitable logic, circuitry, and/or interfaces that may be configured to execute program instructions associated with different operations to be executed by the discovery computing system 202. The processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 402 may include any number of processors configured to, individually or collectively, perform or direct performance of any number of operations of the discovery computing system 202, as described in the present disclosure.

In some embodiments, the processor 402 may be configured to interpret and/or execute program instructions and/or process data stored in the memory 404 and/or the persistent storage 406. In some embodiments, the processor 402 may fetch program instructions from the persistent storage 406 and load the program instructions in the memory 404. After the program instructions are loaded into memory 404, the processor 402 may execute the program instructions. Some of the examples of the processor 402 may be a GPU, a CPU, a RISC processor, an ASIC processor, a CISC processor, a co-processor, and/or a combination thereof.

The memory 404 may include suitable logic, circuitry, and/or interfaces that may be configured to store program instructions executable by the processor 402. In certain embodiments, the memory 404 may be configured to store the received account identifier and received data center information. The memory 404 may include computer-readable storage media for carrying or having computer-executable instructions or data structures stored thereon. Such computer-readable storage media may include any available media that may be accessed by a general-purpose or special-purpose computer, such as the processor 402.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations associated with the discovery computing system 202.

The persistent storage 406 may include suitable logic, circuitry, and/or interfaces that may be configured to store program instructions executable by the processor 402, operating systems, and/or application-specific information, such as logs and application-specific databases. The persistent storage 406 may be configured to store information, such as the generated set of service accounts, the organization information, the discovered resources and the relationship between the generated organization CI and the set of CIs. The persistent storage 406 may include computer-readable storage media for carrying or having computer-executable instructions or data structures stored thereon. Such computer-readable storage media may include any available media that may be accessed by a general-purpose or special-purpose computer, such as the processor 402.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations associated with the discovery computing system 202.

The I/O device 408 may include suitable logic, circuitry, interfaces, and/or code that may be configured to receive the account ID and the datacenter information. The I/O device 408 may be configured to publish the determined set of resources in the remote computing system 206. The I/O device 408 may include various input and output devices, which may be configured to communicate with the processor 402 and other components, such as the network interface 410. Examples of the input devices may include, but are not limited to, a touch screen, a keyboard, a mouse, a joystick, and/or a microphone. Examples of the output devices may include, but are not limited to, a display (such as a display device) and a speaker.

The network interface 410 may include suitable logic, circuitry, interfaces, and/or code that may be configured to establish a communication between the discovery computing system 202, the managed network 204, and the remote computing system 206, via the communication network 208. The network interface 410 may be implemented by use of various known technologies to support wired or wireless communication of the discovery computing system 202 via the communication network 208. The network interface 410 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 410 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the discovery computing system 202 without departing from the scope of the present disclosure. For example, in some embodiments, the discovery computing system 202 may include any number of other components that may not be explicitly illustrated or described.

Figure 5:
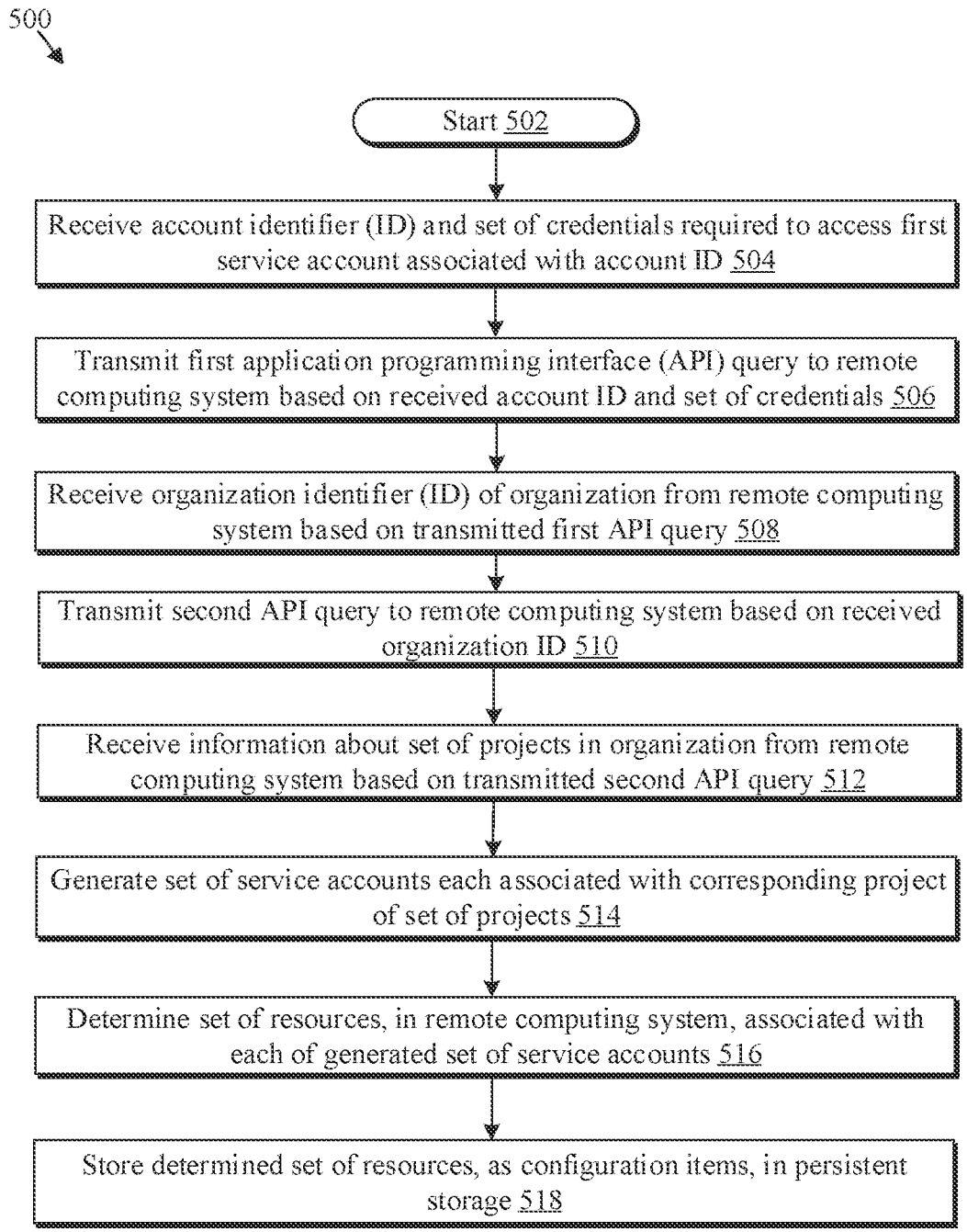
FIG. 5 is a flow chart that illustrates a method of automatic discovery of cloud-based infrastructure and resources, in accordance with example embodiments.

FIG. 5 is a flow chart that illustrates a method of automatic discovery of cloud-based infrastructure and resources, in accordance with example embodiments. FIG. 5 is explained in conjunction with elements from FIG. 1, FIG. 2, FIG. 3, and FIG. 4. With reference to FIG. 5, there is shown a flowchart 500. The exemplary method of flowchart 500 may be executed by any computing system, for example, the discovery computing system 202 of FIG. 2. The exemplary method of the flowchart 500 may start at 502 and proceed to 504.

At 504, an account identifier (ID) and a set of credentials required to access a first service account associated with the account ID may be received. The first service account may be associated with a project in an organization registered with the remote computing system 206. In one or more embodiments, the discovery computing system 202 may be configured to receive the account ID and the set of credentials required to access the first service account associated with the account ID. The first service account may be associated with the project in the organization registered with the remote computing system 206.

At 506, a first application programming interface (API) query may be transmitted to the remote computing system 206. The first API query may be transmitted based on the received account ID and the set of credentials. In one or more embodiments, the discovery computing system 202 may be configured to transmit the API query to the remote computing system 206 based on the received account ID and the set of credentials.

At 508, an organization identifier (ID) of the organization may be received from the remote computing system 206. The organization ID may be received from the remote computing system 206 based on the transmitted first API query. In one or more embodiments, the discovery computing system 202 may be configured to receive the organization ID of the organization from the remote computing system 206 based on the transmitted first API query.

At 510, a second API query may be transmitted to the remote computing system 206 based on the received organization ID. In one or more embodiments, the discovery computing system 202 may be configured to transmit the second API query to the remote computing system 206 based on the received organization ID.

At 512, information about a set of projects in the organization may be received from the remote computing system 206. The information about the set of projects may be received based on the transmitted second API query and the set of projects may include the project. In one or more embodiments, the discovery computing system 202 may be configured to receive the information about the set of projects in the organization from the remote computing system 206, based on the transmitted second API query wherein the set of projects includes the project.

At 514, a set of service accounts may be generated. Each of the set of service accounts may be associated with a corresponding project of the set of projects. In one or more embodiments, the discovery computing system 202 may be configured to generate the set of service accounts each associated with a corresponding project of the set of projects.

At 516, the set of resources in the remote computing system 206 may be determined. The set of resources may be associated with each of the generated set of service accounts. In one or more embodiments, the discovery computing system 202 may be configured to determine the set of resources, in the remote computing system 206, associated with each of the generated set of service accounts.

At 518, the determined set of resources may be stored as configuration items in the persistent storage. In one or more embodiments, the discovery computing system 202 may be configured to store the determined set of resources, as the configuration items, in the persistent storage.

Control may pass to end. Although the flowchart 500 is illustrated as discrete operations, such as 502, 504, 506, 508, 510, 512, 514, 516, and 518. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage medium configured to store computer-executable instructions that, in response to being executed, cause a system (such as the discovery computing system 202) to perform operations. The operations may include receiving an account identifier (ID) and a set of credentials required to access a first service account associated with the account ID. The first service account may be further associated with a project in an organization registered with a remote computing system (such as the remote computing system 206). The operations may further include transmit a first application programming interface (API) query to the remote computing system based on the received account ID and the set of credentials. The operations may further include receiving an organization identifier (ID) of the organization from the remote computing system based on the transmitted first API query. The operations may further include transmitting a second API query to the remote computing system based on the received organization ID. The operations may further include receiving information about a set of projects in the organization from the remote computing system based on the transmitted second API query. The set of projects may include the project. The operations may further include generating a set of service accounts each associated with a corresponding project of the set of projects. The operations may further include determining the set of resources, in the remote computing system, associated with each of the generated set of service accounts. The operations may further include storing the determined set of resources, as the configuration items, in the persistent storage.

License Management and Support:

With an advancement in the field of software development, many software applications are present in market. A software application is any program, or group of programs, that is designed for an end user and perform a specific task. Typically, an enterprise may license software and install the licensed software on various computing devices in the enterprise's managed network. A Licensed software is a proprietary software application that is distributed under a licensing agreement to authorized users. However, sometimes such installed licensed software creates some issues on the computing devices or may not perform the specific task due to a variety of reasons. Therefore, there is need for a system that can find a root cause for such issues related to the installed licensed software.

A third party may be configured to provide a license software application on behalf of a managed computer network. These software applications may include, but are not limited to, a database application, a word processing software application, a multimedia application, an education and reference application, a graphics application, a web browser application, a presentation application, a spreadsheet application, or a simulation application. The software applications may be open source applications or licensed applications. An open source application maybe a software application that may be distributed under a licensing agreement that may permit corresponding code to be shared and edited by parties other than the third party, whereas the licensed application may be a software application that may be distributed under the licensing agreement that may prohibit the code to be shared or edited by the parties other than the third party. The third party may the owner of the software application.

The software applications may be installed on various client devices, server devices, and virtual machines that may be present in the managed network. However, the installed software applications may cause issues, for a user, when installed on a corresponding client device. In some situations, the installed software applications may not work effectively on the corresponding client device. In some other situations, the installed software applications may crash regularly on the corresponding client device. These software applications may not work effectively due to one or more issues that may include, but are not limited to, compatibility issues, hardware issues, network issues, or licensing issues. The user of these software applications may not be able to solve the problem and therefore, may require support from the third party to fix the issues.

The third party may require information about the software application and the device (or devices on the managed network) on which the software application may be executed, in order to find the root cause of the issues and to further assist the user to fix the issues. The compilation of such information about the software application and the devices on which the software application is being executed, may be cumbersome and difficult for the user. The user may have to manually create and execute a set of queries to compile such information. The creation and execution of the set of queries may be time consuming and may also require technical expertise at the end of the user. Therefore, there may be need of a system that may be capable to assist the user to automatically compile the information (i.e. that may be further provided to the third party for assistance) or may be capable to assist the user to fix the issues.

Accordingly, a first example embodiment may involve a discovery computing system. The discovery computing system may be configured receive a first request from a first device of a managed network. The first device may be associated with at least one licensed application. The discovery computing system may be further configured to transmit a first operating system (OS) discovery command to each of one or more devices of the managed network based on the received first request. The discovery computing system may be further configured to receive a first operating system (OS) information from each of the one or more devices based on the transmitted first OS discovery command. The discovery computing system may be further configured to generate a first file based on the received first OS information. The discovery computing system may be further configured to transmit a first application discovery command to each of the one or more devices of the managed network. The discovery computing system may be further configured to receive first application information from each of the one or more devices based on the transmitted first application discovery command. The discovery computing system may further generate a first plurality of files based on the received first application information. The discovery computing system may be further configured to generate first output information based on the generated first file and the generated first plurality of files. The first output information may be generated for a first time instance. The discovery computing system may further transmit the generated first output information to the first device.

A large organization is a complex entity with many interrelated departments that may further have different projects. Some of these departments that are found across the organization are, but not limited to, a human resources (HR) department, a supply chain department, information technology (IT) department, a finance department, etc. However, each organization may have its own unique departments and projects that may provide essential capabilities and/or create competitive advantages.

To support widely-implemented projects in multiple departments, organizations typically use software applications, such as, but not limited to, customer relationship management (CRM) and human capital management (HCM) packages that may have a huge amount data associated with it. A large organization often has dozens or hundreds of these applications. Nonetheless, the advantages provided by the embodiments herein are not limited to large organizations and may be applicable to an organization, or any other type of enterprise, of any size.

Most of the times, the software applications are developed and maintained by one or more third parties. Such software application may be licensed by different users or computing devices of various enterprises or organization. In certain situations, these applications may not work efficiently in devices of the enterprise and may therefore create issues for the user of these applications. Some of the issues may have an impact only on the software application, whereas some of the issues may have impact on the device on which the software applications may be installed/executed. Examples of the issues may include, but are not limited to, device lag, application lag, inefficient utilization of device resources, or application crash.

To find a root cause of the issues and to fix the issues, the user of the application may consult the third party (i.e. the owner of the application). In some embodiments, the third parties may have a standard operating procedure that may require a ticket to be raised by the user of the licensed application, and further to be sent to the third party for any support or consultation. The ticket may need to be supported (or attached) with information (i.e. in a pre-defined format) about the software application and the corresponding devices on which the application may be executed. The third party may analyze the attached information to find the root cause and suggest different solutions to the user of the software applications. The solutions may include instructions to overcome the issues. In some embodiments, the third party may provide manually analyze the information received from the corresponding device installed with the software applications. In some other embodiments, the third party may use a tool/software application that may analyze the attached information to find the root cause and suggest the solution to the user of the software applications.

However, the manual compilation of the information (i.e. to be attached with the ticket) may be cumbersome and time consuming. In some embodiments, a set of queries may be required to be manually created and executed to extract and compile the information according to the pre-defined format. Therefore, a person with technical expertise may be required for the compilation of the information. Once the information may be compiled, the ticket may be raised to the third party for the solution. The third party may analyze the information and then provide a response to the user, including instructions to the fix the issues. In certain situations, the response from the third party may be delayed that may further cause huge financial loss to the user or the associated organization. Therefore, a system may be required that can automatically compile the information to be attached to the ticket and also provide a set of instructions or recommendations to fix the issues.

Figure 6:
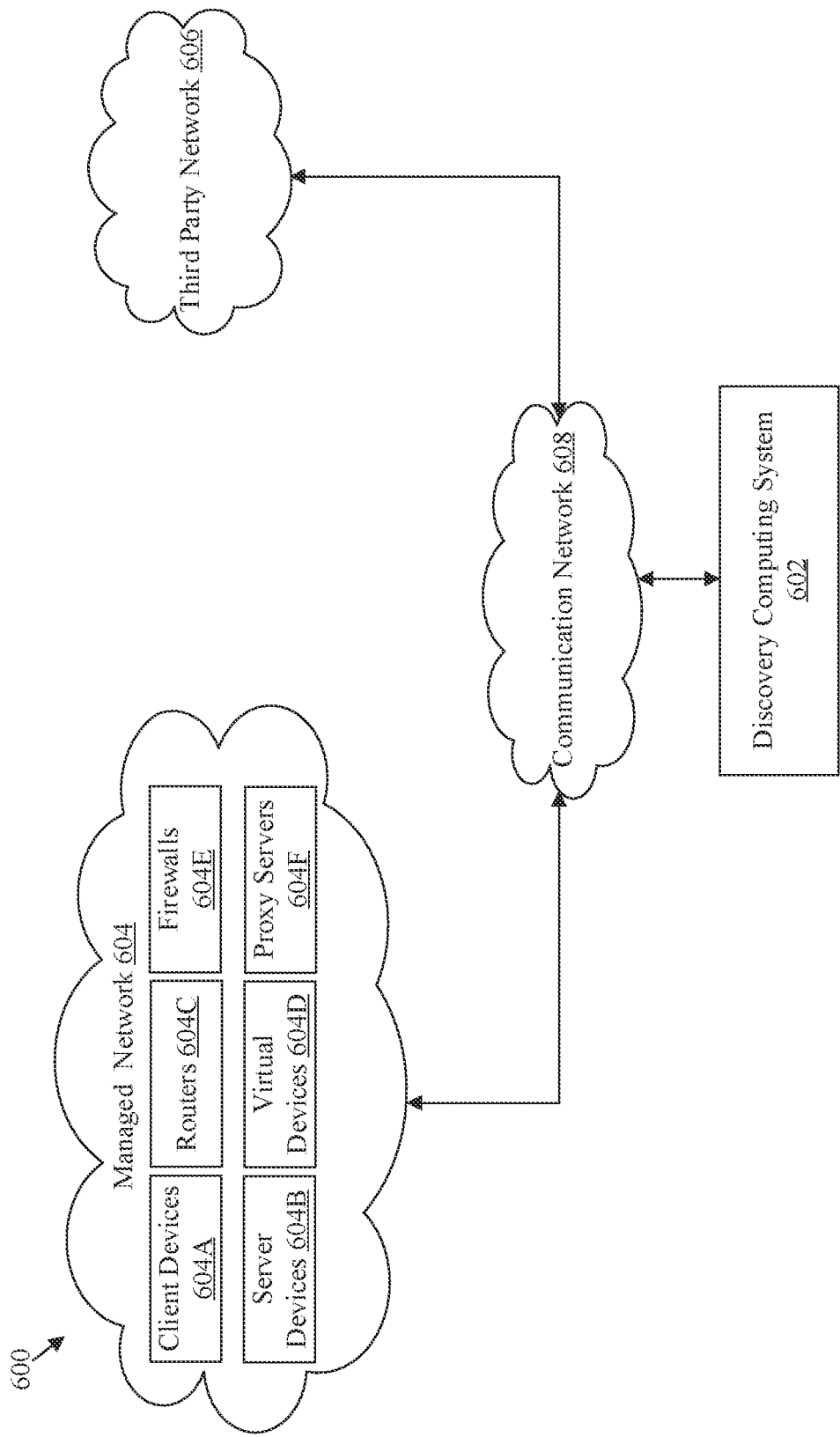
FIG. 6 illustrates a schematic drawing of a communication environment for license management and support, in accordance with example embodiments.

FIG. 6 illustrates a schematic drawing of a communication environment for license management and support, in accordance with example embodiments. With reference to FIG. 6, there is shown a communication environment 600. The communication environment 600 may include a discovery computing system 602, a managed network 604, and a third party network 606. The discovery computing system 602, the managed network 604, and the third party network 606 may communicate with each other via a communication network 608.

The discovery computing system 602 may include suitable code, logic, circuitry and/or interfaces that may be for license management and support. The discovery computing system 602 may be configured to receive a first request from a first device of the managed network 604. The first device may be associated with at least one licensed application (such as a database application). The discovery computing system 602 may be further configured to transmit a first operating system (OS) discovery command to each of one or more devices of the managed network 604 based on the received first request. The discovery computing system 602 may be further configured to receive a first operating system (OS) information from each of the one or more devices based on the transmitted first OS discovery command. The discovery computing system 602 may further generate a first file based on the received first OS information. The discovery computing system 602 may further transmit a first application discovery command to each of the one or more devices of the managed network 604. The discovery computing system 602 may further receive first application information from each of the one or more devices based on the transmitted first application discovery command and generate a first plurality of files based on the received first application information. The discovery computing system 602 may further generate first output information, for a first time instance, based on the generated first file and the generated first plurality of files and transmit the generated first output information to the first device.

The managed network 604 may be, for example, an enterprise network used by an entity for computing and communications tasks, as well as storage of data. Thus, managed network 604 may include various client devices 604A, server devices 604B, routers 604C, virtual machines 604D, firewalls 604E, and/or proxy servers 604F. The one or more devices of the managed network 604 may correspond to any of the client devices 604A, the server devices 604B, the routers 604C, the virtual machines 604D, the firewalls 604E, and/or the proxy servers 604F. The client devices 604A may be embodied by a computing system (such as the discovery computing system 602), the server devices 604B may be embodied by the computing system and the routers 604C may be any type of router, switch, or gateway.

The virtual machines 604D may be embodied by the computing system. In general, a virtual machine may be an emulation of the computing system, and may mimic functionality (e.g., processor, memory, and communication resources) of a physical computer. A single physical computing system may support up to thousands of individual virtual machines. In some embodiments, the virtual machines 604D may be managed by a centralized server device or application that facilitates allocation of physical computing resources to individual virtual machines, as well as performance and error reporting. In some embodiments, the enterprises often employ one or more virtual machines 604D in order to allocate computing resources in an efficient, as needed fashion.

The firewalls 604E may be one or more specialized routers or server devices that may protect the managed network 604 from unauthorized attempts to access the devices, applications, and services therein, while allowing authorized communication that may be initiated from the managed network 604. The firewalls 604E may also provide intrusion detection, web filtering, virus scanning, application-layer gateways, and other applications or services. In some embodiments, the managed network 604 may include one or more virtual private network (VPN) gateways with which it communicates with the third party network 606.

The managed network 604 may also include one or more proxy servers 604F. An embodiment of the proxy servers 604F may be a server device that facilitates communication and movement of data between the discovery computing system 602, the managed network 604, and the third party network 606. In particular, the proxy servers 604F may be able to establish and maintain secure communication sessions with one or more computational instances of the third party network 606. By way of such a session, the third party network 606 may be able to discover and manage aspects of the architecture and configuration of the managed network 604 and its components.

Firewalls, such as the firewalls 604E, typically deny all communication sessions that may be incoming by way of the communication network 608, unless such a session has been ultimately initiated from behind the firewalls 604E (i.e., from a device on the managed network 604) or the firewalls 604E have been explicitly configured to support the session. By placing the proxy servers 604F behind the firewalls 604E (e.g., within the managed network 604 and protected by the firewall 604E), the proxy servers 604F may be able to initiate these communication sessions through the firewalls 604E. Thus, the firewalls 604E might not have to be specifically configured to support the incoming sessions from the third party network 606, thereby avoiding potential security risks to the managed network 604.

In some embodiments, the managed network 604 may include a few devices and a small number of networks. In other deployments, the managed network 604 may span multiple physical locations and include hundreds of networks and hundreds of thousands of devices. Thus, the architecture depicted in FIG. 6 is capable of scaling up or down by orders of magnitude.

Furthermore, depending on the size, architecture, and connectivity of the managed network 604, a varying number of the proxy servers 604F may be deployed therein. For example, each one of the proxy servers 604F may be responsible for communicating with the third party network 606 regarding a portion of the managed network 604. Alternatively or additionally, sets of two or more proxy servers 604F may be assigned to such a portion of the managed network 604 for purposes of load balancing, redundancy, and/or high availability.

The third party network 606 may correspond to a network of an owner of the first licensed application of the plurality of software applications that may be executed on one or more devices of the managed network 604. In some embodiments, the third party network 606 may correspond to a network (or a set of devices) of an enterprise that may provide the license application, as a product, to a plurality of customers or to computing device included in the managed network 604. In some other embodiments, the third party network 606 may correspond to a network of one or more developers. In such a scenario, the one or more developers may be a person or a set of persons who may have developed and/or maintain the licensed application. In another embodiment, the third party network 606 may correspond to a network of a vendor or a sales firm who may sell the licensed application on behalf of the enterprise and/or one or more developers. In another embodiment, the third party network 606 may correspond to a network of a support staff who may provide technical support on the licensed application on behalf of the owner of the licensed application.

It should be noted that the communication between the discovery computing system 602, the managed network 604, and the third party network 606 may be performed via the communication network 608. The communication network 608 may include a communication medium through which the discovery computing system 602 may communicate with the managed network 604, and the third party network 606 and/or different devices (not shown). Examples of the communication network 608 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the communication environment 600 may be configured to connect to the communication network 608, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

In operation, the licensed application may be causing issues on the one or more devices of the managed network 604. In an embodiment, the issues may further cause a plurality of problems on the one or more devices. The plurality of problems may include, but not limited to, a device lag, a device hang, a device crash, an inefficient resource utilization, or a software application crash. These plurality of problems may occur at the one or more devices after the installation and/or during the execution of the licensed application on the one or more devices. The issue caused by the licensed application may be required to be fixed for smooth functionality of the licensed application and/or one or more devices of the managed network 604. To fix these issues or to know how to fix the issues, the customer or the user of the one or more devices on the managed network 604 may be required to raise a ticket which may be sent to a particular device of the third party network 606 for assistance. The ticket may be supported with one or more files that may contain information about the licensed application and/or information amount the devices on which the licensed application is being executed or installed. To automatically generate such one or more files to be attached with the ticket, the disclosed discovery computing system 602 may be used.

The discovery computing system 602 (i.e. that may include a discovery application or a discovery platform) may be configured to automatically perform a discovery process on the one or more devices of the managed network 604 to generate the files (i.e. information about the licensed software application or about the one or more devices) to be attached with the ticket which is to be provided to the third party network 606. Further, the disclosed computing system may be further configured to compare the files generated at different time instances to automatically determine the root causes of the issues and provide suggestive information including the solutions to resolve the issues.

To perform the discovery process, the disclosed discovery computing system 602 may be configured to receive a first request from a first device of the managed network 604. The first device may be associated with the licensed application. In another embodiment, the first request may correspond to a request for generation of one or more files (for example discovery files) to be attached with the ticket. In an embodiment, the first request may indicate the issue being faced at the first device on which the licensed application may be installed or running. In some embodiments, the first device may be installed with the discovery application which may receive the first request from a user of the first device, via a graphical user element (GUI) of the discovery application. In such case, the discovery computing system 602 may receive the first request from the discovery application installed on the first device of the managed network 604.

Based on the reception of the first request, the discovery computing system 602 may be configured to transmit a device discovery command to the managed network 604. The device discovery command may include instructions to probe each IP address in the specified range of IP addresses for open Transmission Control Protocol (TCP) and/or User Datagram Protocol (UDP) ports to determine the general type of devices in the managed network 604.

The discovery computing system 602 may further receive device information from the managed network 604 in response to the transmitted device discovery command. The device information may include information about a plurality of devices present in the managed network 604 that may be capable of executing the licensed application. In an embodiment, the discovery computing system 602 may determine the one or more devices (i.e. which may be associated with the licensed application) from the plurality of devices based on the received device information. The device information may also include information about open ports in each of the one or more devices. In an embodiment, the transmission of the device discovery command may be referred as IP based discovery performed by the disclosed discovery computing system 602.

The discovery computing system 602 may be further configured to transmit a first operating system (OS) discovery command to each of the one or more devices of the managed network 604 based on the received first request and the received device information. The first OS discovery command may be transmitted to each of the one or more devices of the managed network 604 to determine an operating system executing on each of the one or more devices. In some embodiments, the first OS discovery command may be transmitted to each of the one or more devices of the managed network 604 to determine system information about each of the one or more devices. The system information about each of the one or more devices may include, but is not limited to, memory information, processor information, or file system information of each of the one or more devices. In some embodiments, the system information may also include information about the operating system installed on the corresponding device.

In some embodiments, the discovery computing system 602 may determine a presence of open ports associated with each of the one or more devices indicated in the received device information. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®.

In some embodiments, the discovery computing system 602 may be configured to determine the system information about each of the one or more devices, based on transmission of probes to each of the one or more devices based on the determined operating system. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in a task list for the discovery computing system 602 to carry out. These tasks may result in discovery computing system 602 reading operating system version information, the memory information, and the processor information. For instance, if TCP port 22 is open, proxy servers may be instructed to initiate a Secure Shell (SSH) connection to the particular device and obtain information about the operating system thereon from particular locations in a file system. Based on such information, the operating system may be determined. As an example, a UNIX® device with TCP port 22 open may be classified as AIX®, HPUX, LINUX®, MACOS®, or SOLARIS®.

The discovery computing system 602 may be further configured to receive the first operating system (OS) information from each of the one or more devices of the managed network 604. The first OS information may include information about the determined operating system executing on each of the one or more devices and include information about the determined system information about each of the one or more devices. In some embodiments, the discovery of the operating system and the system information of each of the one or more devices may be referred to as an operating system discovery performed by the disclosed discovery computing system 602.

The discovery computing system 602 may be further configured to generate a first file based on the received first OS information. The generated first file may include information about the operating system installed on the one or more devices. In some embodiments, the first file may also include information about the determined system information. The details about the generated first file are provided, for example, in FIG. 7.

The discovery computing system 602 may be further configured to transmit a process discovery command to each of the one or more devices of the managed network 604 based on the generation of the first file. The process discovery command may be transmitted to each to the one or more devices to retrieve process information associated with each of the one or more devices. The process information may include information about a plurality of processes that may be executing or running on the operating system of each of the one or more devices of the managed network 604.

The discovery computing system 602 may be further configured to receive the process information from the one or more devices based on the transmitted process discovery command. The discovery computing system 602 may be further configured to determine the plurality of applications or process executing on each of the one or more devices based on the received process information. The plurality of applications may also include information about the licensed application which may be causing issues to be resolved or communicated to the third party.

The discovery computing system 602 may be further configured to transmit a first application discovery command to each of the one or more devices of the managed network 604 based on to the receipt of the process information. The first application discovery command may be transmitted to retrieve first application information (i.e. associated with the licensed application) from the one or more devices of the managed network 604.

The discovery computing system 602 may be further configured to receive the first application information from each of the one or more devices based on the transmitted first application discovery command. The first application information may be associated with the licensed application. The discovery computing system 602 may be further configured to generate a first plurality of files based on the received first application information. In some embodiments, the discovery computing system 602 may be configured bifurcate or parse the received first application information into the first plurality of files. The generated first plurality of files may include, but are not limited to, a user's file, an options file, a details file, a license file, an overview file, or a session file. Each of the first plurality of files may be associated with licensed application which may be creating issue at the first device or multiple devices of the managed network 604. The generated first plurality of files may be required to find a root cause of the issues caused by the licensed application on the one or more devices of the managed network 604. In other words, the first plurality of filed may be discovered from the managed network 604 for the issues indicated in the first request about the licensed applications. The combined information of the first plurality of files may be included in the first application information received from the one or more devices in response to the transmitted first application discovery command.

In accordance with an embodiment, the discovery computing system 602 may be further configured to generate first output information based on the generated first file and the generated first plurality of files. In an embodiment, the discovery computing system 602 may be configured to collate the generated first file (i.e. information about the operating system) and the generated first plurality of files (information about the licensed application or databases) to generate the first output information. The first output information may be generated for a first time instance. The first time instance may correspond to a timestamp (for example date and time) when the first file and the first plurality of files may be generated or discovered from the one or devices of the managed network 604. In an embodiment, the first output information may be combined file (for example a compressed file or an encrypted file) of the first file and/or the first plurality of files. The discovery computing system 602 may be further configured to transmit the generated first output information to the first device. In some embodiments, the generated first output information may be displayed on a graphical user interface (GUI) (for example in tabular form as shown in FIGS. 8A-8F) of the discovery application related to the discovery computing application. The generated first output information may be further available for download on the first device. In some other embodiments, the first output information may be stored in a persistent storage (shown in FIG. 10) associated with the discovery computing system 602.

In some embodiments, the generated first output information (including the first file and the first plurality of files) may correspond to the file that may be required to be attached with the ticket which is to be raised to the third party network 606. In some other embodiments, only the generated first plurality of files may correspond to the first output information that may be required to be attached with the ticket which is to be raised to the third party network 606. In some other embodiments, the discovery computing system 602 may store the generated first output information for comparison with second output information that may be generated or retrieve for a second time instance (different from the first time instance). The discovery computing system 602 may further generate diagnosis and suggestive information to resolve the issues based on the comparison. The details of the comparison are provided, for example, in FIG. 7.

It may be noted that each of the device discovery command, the first operating system (OS) discovery command, the process discovery command, and the first application discovery command described as one command is merely as an example. However, each of the device discovery command, the first operating system (OS) discovery command, the process discovery command, and the first application discovery command may include one or more commands (or instructions) transmitted to the one or more devices of the managed network 604 for discovery, without any deviation from the scope of the disclosure. By way of example and not limitation, the first operating system (OS) discovery command, the process discovery command, and the first application discovery command may correspond to an application programming interface (API) query (such as Representational State Transfer (REST) API query).

Figure 7:
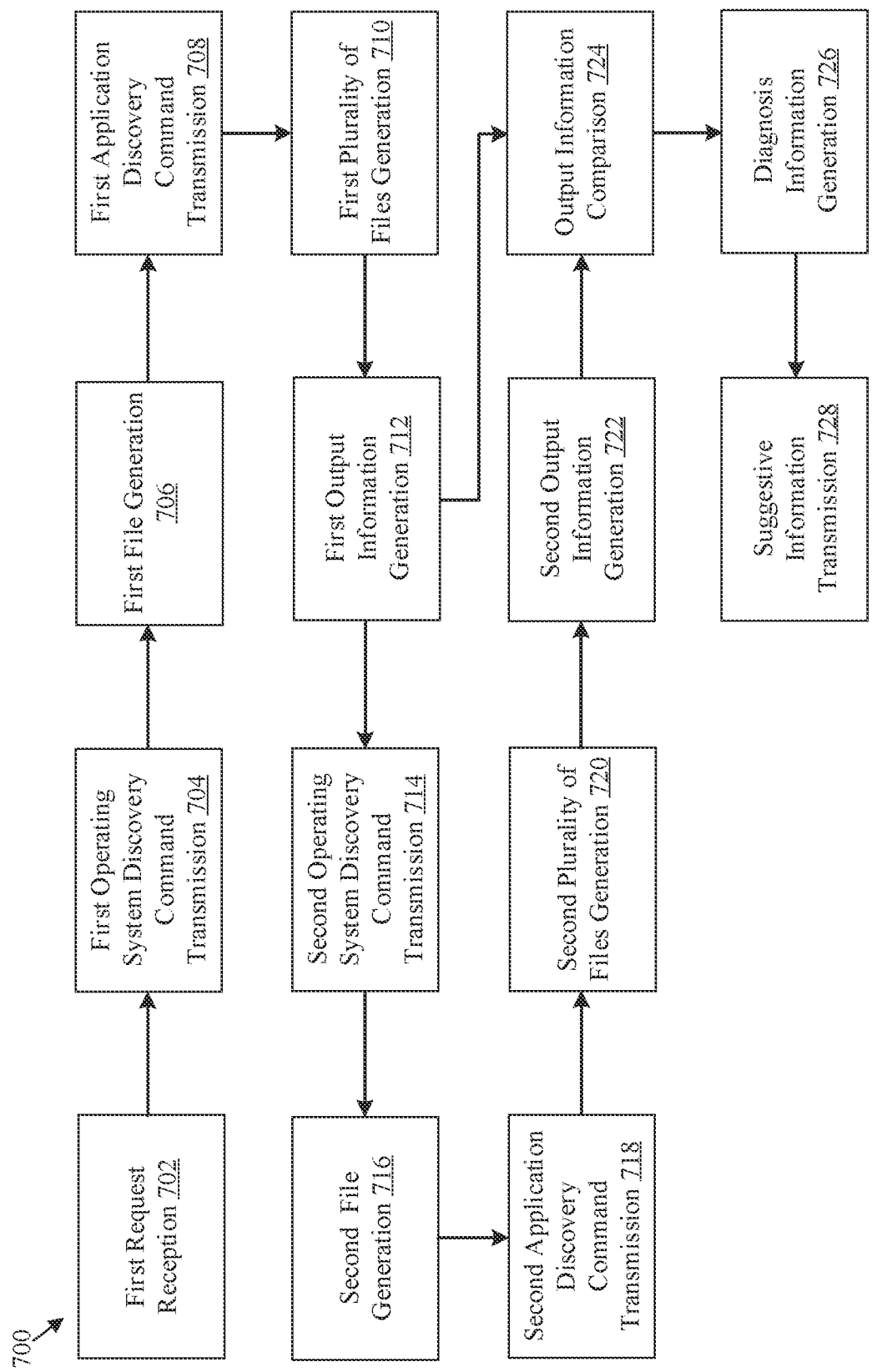
FIG. 7 depicts a block diagram that illustrates a set of operations for license management and support, in accordance with example embodiments.

FIG. 7 depicts a block diagram that illustrates a set of operations for license management and support, in accordance with example embodiments. FIG. 7 is explained in conjunction with elements from FIG. 6. With reference to FIG. 7, there is shown a set of exemplary operations 700. The exemplary operations illustrated in the block diagram may be performed by any device, apparatus, or computing system, such as by the discovery computing system 602 of FIG. 6 or by a processor (or circuitry) included in the discovery computing system 602.

At 702, a first request reception operation may be performed. In the first request reception operation, the discovery computing system 602 may be configured to receive a first request from a first device of the managed network 604. The first device may be associated with a licensed application or resources (for example ORACLE® Database) that may be owned by the third party. The details about the first request are provided, for example, in FIG. 6.

At 704, a first operating system (OS) discovery command transmission operation may be performed. In the first OS discovery command transmission operation, the discovery computing system 602 may be configured to transmit a first operating system (OS) discovery command to each of the one or more devices of the managed network 604. The first OS transmission operation may be performed after the IP based discovery. The details about the IP based discovery are provided, for example, in FIG. 6. In some embodiments, the first OS discovery command may be transmitted as a first application programming interface (API) query to each of the one or more devices. In some other embodiments, the first OS discovery command may include a first script that may be executed on each of the one or more devices. The first script, when executed, may extract the operating system information associated with the corresponding device. In some embodiments, the first script may also extract the system information about each of the one or more devices along with the operating system information for each of the one or more devices. The transmission of the first OS discovery command may be based on the received first request.

At 706, a first file generation operation may be performed. In the first file generation operation, the discovery computing system 602 may be configured to receive first operating system (OS) information from each of the one or more devices. The first operating system (OS) information may be received based on the transmitted first OS discovery command. The discovery computing system 602 may be further configured to generate a first file (for example a "ct_cpug" file) based on the received first OS information. The first file may include information about an operating system installed on each of the one or more devices. In some embodiments, the first file may also include system information such as, but not limited to, memory information, processor information, network information, kernel information, firmware information, process information, portioning information, virtualization information, resource information, paging space information, volume groups information or file system information of each of the one or more devices of the managed network 604. In some other embodiments, the system information may also include the information about the operating system installed on the corresponding device. As an example, the generated first file for a particular device may be presented below:

```
[BEGIN SCRIPT INFO]
Script Name=/tmp/sntmp/ct_cpuq.sh
Script Version=19.1
CT Version=
Script Command options=
Script Command shell=/usr/bin/ksh
Script Command user=ROOT
Script Start Time=07/03/2019 09:16 CDT
Script End Time=07/03/2019 09:17 CDT
[END SCRIPT INFO]
[BEGIN SYSTEM INFO]
Machine Name=tsti4604
Operating System Name=AIX
Operating System Release=5.3
System IP Address 1=161.173.48.29
+ uname -Mm
00C027524C00 IBM,9117-MMA
+ /usr/sbin/lsdev -Cc processor
proc0 Available 00-00 Processor
proc2 Available 00-02 Processor
proc4 Available 00-04 Processor
proc6 Available 00-06 Processor
proc8 Available 00-08 Processor
proc10 Available 00-10 Processor
proc12 Available 00-12 Processor
proc14 Available 00-14 Processor
+ /usr/sbin/prtconf
System Model: IBM,9117-MMA
Machine Serial Number: 0602752
Processor Type: PowerPC_POWER6
Processor Implementation Mode: POWER 6
Processor Version: PV_6_Compat
Number of Processors: 8
Processor Clock Speed: 4208 MHz
CPU Type: 64-bit
Kernel Type: 64-bit
LPAR Info: 15tsti4604
Memory Size: 27648 MB
Good Memory Size: 27648 MB
```

```
Platform Firmware level: EM350_085
Firmware Version: IBM,EM350_085
Console Login: enable
Auto Restart: true
Full Core: false
Network Information
 Host Name: tsti4604
 IP Address: 161.173.48.29
 Sub Netmask: 255.255.254.0
 Gateway: 161.173.48.1
 Name Server: 161.173.7.10
 Domain Name: wal-mart.com
Paging Space Information
 Total Paging Space: 8192MB
 Percent Used: 1%
Volume Groups Information
===================================================
=========
rootvg:
PV_NAME PV STATE TOTAL PPs FREE PPs FREE DISTRIBUTION
hdisk0 active 259 10 00..00..00..00..10
===================================================
=========
```

Installed Resource List
The following resources are installed on the machine.

```
+/- = Added or deleted from Resource List.
* = Diagnostic support not available.
Model Architecture: chrp
Model Implementation: Multiple Processor, PCI bus
+ sys0 System Object
+ sysplanar0 System Planar
* vio0 Virtual I/O Bus
* vscsi1 U9117.MMA.0602752-V15-C26-T1 Virtual SCSI Client Adapter
* vscsi0 U9117.MMA.0602752-V15-C25-T1 Virtual SCSI Client Adapter
* hdisk0 U9117.MMA.0602752-V15-C25-T1-L8100000000000000 Virtual SCSI Disk Drive
* ent2 U9117.MMA.0602752-V15-C2-T1 Virtual I/O Ethernet Adapter (l-lan)
* vsa0 U9117.MMA.0602752-V15-C0 LPAR Virtual Serial Adapter
* vty0 U9117.MMA.0602752-V15-C0-L0 Asynchronous Terminal
* lhea1 U789D.001.DQD84R7-P1 Logical Host Ethernet Adapter (l-hea)
+ ent1 U789D.001.DQD84R7-P1-C10-T4 Logical Host Ethernet Port (lp-hea)
* lhea0 U789D.001.DQD84R6-P1 Logical Host Ethernet Adapter (l-hea)
+ ent0 U789D.001.DQD84R6-P1-C10-T4 Logical Host Ethernet Port (lp-hea)
+ L2cache0 L2 Cache
+ mem0 Memory
+ proc0 Processor
+ proc2 Processor
+ proc4 Processor
+ proc6 Processor
+ proc8 Processor
+ proc10 Processor
+ proc12 Processor
+ proc14 Processor
+ /usr/bin/lparstat -i
Node Name : tsti4604
Partition Name : tsti4604
Partition Number : 15
Type : Shared-SMT
Mode : Uncapped
Entitled Capacity : 1.00
Partition Group-ID : 32783
Shared Pool ID : 0
Online Virtual CPUs : 8
Maximum Virtual CPUs : 16
Minimum Virtual CPUs : 1
Online Memory : 27648 MB
Maximum Memory : 30720 MB
Minimum Memory : 1024 MB
Variable Capacity Weight: 1
Minimum Capacity : 0.50
Maximum Capacity : 8.00
Capacity Increment: 0.01
Maximum Physical CPUs in system : 16
Active Physical CPUs in system : 16
Active CPUs in Pool : 16
```

```
Shared Physical CPUs in system : 16
Maximum Capacity of Pool : 1600
Entitled Capacity of Pool : 1050
Unallocated Capacity : 0.00
Physical CPU Percentage : 12.50%
Unallocated Weight: 0
Desired Virtual CPUs : 8
Desired Memory : 27648 MB
Desired Variable Capacity Weight: 1
Desired Capacity : 1.00
+ /usr/bin/errpt -a -J CLIENT_PMIG_STARTED,CLIENT_PMIG_DONE
+ tee /tmp/oramsgfile.766020
+ /usr/bin/ls -l /tmp/oramsgfile.766020
-rw-r--r-- 1 root system 0 Jul 03 09:17 /tmp/oramsgfile.766020
+ /usr/sbin/lsattr -EH -l proc0
attribute value description user_settable
frequency 4208000000 Processor Speed False
smt_enabled true Processor SMT enabled False
smt_threads 2 Processor SMT threads False
state enable Processor state False
type PowerPC_POWER6 Processor type False
+ /usr/sbin/lsattr -EH -l proc2
attribute value description user_settable
frequency 4208000000 Processor Speed False
smt_enabled true Processor SMT enabled False
smt_threads 2 Processor SMT threads False
state enable Processor state False
type PowerPC_POWER6 Processor type False
+ /usr/sbin/lsattr -EH -l proc4
attribute value description user_settable
frequency 4208000000 Processor Speed False
smt_enabled true Processor SMT enabled False
smt_threads 2 Processor SMT threads False
state enable Processor state False
type PowerPC_POWER6 Processor type False
+ /usr/sbin/lsattr -EH -l proc6
attribute value description user_settable
frequency 4208000000 Processor Speed False
smt_enabled true Processor SMT enabled False
smt_threads 2 Processor SMT threads False
state enable Processor state False
type PowerPC_POWER6 Processor type False
+ /usr/sbin/lsattr -EH -l proc8
attribute value description user_settable
frequency 4208000000 Processor Speed False
smt_enabled true Processor SMT enabled False
smt_threads 2 Processor SMT threads False
state enable Processor state False
type PowerPC_POWER6 Processor type False
+ /usr/sbin/lsattr -EH -l proc 10
attribute value description user_settable
frequency 4208000000 Processor Speed False
smt_enabled true Processor SMT enabled False
smt_threads 2 Processor SMT threads False
state enable Processor state False
type PowerPC_POWER6 Processor type False
+ /usr/sbin/lsattr -EH -l proc 12
attribute value description user_settable
frequency 4208000000 Processor Speed False
smt_enabled true Processor SMT enabled False
smt_threads 2 Processor SMT threads False
state enable Processor state False
type PowerPC_POWER6 Processor type False
+ /usr/sbin/lsattr -EH -l proc 14
attribute value description user_settable
frequency 4208000000 Processor Speed False
smt_enabled true Processor SMT enabled False
smt_threads 2 Processor SMT threads False
state enable Processor state False
type PowerPC_POWER6 Processor type False
+ /usr/sbin/smtctl
This system is SMT capable.
SMT is currently enabled.
SMT boot mode is not set.
SMT threads are bound to the same virtual processor.
proc0 has 2 SMT threads.
Bind processor 0 is bound with proc0
Bind processor 1 is bound with proc0
proc2 has 2 SMT threads.
```

```
Bind processor 2 is bound with proc2
Bind processor 3 is bound with proc2
proc4 has 2 SMT threads.
Bind processor 4 is bound with proc4
Bind processor 5 is bound with proc4
proc6 has 2 SMT threads.
Bind processor 6 is bound with proc6
Bind processor 7 is bound with proc6
proc8 has 2 SMT threads.
Bind processor 8 is bound with proc8
Bind processor 9 is bound with proc8
proc10 has 2 SMT threads.
Bind processor 10 is bound with proc10
Bind processor 11 is bound with proc10
proc12 has 2 SMT threads.
Bind processor 12 is bound with proc12
Bind processor 13 is bound with proc12
proc14 has 2 SMT threads.
Bind processor 14 is bound with proc14
Bind processor 15 is bound with proc14
4294967295 0
[END SYSTEM INFO]
```

At 708, a first application discovery command transmission operation may be performed. In the first application discovery command transmission operation, the discovery computing system 602 may be configured to transmit a first application discovery command to each of the one or more devices of the managed network 604. The first application discovery command transmission operation may be performed after the transmission of the device discovery command, the first OS discovery command, and the process discovery command (as described, for example, in FIG. 6). Specifically, the first application discovery command may be transmitted based on the received OS information and the received process information. In some embodiments, the first application discovery command may be transmitted as a second API query to each of the one or more devices. In some other embodiments, the first application discovery command may include a second script that may be executed on each of the one or more devices. The second script, when executed, may extract the first application information associated with the corresponding device.

At 710, a first plurality of files generation operation may be performed. In the first plurality of files generation operation, the discovery computing system 602 may be configured to receive first application information from each of the one or more devices. The first application information may be associated with the licensed software application which may be creating issues at the first device or various devices of the managed network 604. As an example, the licensed application may be, but not limited to, the ORACLE® Database. The first application information may be received based on the transmitted first application discovery command. The discovery computing system 602 may further generate the first plurality of files based on the received first application information. The discovery computing system 602 may format or parse the received first application information to generate the first plurality of files. In some embodiments, the discovery computing system 602 may execute a third script on the received first application information to generate the first plurality of files. It may be noted that the first script, the second script, and the third script may correspond to or written in different programming languages and/or may depend on different factors, such as (but not limited to) operating system, database, or computing platform, without any deviation from the scope of the disclosure.

With reference to the example, the generated first plurality of files may include, but are not limited to, a users file, an options file, a details file, a license file, an overview file, and a session file. Each of the first plurality of files may be formatted in a pre-defined format (such as in a csv format) and associated with the licensed application (for example ORACLE® Database) hosted on the one or more devices of the managed network 604. In an embodiment, each of the formatted first plurality of files may be attached with the ticket to be raised to the third party network 606. An exemplary information in different fields of each of the users files, the options file, the details file, the license file, the overview file, and the session file are illustrated in FIGS. 8A, 8B, 8C, 8D, 8E, and 8F, respectively.

At 712, a first output information generation operation may be performed. In the first output information generation, the discovery computing system 602 may be configured to generate first output information associated with the licensed application (for example ORACLE® Database). The first output information may be generated based on the generated first file and/or the generated first plurality of files. In some embodiments, the generated first file and the generated first plurality of files may be combined to generate the first output information. The file output information may a combined compressed or encrypted file including the first file (indicating discovered operating system information) and the first plurality of files (indicating information about the licensed applications and corresponding devices). The first output information may be generated for a first time instance (say T1). In some embodiments, the generated first output information may also include a timestamp (date-time) of the first time instance at which the first file and the first plurality of files are generated or extracted from the one or more devices or the managed network 604.

In some embodiments, the generated first output information may be transmitted to the first device. In some other embodiments, the generated first output information may be stored in the persistent storage (for example a memory) associated with the discovery computing system 602. The generated first output information, stored in the persistent storage, may be associated with a relevant licensed application (such as ORACLE® DB) instance Configuration Item (CI).

At 714, a second operating system (OS) discovery command transmission operation may be performed. In the second operating system discovery command transmission operation, the discovery computing system 602 may be configured to receive a second request from the first device of the managed network 604. The second request may be similar to the first request but received at different time instance. The second request may indicate a request from the user of the first device (or different device) to extract or discovery information about the one or more device associated with the licensed application (with issues) at different time instance. The extracted information based on the second request may be used to determine the root cause of the issue of the licensed applications based on the comparison between the information extracted at the first time instance and the second time instance.

The discovery computing system 602 may be further configured transmit a second operating system discovery command to each of the one or more devices of the managed network 604 based on the received second request. In some embodiments, the discovery computing system 602 may transmit the second operating system discovery command to each of the one or more devices based on the received first request. In some embodiments, the second OS discovery command may be transmitted as the first API query to each of the one or more devices. In some other embodiments, the second OS discovery command may include the first script that may be executed on each of the one or more devices at a second time instance (T2), that may be different from the first time instance. For example, the second time instance may be after few hours, few days, few weeks, or few months, than the first time instance. In another example, the second time instance may be earlier than the first time instance. The first script mentioned as the second operating system discovery command, when executed, may extract the operating system information associated with the corresponding device. Based on the execution of the first script based on the second request, the discovery computing system 602 may receive the second operating system (OS) information which may be similar to the first operating system (OS) information as descried, for example, at 706 in FIG. 7.

At 716, a second file generation operation may be performed. In the second file generation operation, the discovery computing system 602 may be configured to receive the second operating system (OS) information from each of the one or more devices. The second operating system (OS) information may be received based on the transmitted second operating system discovery command. The discovery computing system 602 may be further configured to generate a second file based on the received second operating system (OS) information for the second time instance. The second file may include information about the operating system installed on each of the one or more devices at the second time instance. In some embodiments, the second file may also include system information such as, but not limited to, but is not limited to, memory information, processor information, network information, kernel information, firmware information, process information, portioning information, virtualization information, resource information, paging space information, volume groups information or file system information of each of the one or more devices. In some embodiments, the second file may be same or different from the first file generated at the first time instance. For example, information such as the processor information or the memory information may be different in the first file (described at the 706 in FIG. 7) and the second file.

At 718, a second application discovery command transmission operation may be performed. In the second application discovery command transmission operation, the discovery computing system 602 may be configured to transmit a second application discovery command to each of the one or more devices of the managed network 604 for the second time instance. In some embodiments, the second application discovery command may be transmitted as the second API query to each of the one or more devices for the second time instance. In some other embodiments, the second application discovery command may include the second script that may be executed on each of the one or more devices. The second script, when executed, may extract second application information associated with the corresponding device for the second time instance. The second application information may be same or different the first application information (as described, at 708 in FIG. 7).

At 720, a second plurality of files generation operation may be performed. In the second plurality of files generation operation, the discovery computing system 602 may be configured to receive the second application information from each of the one or more devices for the second time instance. The second application information may be associated with the licensed application (such as the ORACLE® Database). The second application information may be received based on the transmitted second application discovery command. The discovery computing system 602 may further generate the second plurality of files based on the received second application information. The discovery computing system 602 may format the received second application information to generate the second plurality of files. In some embodiments, the discovery computing system 602 may execute the third script on the received second application information to generate the second plurality of files.

In some embodiments, the second plurality of files may be already stored in the memory or the persistent storage related to the discovery computing system 602. In such case, the second plurality of files may be generated prior (for example few hours, days, week, or months) than the first plurality of files, and stored in the memory or the persistent storage. For example, the second time instance may be prior to the first time instance. Further, the discovery computing system 602 may be configured to retrieve the second file and the second plurality of files from the memory or the persistent storage. In other words, the discovery computing system 602 may be configured to retrieve the stored second operating system (OS) information and the stored second application information which may be discovered from the one or more device of the managed network 604 for the second time instance. The second file and the second plurality of files may be further generated from the retrieved second operating system (OS) information and the stored second application information.

At 722, a second output information generation operation may be performed. In the second output information generation, the discovery computing system 602 may be configured to generate second output information associated with the licensed application (for example ORACLE® Database). The second output information may be generated based on the generated (or retrieved) second file and the generated (or retrieved) second plurality of files. In some embodiments, the generated second file and/or the generated second plurality of files may be combined to generate the second output information. In other words, the second output information may be generated based on the combination of the retrieved second operating system (OS) information and the second application information. The second output information may be generated for the second time instance (T2). In an embodiment, the second output information may be combined file (for example a compressed file or an encrypted file) of the second file and the second plurality of files. In an embodiment, the second output information may only include the second plurality of files. In some embodiments, the generated second output information may also include a timestamp (date time) of the second time instance. The fields of the second plurality of files may be same as the first plurality of files shown in Tables 3-8. However, the data or the information extracted in at least one of the second plurality of files may be different from the data or the information extracted in at least one of the first plurality of files because in both the first plurality of files and the second plurality of files, the information about the licensed applications is extracted (or discovered) at different time instances. For example, the different information in the first plurality of files and the second plurality of files may include, but is not limited, number of physical cores, utilized memory capacity, number of sessions, number of users, partition method, physical machines, socket capacity, packs agreed, packs granted, number of applications deployed, number of active sessions, or number of users defined.

At 724, an output information comparison operation may be performed. In the output information comparison operation, the discovery computing system 602 may be configured to compare the first output information generated for the first time instance (T1) (at 712 in FIG. 7) with the second output information generated for the second time instance (T2) (at 722 in FIG. 7). The discovery computing system 602 may be configured to compare values or information of each field of the generated first output information (including first file and/or the first plurality of files) and the generated second output information (including second file and/or the second plurality of files) as shown in Tables 3-8.

At 726, diagnosis information generation operation may be performed. In the diagnosis information generation operation, the discovery computing system 602 may be configured to generate diagnosis information based on the comparison of corresponding fields of the first plurality of files (i.e. discovered for the first time instance) and the second plurality of files (i.e. discovered for the second time instance). The generated diagnosis information may include one or more changes in the values of the fields in the generated second output information from the values of the fields in the generated first output information. The details about the diagnosis information are provided, for example, in FIG. 9.

At 728, suggestive information transmission operation may be performed. In the suggestive information transmission operation, the discovery computing system 602 may be configured to generate suggestive information that may fix the issues caused in the licensed application (for example ORACLE® Database) based on the determined diagnosis information, and further transmit the generated suggestive information to the first device. The details about the suggestive information are provided, for example, in FIG. 9.

Although illustrated with discrete blocks, the exemplary operations associated with one or more blocks of the block diagram may be divided into additional blocks, combined into fewer blocks, or eliminated, depending on the particular implementation.

FIGS. 8A-8F collectively illustrate exemplary information in a plurality of files generated based on application discovery command, in accordance with example embodiments. With reference to FIGS. 8A-8F, there is shown a user's file 800A, an options file 800B, a details file 800C, a license file 800D, an overview file 800E, and a session file 800F, respectively.

The users file 800A, shown in FIG. 8A, may include information about all the users of the licensed application (for example ORACLE® Database) installed on the one or more devices of the managed network 604. The users files 800A may include a plurality of fields. Each of the plurality of fields and the corresponding description of the users file 800A is provided in Table 3 as follows:

TABLE 3

Fields and definition of fields of Users File

| FIELD | DESCRIPTION |
| --- | --- |
| USERNAME | Name of the user |
| USER_ID | ID number of the user |
| DEFAULT_TABLESPACE | Default tablespace for data |
| TEMPORARY_TABLESPACE | Name of the default tablespace for temporary tables or the name of a tablespace group |
| CREATED | User account creation date |
| PROFILE | User resource profile name |
| EXPIRY_DATE | Date of expiration of the user account |
| ACCOUNT_STATUS | Status of the user account |
| COMMON | Indicates whether a given user is common |
| LAST_LOGIN | The time of the last user login |
| MACHINE_ID | Name of device |
| DB_NAME | Instance Name |
| TIMESTAMP | The timestamp of creation of table. |

The options file 800B, shown in FIG. 8B, may include information about all the licensed applications (for example ORACLE® Databases). The options files 800B may include a plurality of fields. Each of the plurality of fields and the corresponding description of the options file 800B is provided in Table 4 as follows:

TABLE 4

Fields and definition of fields in Options File

| FIELD | DESCRIPTION |
| --- | --- |
| MACHINE_ID | Name of device |
| DB_NAME | Instance Name |
| TIMESTAMP | The timestamp of insertion in table. |
| HOST_NAME | Device Name |
| INSTANCE_NAME | Instance Name |
| OPTION_NAME | The database option name |
| OPTION_QUERY | The query to get information from option table |
| SQL_ERR_CODE | Error Code, if retrieved |
| SQL_ERR_MESSAGE | Error Message, if retrieved |
| COL010 | Placeholder Column Name |
| COL020 | Placeholder Column Name |
| COL030 | Placeholder Column Name |
| COL040 | Placeholder Column Name |
| COL050 | Placeholder Column Name |
| COL060 | Placeholder Column Name |
| COL070 | Placeholder Column Name |
| COL080 | Placeholder Column Name |
| COL090 | Placeholder Column Name |
| COL100 | Placeholder Column Name |
| COL110 | Placeholder Column Name |
| COL120 | Placeholder Column Name |
| COL130 | Placeholder Column Name |
| COL140 | Placeholder Column Name |
| COL150 | Placeholder Column Name |
| COL160 | Placeholder Column Name |
| COL170 | Placeholder Column Name |
| COL180 | Placeholder Column Name |

The details file 800C, shown in FIG. 8C, may include information about all the instances of the licensed application (for example ORACLE® Database) running on a particular machine or device. The details files 800C may include a plurality of fields. Each of the plurality of fields and the corresponding description of the details file 800C is provided in Table 5 as follows:

TABLE 5

Fields and definition of fields in Details File

| FIELD | DESCRIPTION |
|---|---|
| RL_SCRIPT_VERSION | Version of script to collect information |
| TIMESTAMP | Timestamp of collection |
| MACHINE_ID | Name of device |
| VMACHINE_ID | ID of Virtual Machine |
| BANNER | Logo of the machine |
| DB_NAME | Instance Name |
| USER_COUNT | Number of users defined on the instance |
| SERVER_MANUFACTURER | Manufacturer of the server |
| SERVER_MODEL | Model of the server |
| OPERATING_SYSTEM | Operating system of the server, the Database Instance is running on (for example Windows, Linux) |
| SOCKETS_POPULATED_PHYS | Number of sockets defined |
| TOTAL_PHYSICAL_CORES | Number of cores on device |
| PROCESSOR_IDENTIFIER | Identifier of a processor |
| PROCESSOR_SPEED | Speed of the processor |
| TOTAL_LOGICAL_CORES | Total logical cores defined |
| PARTITIONING_METHOD | Type of partition |
| DB_ROLE | Type of Database |
| INSTALL_DATE | Date of installation |

The license file 800D, shown in FIG. 8D, may include information about the license limits of the licensed application (for example ORACLE® Database). The license file 800D may include a plurality of fields. Each of the plurality of fields and the corresponding description of the license file 800D is provided in Table 6 as follows:

TABLE 6

Fields and definition of fields in License File

| FIELD | DESCRIPTION |
|---|---|
| SESSIONS_MAX | Maximum number of concurrent user sessions allowed for the instance |
| SESSIONS_WARNING | Warning limit for concurrent user sessions for the instance |
| SESSIONS_CURRENT | Current number of concurrent user sessions |
| SESSIONS_HIGHWATER | Highest number of concurrent user sessions since the instance started |
| CPU_COUNT_CURRENT | Current number of logical CPUs or processors on the device |
| CPU_COUNT_HIGHWATER | Highest number of logical CPUs or processors on the device since the instance started |
| USERS_MAX | Maximum number of named users allowed for the database |
| MACHINE_ID | Name of device |
| DB_NAME | Name of instance |
| TIMESTAMP | Timestamp of insertion of the above fields in the table |

The overview file 800E, shown in FIG. 8E, may include information or overview about the machine or device on which the licensed application (for example ORACLE® Database) may be installed. The overview file 800E may include a plurality of fields. Each of the plurality of fields and the corresponding description of the overview file 800E is provided in Table 7 as follows:

TABLE 7

Fields and definition of fields in Overview File

| FIELD | DESCRIPTION |
|---|---|
| HOST_NAME | Device name |
| GROUP | Assigned Group that own the device |
| AGGREGATION_LEVEL | OS Patch info |
| ORACLE_CSI | Oracle Customer Support Identifier Number |
| ORACLE_PRODUCT_CATEGORY | Category of the Oracle Product |
| PHYSICAL_MACH_ID | ID of the device |
| VISTUAL_MACH_ID | Virtual ID of the device |
| DATABASE_EDITION | Edition of the Database |
| LICENSE_METRIC | License |
| DATABASE_NAME | Name of the database |
| PDB_NAME | Pluggable database name |
| VERSION | Version of the Database |
| OPTIONS_INSTALLED | Installed Database Options |
| OPTIONS_IN_USE | Options in use |
| PACKS_GRANTED | Deployed Packs |
| PACKS_AGREED | Approved Packs |
| APPLICATION | Name of the Application |
| ENVIRONMENT_USAGE | ENV Type |
| USER_COUNT_DBA_USERS | Number of database users |
| USER_COUNT_APPLICATION | Number of Applications Deployed |
| SERVER_MANUFACTURER | Manufacturer of the server |
| SERVER_MODEL | Model of the server |
| OPERATING_SYSTEM | Name of Operating System |
| SOCKETS_POPULATED_PHYSICAL | Populated Socket Number |
| TOTAL_PHYSICAL_CORES | Number of Cores |
| PROCESSOR_IDENTIFIER | Identifier of the processor |
| PROCESSOR_SPEED | Speed of the Processor |
| SOCKET_CAPACITY_PHYSICAL | Socket Properties |
| TOTAL_LOGICAL_CORES | Number of Logical Cores |
| PARTITIONING_METHOD | Partition Type |
| PRIMARY_DATABASE | Whether Database is Primary? |
| SESSIONS | Number of Active Sessions |
| INSTANCE_SESSIONS_HIGHWATER | High Session Number |
| INSTALL_DATE | Install Date |
| MEASUREMENT_COMMENT | Comments |
| TIMESTAMP | Time of Insertion of the above fields in the table |

The session file 800F, shown in FIG. 8F, may include session information for each current session of the licensed application (for example ORACLE® Database). The session file 800F may include a plurality of fields. Each of the plurality of fields and the corresponding description of the session file 800F is provided in Table 8 as follows:

TABLE 8

Fields and definition of fields in Session File

| FIELD | DESCRIPTION |
|---|---|
| SADDR | Session address |
| SID | Session identifier |
| PADDR | Address of process that owns the session |
| USER# | Oracle user identifier |
| USERNAME | Oracle username |
| COMMAND | Command in progress (last statement parsed) |
| STATUS | Status of the session |
| SERVER | Server type (DEDICATED| SHARED| PSEUDO| NONE) |
| SCHEMANAME | Schema username |
| OSUSER | Operating system client username |
| PROCESS | Operating system client process ID |
| MACHINE | Operating system machine name |
| TERMINAL | Operating system terminal name |
| PROGRAM | Operating system program name |

TABLE 8-continued

Fields and definition of fields in Session File

| FIELD | DESCRIPTION |
|---|---|
| TYPE | Session type |
| LAST_CALL_ET | If the session STATUS is currently ACTIVE, then the value represents the elapsed time in seconds since the session has become active. If the session STATUS is currently INACTIVE, then the value represents the elapsed time in seconds since the session has become inactive. |
| LOGON_TIME | Time of logon |
| MACHINE_ID | Name of device |
| DB_NAME | Name of Instance |
| TIMESTAMP | Time of Insertion of the above fields in the table |

Figure 9:
FIG. 9 is a diagram that illustrates diagnosis information, in accordance with example embodiments.

FIG. 9 is a diagram that illustrates diagnosis information, in accordance with example embodiments. FIG. 9 is explained in conjunction with elements from FIG. 6, FIG. 7, and FIGS. 8A-8F. With reference to FIG. 9, there is shown a table 900 that may represent diagnosis information. The table 900 may include a 'file' column 902, a 'field' column 904, a 'value in first output information' column 906, a 'value in second output information' column 908, and a 'change' column 910.

The discovery computing system 602 may be configured to generate the diagnosis information based on the comparison of corresponding fields of the first plurality of files (i.e. discovered for the first time instance) and the second plurality of files (i.e. discovered for the second time instance). The generated diagnosis information may include one or more changes in the values of fields in the generated second output information from the values of fields in the generated first output information. The diagnosis information may indicate what values or information in different fields are changed between the first plurality of files and the second plurality of files which may have caused the issue in the licensed application installed on the one or more devices of the managed network 604.

With reference to the Table 900 shown in FIG. 9, for example, the discovery computing system 602 may determine that the total number of physical cores (i.e. allocated to the one or more devices to execute the licensed application) have reduced from "8" to "5" in the details file 800C of the 'file' column 902 and the speed of the processor has decreased to '5 GHz' to '4 GHz' in the Overview file 800E of the 'file' column 902 which may be the root cause for the issue included in the first request received from the first device. As another example, the account status in the users file 800A may have changed from 'Open' to 'Expired' which may be the root cause that a user may not be able to access the database. Similarly, as another example, the maximum number of named users allowed for the database may have decreased to '30' from '35' in the License file 800D which may be the root cause for the issue included in the first request received from the first device. Therefore, the discovery computing system 602 may compare (or track) each filed of the first plurality of files (i.e. generated at the first time instance) with the corresponding field of the respective file of the second plurality of files (i.e. generated at the first time instance), to automatically determine what is the reason or root cause of the issue raised in the licensed applications installed one the one or more devices of the managed network 604. In some embodiments, the discovery computing system 602 may be configured to generate multiple plurality of files (for example more than two) discovered at different time instances and compare the corresponding files to determine the diagnosis information. Real-time comparison or tracking of the multiple plurality of files discovered at multiple time instance may enhance an accuracy of determination of the root cause of the various issues related to the licensed applications related to the managed network 604. In some embodiments, the generated diagnosis information may be transmitted to the first device. The first device may display the received diagnosis information.

The discovery computing system 602 may be further configured to generate suggestive information that may fix the issues caused in the licensed application (for example ORACLE® Database) based on the determined diagnosis information, and further transmit the generated suggestive information to the first device. For example, if the issue after installation/execution of the licensed application (for example ORACLE® Database) is lagging or crashing of the corresponding device, the suggestive information may indicate that "the total number of physical cores and the processor speed is decreased and hence, it may be desired to increase the total number of physical cores and increase the processor speed for smooth functionality of the licensed application (for example ORACLE® Database) on your system. Hence, the discovery computing system 602 may be capable to automatically generate and provide the suggestive information to fix the issues before raising the ticket to the third party network 606.

Figure 10:
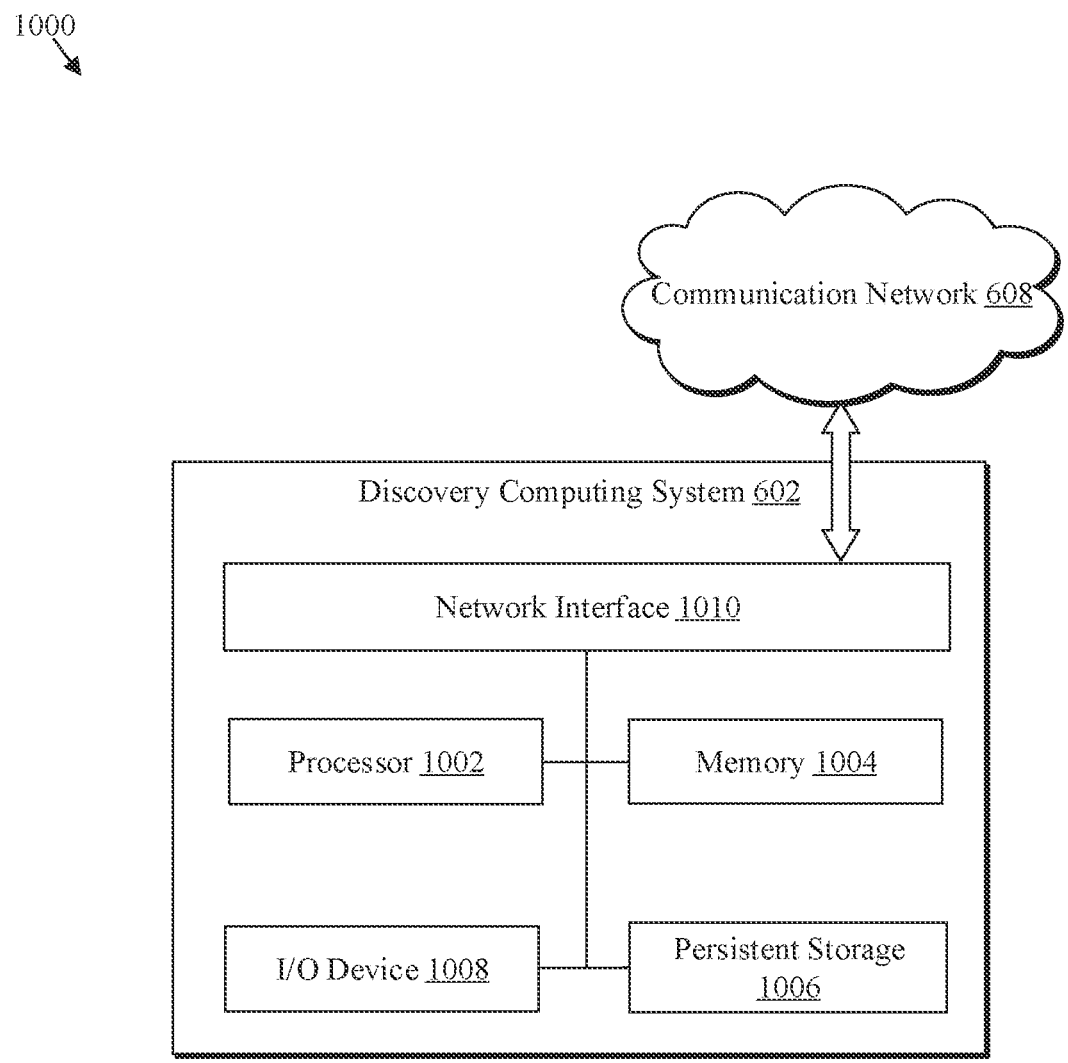
FIG. 10 is a block diagram of a discovery computing system for license management and support, in accordance with example embodiments.

FIG. 10 is a block diagram of a discovery computing system for license management and support, in accordance with example embodiments. FIG. 10 is explained in conjunction with elements from FIG. 6, FIG. 7, FIGS. 8A-8F, and FIG. 9. With reference to FIG. 10, there is shown a block diagram 1000 of the discovery computing system 602. The discovery computing system 602 may include a processor 1002, a memory 1004, and a persistent storage 1006. The discovery computing system 602 may further include an input/output (I/O) device 1008, and a network interface 1010.

The processor 1002 may include suitable logic, circuitry, and/or interfaces that may be configured to execute program instructions associated with different operations to be executed by the discovery computing system 602. The processor 1002 may include any suitable special-purpose or general-purpose computer, computing entity, or processing device including various computer hardware or software modules and may be configured to execute instructions stored on any applicable computer-readable storage media. For example, the processor 1002 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 10, the processor 1002 may include any number of processors configured to, individually or collectively, perform or direct performance of any number of operations of the discovery computing system 602, as described in the present disclosure.

In some embodiments, the processor 1002 may be configured to interpret and/or execute program instructions and/or process data stored in the memory 1004 and/or the persistent storage 1006. In some embodiments, the processor 1002 may fetch program instructions from the persistent storage 1006 and load the program instructions in the memory 1004. After the program instructions are loaded into memory 1004, the processor 1002 may execute the program instructions. Some of the examples of the processor 1002 may be a GPU, a CPU, a RISC processor, an ASIC processor, a CISC processor, a co-processor, and/or a combination thereof.

The memory 1004 may include suitable logic, circuitry, and/or interfaces that may be configured to store program instructions executable by the processor 1002. In certain embodiments, the memory 1004 may be configured to store the first OS information and the second OS information. The memory 1004 may be further configured to store the process information and the generated output information. In some embodiment, the memory 1004 may store the generated first file, the first plurality of files, the second file, and the second plurality of files. The memory 1004 may include computer-readable storage media for carrying or having computer-executable instructions or data structures stored thereon. Such computer-readable storage media may include any available media that may be accessed by a general-purpose or special-purpose computer, such as the processor 1002.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1002 to perform a certain operation or group of operations associated with the discovery computing system 602.

The persistent storage 1006 may include suitable logic, circuitry, and/or interfaces that may be configured to store program instructions executable by the processor 1002, operating systems, and/or application-specific information, such as logs and application-specific databases. The persistent storage 1006 may be configured to store the first output information and the second output information. In some embodiments, the persistent storage 1006 may be configured to store the generated first plurality of files. The persistent storage 1006 may include computer-readable storage media for carrying or having computer-executable instructions or data structures stored thereon. Such computer-readable storage media may include any available media that may be accessed by a general-purpose or special-purpose computer, such as the processor 1002.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1002 to perform a certain operation or group of operations associated with the discovery computing system 602.

The I/O device 1008 may include suitable logic, circuitry, interfaces, and/or code that may be configured to receive the first request from the first device of the managed network 604. The I/O device 1008 may be configured to publish the diagnosis information and the suggestive information. The I/O device 1008 may include various input and output devices, which may be configured to communicate with the processor 1002 and other components, such as the network interface 1010. Examples of the input devices may include, but are not limited to, a touch screen, a keyboard, a mouse, a joystick, and/or a microphone. Examples of the output devices may include, but are not limited to, a display (such as a display device) and a speaker.

The network interface 1010 may include suitable logic, circuitry, interfaces, and/or code that may be configured to establish a communication between the discovery computing system 602, the managed network 604, and the third party network 606, via the communication network 608. The network interface 1010 may be implemented by use of various known technologies to support wired or wireless communication of the discovery computing system 602 via the communication network 608. The network interface 1010 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 1010 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Figure 11:
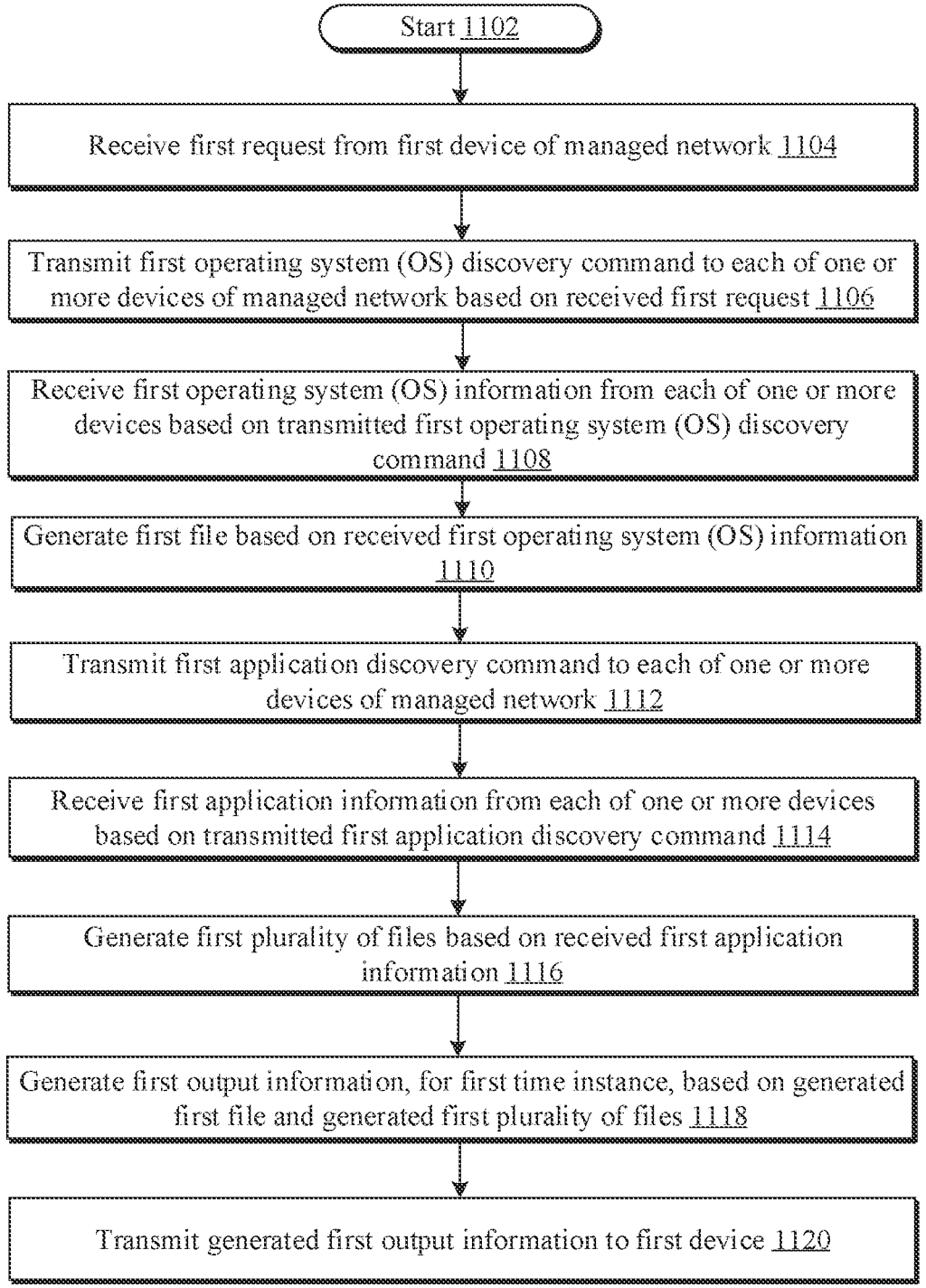
FIG. 11 is a flow chart for license management and support, in accordance with example embodiments.

FIG. 11 is a flow chart that illustrates a method for license support and management, in accordance with example embodiments. FIG. 11 is explained in conjunction with elements from FIG. 6, FIG. 7, FIGS. 8A-8F, FIG. 9, and FIG. 10. With reference to FIG. 11, there is shown a flowchart 1100. The exemplary method of flowchart 1100 may be executed by any computing system, for example, the discovery computing system 602 of FIG. 6. The exemplary method of the flowchart 1100 may start at 1102 and proceed to 1104.

At 1104, the first request from the first device of the managed network 604 may be received. The first device may be associated with at least one licensed application. In one or more embodiments, the processor 1002 may be configured to receive the first request from the first device of the managed network 604, wherein the first device may be associated with at least one licensed application. The details about the reception of the first request are provided, for example, in FIG. 6.

At 1106, the first operating system (OS) discovery command may be transmitted to each of one or more devices of the managed network 604. The first operating system (OS)

discovery command may be transmitted based on the on the received first request. In one or more embodiments, the processor 1002 may be configured to transmit the first OS discovery command to each of one or more devices of the managed network 604 based on the received first request. The details about the transmission of the first OS discovery command are provided, for example, in FIG. 7.

At 1108, the first operating system (OS) information may be received from each of the one or more devices based on the transmitted first OS discovery command. In one or more embodiments, the processor 1002 may be configured to receive the first operating system (OS) information from each of the one or more devices based on the transmitted first OS discovery command. The details about the reception of the first OS information are provided, for example, in FIG. 7.

At 1110, a first file may be generated. The first file may be generated based on the received first OS information. In one or more embodiments, the processor 1002 may be configured to generate a first file based on the received first OS information. The details about the generation of the first file are provided, for example, in FIG. 7.

At 1112, the first application discovery command may be transmitted to each of the one or more devices of the managed network 604. In one or more embodiments, the processor 1002 may be configured to transmit a first application discovery command to each of the one or more devices of the managed network 604. The details about the transmission of the first application discovery command are provided, for example, in FIG. 7.

At 1114, the first application information may be received. The first application information may be received from each of the one or more devices based on the transmitted first application discovery command. In one or more embodiments, the processor 1002 may be configured to receive the first application information from each of the one or more devices based on the transmitted first application discovery command. The details about the reception of the first application information are provided, for example, in FIG. 7.

At 1116, the first plurality of files may be generated. The first plurality of files may be generated based on the received first application information. In one or more embodiments, the processor 1002 may be configured to generate a first plurality of files based on the received first application information. The details about the generation of the first plurality of files are provided, for example, in FIG. 7.

At 1118, the first output information may be generated for a first time instance. The first output information may be generated based on the generated first file and the generated first plurality of files. In one or more embodiments, the processor 1002 may be configured to generate the first output information, for the first time instance, based on the generated first file and the generated first plurality of files. The details about the generation of the first output information for a first time instance are provided, for example, in FIG. 7.

At 1120, the generated first output information may be transmitted to the first device. In one or more embodiments, the processor 1002 may be configured to transmit the generated first output information to the first device as described, for example, in FIG. 7.

Control may pass to end. Although the flowchart 1100 is illustrated as discrete operations, such as 1102, 1104, 1106, 1108, 1110, 1112, 1114, 1116, 1118, and 1120. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage medium configured to store computer-executable instructions that, in response to being executed, cause a system (such as the discovery computing system 602) to perform operations. The operations may include receiving a first request from a first device of a managed network (such as the managed network 604). The first device may be associated with at least one licensed application. The operations may further include transmitting a first operating system (OS) discovery command to each of one or more devices of the managed network based on the received first request. The operations may further include receiving a first operating system (OS) information from each of the one or more devices based on the transmitted first OS discovery command. The operations may further include generating a first file based on the received first OS information. The operations may further include transmitting a first application discovery command to each of the one or more devices of the managed network. The operations may further include receiving first application information from each of the one or more devices based on the transmitted first application discovery command. The operations may further include generating a first plurality of files based on the received first application information. The operations may further include generating first output information, for a first time instance, based on the generated first file and the generated first plurality of files. The operations may further include transmitting the generated first output information to the first device.

Discovery of Microservices Architecture Based Applications:

With the advancement in the software development, many software applications are being developed or available in market. Certain software applications are based on a microservices architecture instead of a traditional monolithic architecture. In the microservice based architecture, the software application is composed of small independent services that communicate with each other usually through well-defined APIs. Each of these small independent services performs their own predefined functionalities and may be executed in different machines. Moreover, to facilitate the microservices based architecture, several cloud computing networks provide a service platform for deploying, hosting and management of these small independent services. As more and more enterprises are shifting towards microservices based architecture for developing new applications, there is a need for a system that can discover the applications that are based on the microservices based architecture and to discover the service platform provided by the cloud computing networks.

A remote computing system may be configured to provide computing resources as well as services on behalf of a managed computer network. These computing resources may include, but is not limited to, a virtual computing device, a container, a load balancer, and a storage volume that may be distributed across one or more availability zones (e.g., datacenters) disposed within one or more geographic regions. These computing resources may define a cloud-based computing environment that the managed network can use to host software applications (also referred as applications), store, and serve data; and provide other web-based software services.

The remote computing system may also provide services to host, deploy, and manage applications on the remote computing system. The applications are usually hosted on computing resources provided by the remote computing system. The applications may be based either on a monolithic architecture or a microservices architecture. In the monolithic architectures, all processes are tightly coupled so that all the processes may execute as a single service. Therefore, if one process of the application experiences a spike in demand, entire environment in which the application is hosted, must be scaled. In the microservices architecture, the application is broken down into several independent components, where each component may run each application process as a service. Therefore, the microservices architecture based application comprises a set of services, where each of the set of services may communicate via a well-defined interface using lightweight application programming interfaces (APIs).

It may be noted that the microservices architecture may have certain advantages over the monolithic architecture. Therefore, the applications that are currently being developed are based on the microservices architecture. Moreover, the applications that have been previously developed based on the monolithic architecture are also being transformed into the microservice based architectures due to multiple advantages of the microservices architecture over the traditional monolithic architecture.

Due to dynamic nature of an organization, the organization may have multiple microservices architecture as well as monolithic architecture based applications that may be hosted in the remote computing system. Each service of the microservices architecture based application may be hosted in different computing resources provided by the remote computing system. Therefore, there is a need to automatically detect a set of applications that may be based on the microservices architecture and hosted on the remote computing system. There may be a requirement to further discover and map the set of services provided by the remote computing system for hosting, deploying microservices architecture based applications, as well as discover all the commuting resources that may be allocated to the managed network for hosting the set of applications that may be based of the microservice architecture. The disclosed discovery computing system may be able to discover each of the set of services of an application instead of discover just the application.

Accordingly, a first example embodiment may involve the discovery computing system. The discovery computing system may be configured to receive an account identifier (ID). The account identifier may be associated with a service account in the remote computing system. The discovery computing system may be further configured to transmit a first application programming interface (API) query to the remote computing system based on the received account identifier. The discovery computing system may be further configured to receive first information associated with a first resource in the remote computing system based on the transmitted first API query. The first resource may correspond to a cloud orchestrator associated with a first service provided by the remote computing system. The discovery computing system may be further configured to transmit a first set of queries to the remote computing system based on the received first information. The discovery computing system may be further configured to receive second information about a cluster of resources, associated with the first resource in the remote computing system, based on the transmitted first set of queries, wherein the set of services may be related to the first service that may be deployed in one or more resources of the cluster of resources. The discovery computing system may be further configured to generate a relationship map between the first resource and the cluster of resources based on the received second information. The discovery computing system may further output the generated relationship map.

A large organization is a complex entity with many interrelated departments that may further have different projects. Some of these departments that are found across the organization are, but not limited to, a human resources (HR) department, a supply chain department, information technology (IT) department, and a finance department, etc. However, each organization may have its own unique departments and projects that may provide essential capabilities and/or create competitive advantages.

To support widely-implemented projects in multiple departments, organizations typically use software applications, such as, but not limited to, customer relationship management (CRM) and human capital management (HCM) packages that may have a huge amount data associated with it. A large organization often has dozens or hundreds of the software applications that may be based on the monolithic or microservices architecture. Nonetheless, the advantages provided by the embodiments herein are not limited to large organizations and may be applicable to an organization, or any other type of enterprise, of any size.

To efficiently host the software applications and to store data associated with the software applications, organizations may benefit from a remotely-hosted platform that may eliminate unnecessary hardware requirement at an on-premise network of the organization. The goal of such a platform may be, but not limited to, to reduce purchase of expensive computing resources, provide scalability, and security so that software engineers and individuals in the organization can focus on developing unique, high-value features. In order to achieve such goal, the concept of a Platform as a Service (PaaS) is introduced, to provide computing resources to the organization. The computing resources in the PaaS is hosted remotely from the organization, but may access data, applications, and services within the organization by way of secure connections.

In some embodiments, the PaaS may also support a rich set of pre-defined functionality that can be added to the applications hosted in the remote computing system (i.e. that may provide a cloud-based computing environment). These functionalities include support for searching, email, templating, workflow design, reporting, analytics, social media, scripting, mobile-friendly output, and customized GUIs.

The following embodiments describe architectural and functional aspects of example PaaS systems, as well as the features and advantages thereof.

Figure 12:
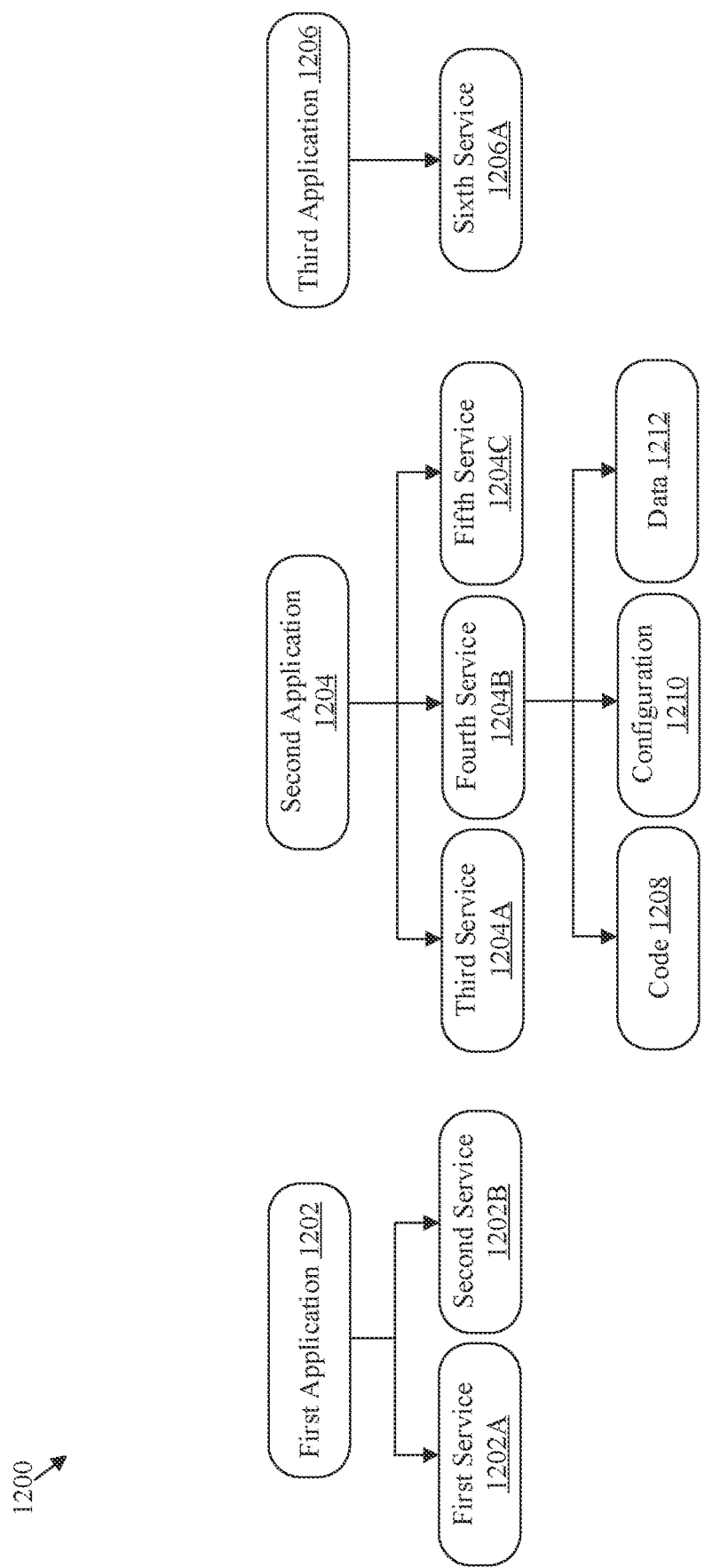
FIG. 12 illustrates an architecture of exemplary microservice architecture based applications, in accordance with example embodiments.

FIG. 12 illustrates an architecture of exemplary microservice architecture based applications, in accordance with example embodiments. With reference to FIG. 12, there is shown an architecture 1200 of exemplary applications. In FIG. 12, there is shown a first application 1202, a second application 1204, and a third application 1206.

Typically, a monolithic architecture based application may be built as a single and indivisible unit. The monolithic architecture based applications is, therefore, unified where all the functions of the application may be managed and served in one place. The monolithic architecture based application may have a code base and may also lack modularity. The code base may include a code of the application. As a result, if one or more developers of the monolithic architecture based application have to update some part of code, they may have to access the code base and further update the whole code in the code base accordingly. Hence, the one or more developers may be required to make changes in whole stack of the code base at once.

Moreover, the code in the code base of the monolithic architecture based application may become hard to understand as well as to manage when the application is scaled. Therefore, the implementation of changes in a large and complex monolithic architecture based application may become difficult as the application may have highly tight coupling between the code in the code base. Even a small modification of the code may have an impact on whole system and therefore, the update in the code need to be thoroughly coordinated between the one or more developers which may further increase the overall development process of such application. Also, in the monolithic architecture based applications, the complete application may be required to be scaled even if scaling of a single component is of the application is required.

In contrast, in the microservice based architecture, the application is broken down into a set of smaller independent units. Each of the set of smaller independent units may carry out every application process as a separate service. Therefore, each of the set of smaller independent units may correspond to a set of services (or microservices).

With reference to FIG. 12, the first application 1202 may be broken down into a first service 1202A, and a second service 1202B. The second application 1204 may be broken down into a third service 1204A, a fourth service 1204B, and a fifth service 1204C. Similarly, the third application 1206 may be broken down into a sixth service 1206A. Therefore the set of services may include the first service 1202A, the second service 1202B, the third service 1204A, the fourth service 1204B, the fifth service 1204C, and the sixth service 1206A.

Each service of the set of services may perform a complete and standalone function and may start and run independently of other services in the set of services. Moreover, each service of the set of services may be deployed independently of other services in the set of services. Therefore, each service of the set of services may have their own logic and databases and may perform specific functions. Each service may be developed and/or managed by a different team of developers. Therefore, the team of developers may update an existing service without rebuilding and redeploying the entire application. Also, each service of the set of services may need not to share the same technology stack, libraries, or frameworks.

Each service may be further composed of code 1208, configuration 1210, and data 1212 as shown in FIG. 12. The code 1208, the configuration 1210, and the data 1212 may be the leaf nodes of the architecture of the second application 1204. The code 1208 may include executable binaries that may be required to perform the corresponding function of the corresponding service (i.e. the fourth service 1204B). The configuration 1210 may include service settings that can be loaded at the run time of the corresponding service (i.e. the fourth service 1204B), and the data 1212 may include of arbitrary static data to be consumed by the corresponding service (i.e. the fourth service 1204B).

In some embodiments, the application and the set services that belong to the application may be referred as a logical layer whereas the code 1208, the configuration 1210, and the data 1212 associated with each service may be referred as the physical layer, as the developer of the service may be able to modify the code 1208, the configuration 1210, and the data 1212 associated with the corresponding service. For example, the second application 1204, the third service 1204A, the fourth service 1204B, and the fifth service 1204C may be referred as a logical layer and the code 1208, the configuration 1210, and the data 1212 may be referred as the physical layer.

The disclosed discovery computing system may determine each of the set of services of the application rather than just the application. In some embodiments, the disclosed discovery system may be capable of discovering leaf nodes (i.e. the code 1208, the configuration 1210, and the data 1212) of each application. Therefore, the discovery computing system may discover the in-depth resources and services associated with the application.

It may be noted that each service of the set of services may have its corresponding code, configuration, and data. The description for the code, the configuration, and the data for the first service 1202A, the second service 1202B, the third service 1204A, the fifth service 1204C, and the sixth service 1206A has been omitted for the sake of brevity.

Figure 13:
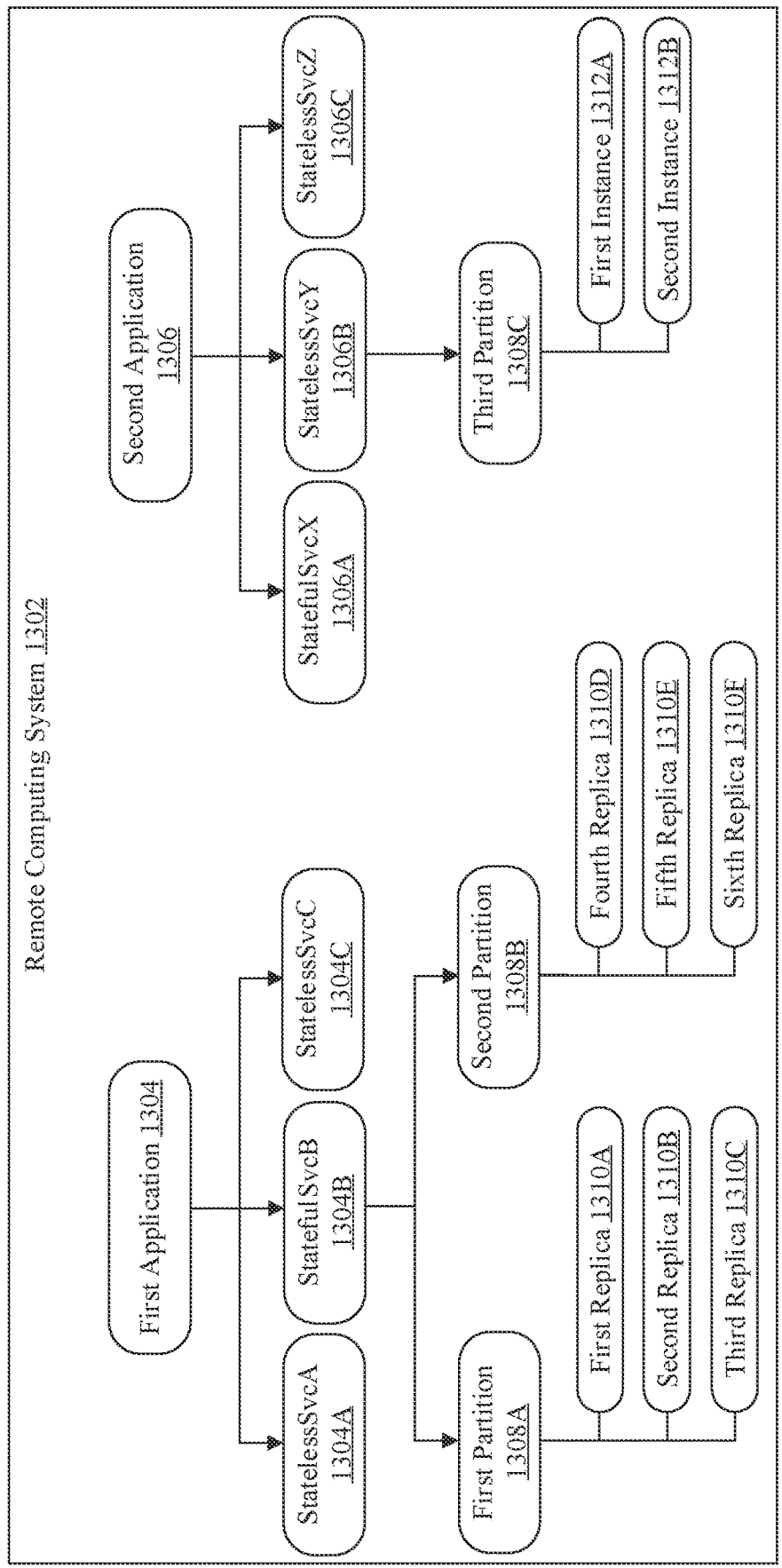
FIG. 13 illustrates an architecture of an exemplary microservices architecture based application hosted in a remote computing system, in accordance with example embodiments.

FIG. 13 illustrates an architecture of an exemplary microservices architecture based application hosted in a remote computing system, in accordance with example embodiments. FIG. 13 is explained in conjunction with elements from FIG. 12. With reference to FIG. 13, there is shown an architecture 1300 of exemplary applications hosted in a remote computing system 1302. In FIG. 13, there is shown a first application 1304, and a second application 1306 hosted in the remote computing system 1302.

As described above, in FIG. 12, each microservices architecture based application may be composed of one or more services. Each service of the set of services may either be a stateless service or a stateful service. The stateless service may not maintain any state within the set of services and across API calls, and may take in a request, process it, and may send a response back without persisting any state information whereas the stateful service may store state within the service and may use reliable collections or reliable actors programming models to manage the state.

With reference to FIG. 13, the first application 1304 and the second application 1306 may include a first plurality of stateful services and a second plurality of stateless services. For example, the first application 1304 may include a first stateless service "StatelessSvcA" 1304A, a first stateful service "StatefulSvcB" 1304B, and a second stateless service "StatelessSvcC" 1304C. The second application 1306 may include a second stateful service "StatefulSvcX" 1306A, a third stateless service "StatelessSvcY" 1306B, and a fourth stateless service "StatelessSvcZ" 1306C. Therefore, the first plurality of stateful services may include the first stateful service "StatefulSvcB" 1304B, and the second stateful service "StatefulSvcX" 1306A, and the second plurality of stateless services may include the first stateless service "StatelessSvcA", the second stateless service "StatelessSvcC" 1304C, the third stateless service "StatelessSvcY" 1306B, and the fourth stateless service "StatelessSvcZ" 1306C.

In the remote computing system 1302, each of the first plurality of stateful services may contain large amounts of state, may therefore split the data across one or more partitions. Each of the one or more partitions may be responsible for a portion of the complete state of the corresponding stateful service. Within each of the one or more partitions, the stateless service may have one or more instances, while each of the first plurality of stateful services may have one or more replicas.

With reference to FIG. 13, the first stateful service "StatefulSvcB" 1304B may split the data between a first partition 1308A, and a second partition 1308B. The first partition 1308A may have a first replica 1310A, a second replica 1310B, and a third replica 1310C. Similarly, the second partition 1308 may have a fourth replica 1310D, a fifth replica 1310E, and a sixth replica 1310F.

In the remote computing system, each of the second plurality of stateless services may have only one partition since they may have no internal state. If a first instance of the one or more instances fails, the leftover instances in the one or more instances may continue to operate normally. Each of the one or more partitions may be replicated across the computing resources (such as storage volumes) for consistency and failover recovery. Each of the first plurality of stateful services may maintain their state within the corresponding one or more replicas and each partition of the one or more instances may have a corresponding replica set. A set of read and write operations may be performed at one replica. One or more state changes based on a write operation of the set of read and write operations may be replicated to other replicas in the replica set associated with a corresponding partition. With reference to FIG. 13, the third stateless service "StatelessSvcY" 1306B have a third partition 1308C that may further have a first instance 1312A, and a second instance 1312B.

It may be noted that each service of the set of services may have its corresponding partitions, replicas and/or instances. The description for the partitions, the replicas and/or the instances for the first stateless service "StatelessSvcA" 1304A, the second stateless service "StatelessSvcC" 1304C, the second stateful service "StatefulSvcX" 1306A, the fourth stateless service "StatelessSvcZ" 1306C has been omitted for the sake of brevity.

Figure 14:
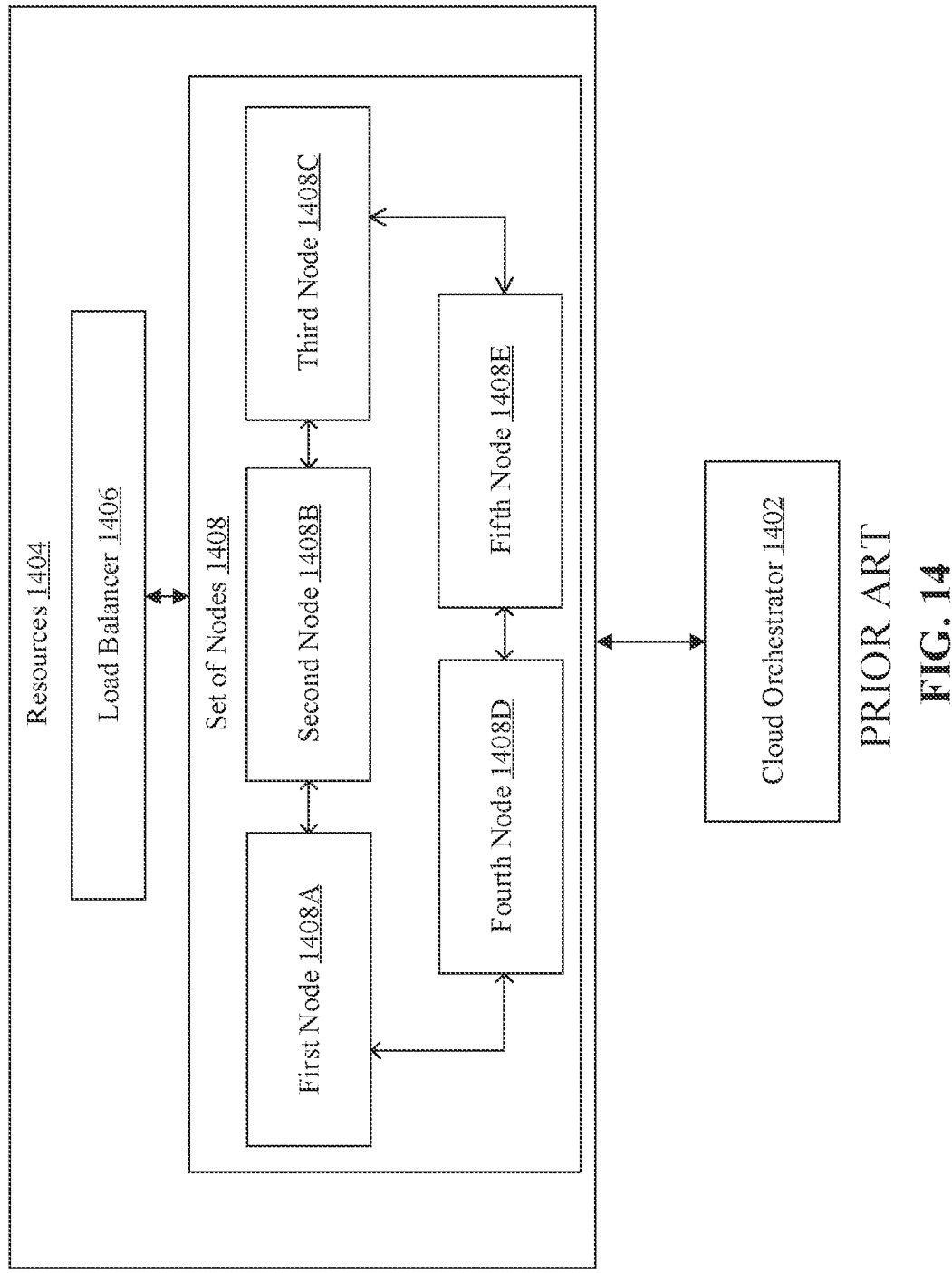
FIG. 14 illustrates an exemplary architecture for hosting a microservice architecture based application in the remote computing system, in accordance with example embodiments.

FIG. 14 illustrates an exemplary architecture for hosting a microservice architecture based application in the remote computing system, in accordance with example embodiments. FIG. 14 is explained in conjunction with elements from FIG. 12, and FIG. 13. With reference to FIG. 14, there is shown an exemplary architecture 1400 for hosting a microservice architecture based application in the remote computing system. There is further shown a cloud orchestrator 1402 and a cluster of resources 1404. The cluster of resources 1404 may be required to deploy, host, manage, and execute the microservice architecture based application. The cluster of resources 1404 may be managed by the cloud orchestrator 1402. The cluster of resources 1404 may be automatically created by the remote computing system based on a request received from the managed network to host the microservice architecture based application.

The cluster of resources 1404 may include, but are not limited to, a load balancer 1406 and a set of nodes 1408. The set of nodes 1408 may include a first node 1408A, a second node 1408B, a third node 1408C, a fourth node 1408D, and a fifth node 1408E. Each of the set of nodes 1408 may correspond to a virtual machine or a container. The load balancer 1406 may route client requests across the set of nodes 1408. The load balancer 1406 may, therefore, maximizes speed and capacity utilization of each of the set of nodes 1408.

The virtual machine may be a virtual environment that functions as a virtual computer system with its own CPU, memory, network interface, and storage. The virtual machine may be created on a physical hardware system in the remote computing system. The container may correspond to a standard package of software that may bundle an application's code together with related configuration files and libraries and with the dependencies required for the application to execute. In some embodiments, the containers may be a virtualization technology that may abstract the underlying operating system from applications executing on the operating system. The container may have full and private access to its own isolated view of the operating system constructs.

As discussed, the microservices architecture based application may be divided into the set of services. As an example and not limitation, the set of services may include, but are not limited to, Myactor services, stateless backend service, stateful backend service. Other examples of the set of services may include, protocol gateways, user profiles, shopping carts, inventory processing, queues, and caches. The cloud orchestrator 1402 may host microservices of an application inside the set of nodes that may deployed and activated across the cluster of resources 1404. The cloud orchestrator 1402 may be associated with a first service provided by the remote computing system. The first service may correspond to a service platform provided the remote computing system to deploy and manage microservice architecture based applications. In some embodiments, the cluster of resources 1404 may belong to or associated with a single application. The cluster of resources 1404 may scale up to include thousands of nodes as per the demand of the application. In case new nodes are added to the cluster of resources 1404, the cloud orchestrator 1402 may rebalance the partition replicas, and instances across the increased number of nodes.

Each node of set of nodes 1408 may contain at least one service of the set of services. Each node may contain at least the code, the configuration, and the data that may belong to the corresponding service. Each node of the set of nodes 1408 in the cluster of resources 1404 may be capable to communicate with other nodes in the set of nodes 1408. In some embodiments, each node of the set of nodes 1408 may contain a component (for example Service Fabric Component) that may synchronize each node of the set of nodes 1408 with every code/resource uploaded by the one or more developers of the application. In some embodiments, the cloud orchestrator 1402 may synchronize each node of the set of nodes 1408 with every code/resource uploaded by the one or more developers of the application.

In some embodiments, each application hosted and deployed in the remote computing system may utilize one or more services and/or resources provided by the remote computing system. The one or more services may include, but are not limited to, a database service, a storage service, a data visualization service, a device management service, an event ingestion service, an IoT service, a resource planning service, a customer relationship management service, or a messaging service.

Figure 15:
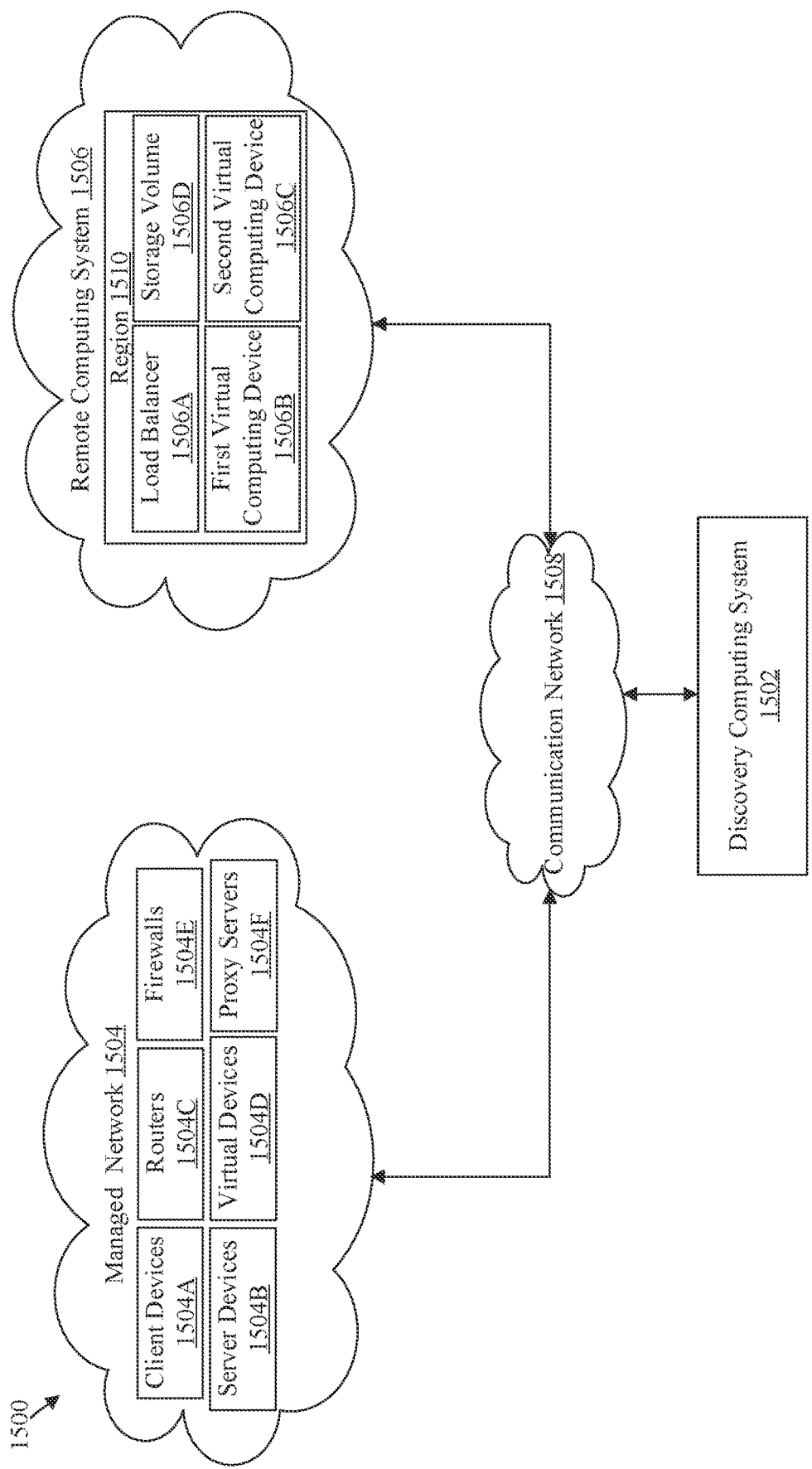
FIG. 15 illustrates a schematic drawing of a communication environment for discovery of microservices architecture based applications, in accordance with example embodiments.

FIG. 15 illustrates a schematic drawing of a communication environment for discovery of microservices architecture based applications, in accordance with example embodiments, in accordance with example embodiments. FIG. 15 is explained in conjunction with elements from FIG. 12, FIG. 13, and FIG. 14. With reference to FIG. 15, there is shown a communication environment 1500. There is shown a discovery computing system 1502, a managed network 1504, and a remote computing system 1506. The discovery computing system 1502, the managed network 1504, and the remote computing system 1506 may communicate with each other via a communication network 1508.

The discovery computing system 1502 may include suitable code, logic, circuitry and/or interfaces that may be configured to discover microservices architecture based applications in the remote computing system 1506. The discovery computing system 1502 may be configured to receive an account identifier (ID) associated with a service account in the remote computing system 1506. The discovery computing system 1502 may be further configured to transmit a set of queries to the remote computing system 1506 based on the received account ID. The discovery computing system 1502 may further generate and output a relationship map based on the transmitted set of queries. Example implementations of the discovery computing system 1502 may include, but are not limited to, a computing device, an application server, a database server, a mainframe server, a cloud server (e.g., a hybrid, a private, or a public cloud), or a web server.

The managed network 1504 may be, for example, an enterprise network used by an entity for computing and communications tasks, as well as storage of data. Thus, the managed network 1504 may include various client devices 1504A, server devices 1504B, routers 1504C, virtual machines 1504D, firewalls 1504E, and/or proxy servers 1504F. Client devices 1504A may be embodied by a computing system (such as the discovery computing system 1502), server devices 1504B may be embodied by the computing system and routers 1504C may be any type of router, switch, or gateway.

Virtual machines 1504D may be embodied by a computing system. In general, a virtual machine may be an emulation of the computing system, and may mimic functionality (e.g., processor, memory, and communication resources) of a physical computer. A single physical computing system may support up to thousands of individual virtual machines. In some embodiments, virtual machines 1504D may be managed by a centralized server device or application that facilitates allocation of physical computing resources to individual virtual machines, as well as performance and error reporting. In some embodiments, the enterprises often employ one or more virtual machines 1504D in order to allocate computing resources in an efficient, as needed fashion.

The firewalls 1504E may be one or more specialized routers or server devices that may protect the managed network 1504 from unauthorized attempts to access the devices, applications, and services therein, while allowing authorized communication that may be initiated from the managed network 1504. The firewalls 1504E may also provide intrusion detection, web filtering, virus scanning, application-layer gateways, and other applications or services. In some embodiments, the managed network 1504 may include one or more virtual private network (VPN) gateways with which it communicates with the remote computing system 1506.

The managed network 1504 may also include one or more proxy servers 1504F. An embodiment of the proxy servers 1504F may be a server device that facilitates communication and movement of data between the discovery computing system 1502, the managed network 1504, and the remote computing system 1506. In particular, the proxy servers 1504F may be able to establish and maintain secure communication sessions with one or more computational instances of the remote computing system 1506. By way of such a session, the remote computing system 1506 may be able to discover and manage aspects of the architecture and configuration of managed network 1504 and its components.

Firewalls, such as the firewalls 1504E, typically deny all communication sessions that may be incoming by way of the communication network 1508, unless such a session has been ultimately initiated from behind the firewalls 1504E (i.e., from a device on managed network 1504) or the firewalls 1504E have been explicitly configured to support the session. By placing the proxy servers 1504F behind the firewalls 1504E (e.g., within the managed network 1504 and protected by the firewalls 1504E), the proxy servers 1504F may be able to initiate these communication sessions through the firewalls 1504E. Thus, the firewalls 1504E might not have to be specifically configured to support the incoming sessions from the remote computer system 1506, thereby avoiding potential security risks to the managed network 1504.

In some embodiments, the managed network 1504 may include a few devices and a small number of networks. In other deployments, the managed network 1504 may span multiple physical locations and include hundreds of networks and hundreds of thousands of devices. Thus, the architecture depicted in FIG. 15 is capable of scaling up or down by orders of magnitude.

Furthermore, depending on the size, architecture, and connectivity of the managed network 1504, a varying number of the proxy servers 1504F may be deployed therein. For example, each one of the proxy servers 1504F may be responsible for communicating with the remote computing system 1506 regarding a portion of the managed network 1504. Alternatively or additionally, sets of two or more proxy servers 1504F may be assigned to such a portion of the managed network 1504 for purposes of load balancing, redundancy, and/or high availability.

The remote computing system 1506 may provide a cloud-based computing environment that allows the managed network 1504 to host software applications, store data, and otherwise utilize remotely-hosted computing resources. The cloud-based computing environment may be provided atop an infrastructure of various computing resources that allow the computing environment to be defined, modified, and otherwise tailored to the needs of the managed network 1504. The remote computing system 1506 may be GOOGLE CLOUD PLATFORM®, IBM CLOUD®, MICROSOFT® AZURE®, and/or AMAZON WEB SERVICES®, among other possible cloud providers.

The cloud-based computing environment may be configured to automatically scale as demand for the computing resources vary over time. Accordingly, the state of the infrastructure of computing resources may also fluctuate over time to allow for such scaling. The extent of scaling and fluctuation in the computing resources dedicated to the managed network 1504 may indicate a popularity (e.g., absolute popularity and/or relative popularity) of the services provided by the managed network 1504. This may result in a variable cost of using the cloud-based computing environment. Thus, maintaining an accurate and an up-to-date map of the service infrastructure dedicated by the remote computing system 1506 to the managed network 1504 may allow the managed network 1504 to utilize the cloud-based computing environment more effectively and/or efficiently. To that end, the managed network 1504 may utilize a discovery application to discover and map the service infrastructure, and subsequently modify aspects thereof to reach a target state.

The computing infrastructure provided by the remote computing system 1506 may be organized into multiple different geographic regions. Each geographic region may encompass a geographic area in which multiple different and physically separate data centers are located. For example, the regions may include United States South (i.e., US-South), US-East, European Union Great Britain (i.e., EU-GB), EU-Germany, and Asia Pacific North (i.e., AP-North), among other possibilities. Different remote computing systems may implement a different set of regions. Allocating computing resources within a particular geographic region allows client devices within or nearby this region to more quickly communicate with the computing resources therein.

A region 210 is an example region of the remote computing system 1506. Although not shown, the remote computing system 1506 may include multiple geographically-distributed instantiations of region 210 and one or more of its components. The managed network 1504 may be assigned a plurality of computing resources within the region 210 that make up at least part of the cloud-based computing environment. Namely, the region 210 may include one or more availability zones (not shown), each of which may represent a corresponding physical data center. In some implementations, the underlying hardware that makes up a first availability zone may be physically isolated, such that outages (e.g., power outages) associated with the first availability zone do not affect the other availability zones in the one or more availability zones. Accordingly, the one or more availability zones may provide redundancy within a single geographic region.

Each availability zone of the one or more availability zones may be part of network that may be dedicated to the managed network 1504 by the remote computing system 1506. The network may allow client devices (e.g., computing devices external to the remote computing system 1506) access to computing resources in the one or more availability zones and may also allow these computing resources to communicate with one another. In some embodiments, the network may be referred to as a Virtual Private Cloud (VPC). Each of the one or more availability zones may be assigned a corresponding subnet, thus allowing for a logical division (e.g., based on IP address) of the computing resources provided by each availability zone. That is, the first availability zone may be assigned a first subnet while a second availability zone may be assigned a second subnet.

The network may also include an Internet gateway, a route table, and a network access control list (NACL) for the subnet. The Internet gateway may provide an interface between components of network and the communication network 1508. The route table and the NACL may provide network traffic control to the subnet. Among other network parameters, the route table and the NACL may define permitted destinations for and permitted types of traffic originating out of computing resources in the subnet, as well as permitted sources and permitted types of traffic addressed to computing resources in the subnet. For example, the route table and the NACL may indicate whether the subnet is accessible to the computing devices outside of the network (i.e., whether the subnet is public or private). The route table and the NACL may define similar rules for the subnet.

The Internet gateway, as well as the route table and the NACL, may represent logical components of the remote computing system 1506. That is the Internet gateway, the route table and the NACL may be implemented by one or more physical devices (e.g., gateways and routers) of the remote computing system 1506. Additionally, in some implementations of the remote computing system 1506, the network may extend across, cover, or include multiple different instantiations of the region.

Each availability zone may include therein a corresponding plurality of computing resources. Namely, the availability zone may include therein a load balancer 1506A, a first virtual computing device 1506B, a second virtual computing device 1506C, and a storage volume 1506D. The first virtual computing device 1506B and/or second virtual computing device 1506C may be alternatively be referred to as a virtual machine.

In some implementations, the load balancers 1506A, the first virtual computing device 1506B, the second virtual computing device 1506C, and the storage volumes 1506D may represent physical computing resources of the remote computing system 1506. For example, the first virtual computing device 1506B and the second virtual computing device 1506C may represent a physical computing device used exclusively for computation, but not other tasks such as providing storage or load balancing. Alternatively, each of these computing resources may represent a virtual computing resource (e.g., software processes that isolate the implementation of the computing resource from the underlying physical hardware). Thus, for example, each physical computing device within the remote computing system 1506 may execute and provide multiple virtual computing resources, including computation, load balancing, and storage.

The load balancer 1506A may be configured to distribute network traffic (e.g., web traffic generated by various software applications) or other types of requests among the first virtual computing device 1506B and the second virtual computing device 1506C. Thus, the load balancer 1506A may balance traffic within a single availability zone. In another embodiment, the load balancer 1506A may be configured to distribute network traffic among the first virtual computing device 1506B, and the second virtual computing device 1506C. Thus, the load balancer 1506A may be configured to balance traffic across multiple availability zones. When the load balancers 1506A is accessible by computing devices outside of the network (or one or more other networks in other geographic regions of the remote computing system 1506), they may be considered as a public load balancer. On the other hand, when load balancers 1506A is accessible only by computing resources within the network, they may be considered as a private load balancer.

The first virtual computing device 1506B and the second virtual computing device 1506C may be configurable to provide a target amount of computing resources. For example, the number of processor cores dedicated to execution of each virtual computing device, the amount of memory available to each virtual computing device, and the operating system executed by each virtual computing device may be adjustable for both the first virtual computing device 1506B and the second virtual computing device 1506C. The first virtual computing device 1506B and the second virtual computing device 1506C one or more may utilize storage volumes to store various data associated with the software executed by the first virtual computing device 1506B and the second virtual computing device 1506C.

The managed network 1504 may use the remote computing system 1506 to deploy applications and services to its clients and customers. For instance, if the managed network 1504 provides online music streaming services, then the remote computing system 1506 may store the music files and provide web interface and streaming capabilities. In this way, the organization of the managed network 1504 does not have to build and maintain its own servers for these operations.

It should be noted that the communication between the discovery computing system 1502, the managed network 1504, and the remote computing system 1506 may be performed via the communication network 1508. The communication network 1508 may include a communication medium through which the discovery computing system 1502 may communicate with the managed network 1504, and the remote computing system 1506 and/or different devices (not shown). Examples of the communication network 1508 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the communication environment 200 may be configured to connect to the communication network 1508, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

In operation, the managed network 1504 may have a plurality of applications that may be based on the microservices architecture and may be hosted and deployed in the remote computing system 1506. The managed network 1504 may want to discover each application that may be based on the microservices architecture. For the discovery of such microservices architecture based applications and resources, the disclosed discovery computing system 1502 may be used.

The managed network 1504 may create a service account in the discovery computing system 1502 to use the discovery computing system 1502 (i.e. that may include a discovery application or a discovery platform) to discover microservices architecture based applications in the remote computing system 1506. The discovery application may include a horizontal discovery application and a top-down discovery application. The created service account may belong to the discovery computing system 1502 and a network associated with the discovery computing system 1502.

The discovery computing system 1502 may be configured to receive an account identifier. The account identifier may be received from the managed network 1504 and may be associated a service account in the remote computing system 1506 (i.e. different from the service account being created in the discovery computing system 1502). The service account in the remote computing system 1506 may belong to the managed network 1504 and must have administrator level privileges or administrator role. For example, if the remote computing system 1506 is MICROSOFT® AZURE®, the service account must have either cloud_admin or sn_azure.admin role. The received account identifier may include, but is not limited to, a client identifier (ID), a tenant identifier (ID), and a key associated with the service account in the remote computing system 1506. In some embodiments, the discovery computing system 1502 may receive the account identifier, via a graphical user element (GUI) of a discovery application installed on the discovery computing system 1502. The received account identifier may be stored as a first configuration item (CI) in a "service_account" table in a persistent storage (shown in FIG. 18) associated with the discovery computing system 1502. The "service_account" table may include a plurality of fields, such as an account ID associated with the service account.

The discovery computing system 1502 may be configured to transmit an initial API query to the remote computing system 1506 based on the received account identifier. In some embodiments, the initial API query may be transmitted to the remote computing system 1506 for validation of the received service account. The discovery computing system 1502 may be configured to receive datacenter information from the remote computing system 1506 based on the transmitted initial API query. The datacenter information may include information about a set of datacentres that are associated with the service account in the remote computing system 1506. In some embodiments, the datacenter information may further include a geographic region of each of the set of datacentres. In some embodiments, a list that may include a set of datacentres may be provided to the managed network 1504. In such scenario, the managed network 1504 may be able to select one or more datacentre of the set of datacentres in which the application (related to microservices) are to be discovered. Each of the set of datacentres may be stored as a second CI in a "logical_datacenter" table in the persistent storage. The "logical_datacenter" table may include a plurality of fields, such as, but not limited to, the region 1510. The region 1510 may correspond to the geographic region of the logical datacenter.

The discovery computing system 1502 may be configured to transmit a first application programming interface (API) query to the remote computing system 1506. The first API query may be transmitted based on the received datacenter information. The first API may be transmitted to receive information about a first resource in the remote computing system 1506. In other words, the first API query may be transmitted to discover the first resource in the remote computing system 1506. In some embodiments, the first API query may be transmitted to collect high level information. The high level information may correspond to information associated with the first resource. The first resource may be associated with or corresponds to the cloud orchestrator 1402 associated with the first service provided by the remote computing system 1506. By way of an example and not limitation, if the remote computing system 1506 is MICROSOFT® AZURE® then the first service may correspond to the AZURE® SERVICE FABRIC®.

The first API query may be transmitted to the remote computing system 1506. As an example, the transmitted first API query may be provided below:

"id": "/subscriptions/7fc1c254-0b25-4529-9401-0ba835ddcc5c/resourceGroups/AppServiceEnvironment/providers/Microsoft.Compute/virtualMachineScaleSets/SNVMfab1", The discovery computing system 1502 may receive first information associated with a first resource in the remote computing system 1506 based on the transmitted first API query. The first resource may be the cloud orchestrator 1402. The cloud orchestrator 1402 may be a part of the first service and may be responsible for packaging, deploying, and managing scalable and reliable microservices in the remote computing system 1506. By way of example and not limitation, the received first information may be presented below:

```
"name": "SNVMfab1",
"type": "Microsoft.Compute/virtualMachineScaleSets",
"sku": {
"name": "Standard_D1_v2",
"tier": "Standard",
```

```
    "capacity": 1
  },
  "location": "eastus",
  "tags": {
  "resourceType": "Service Fabric",
  "clusterName": "snservicefabric"
}...
```

In light of above example, the first information associated with the first resource may include, but is not limited to, a name of the first resource, a location associated with the first resource, a type of the first resource, and a cluster name of the first resource.

The discovery computing system 1502 may be further configured to transmit a first set of queries to the remote computing system 1506 based on the received first information. The first set of queries may be transmitted to discover each of the cluster of resources 1404 (in the remote computing system 1506) that may be managed by the first resource. The set of queries may include different types of queries, such as, but are not limited to, API queries, and Hypertext Transfer Protocol (HTTP) queries. In some embodiments, the first set of queries may be referred as a set of in-depth queries. The set of in-depth queries may be transmitted to retrieve in-depth information (second information) about the cluster of resources 1404.

By way of example and not limitation, an API query of the first set of queries may be presented below:

"id": "/subscriptions/7fc1c254-0b25-4529-9401-0ba835ddcc5c/resourceGroups/AppServiceEnvironment/providers/Microsoft.Network/loadBalancers/LB-snservicefabric-SNVMfab1", By way of example and not limitation, a HTTP query of the first set of queries may be presented below:

"http://snservicefabric.eastus.cloudapp.azure.com:19080/Applications?api-version=3.0"

The discovery computing system 1502 may be further configured to receive second information about the cluster of resources 1404 in the remote computing system 1506. The cluster of resources 1404 may be associated with the first resource (i.e. discovered in the fourth and fifth operations) in the remote computing system 1506. The second information may be received from the remote computing system 1506 in response to the transmitted first set of queries. The second information may include response of each transmitted query of the first set of transmitted queries. In some embodiments, the received second information may include at least one of a name of each resource of the cluster of resources 1404, a type of each resource of the cluster of resources 1404, or a geographic region (or location) associated with each resource of the cluster of resources 1404.

By way of example and not limitation, a response of the transmitted API query of the first set of queries that may be included in the second information may be presented below:

```
"name": "LB-snservicefabric-SNVMfab1",
"type": "Microsoft.Network/loadBalancers",
"location": "eastus",
"tags": {
"resourceType": "Service Fabric",
"clusterName": "snservicefabric"
}
```

By way of example and not limitation, a response of the transmitted HTTP query of the first set of queries that may be included in the second information may be presented below:

```
{"ContinuationToken":"","Items":[{"Id":"GettingStartedApplication","Name":"fabric:\/
GettingStartedApplication","TypeName":"GettingStartedApplicationType","TypeVersion":
"1.0.0"," Status":"Ready","Parameters":[{"Key":"GuestExeBackendService_InstanceCount",
" Value":"-1"},{"Key":"MyActorService_MinReplicaSetSize",
"Value":"3"},{"Key":"MyActorService_PartitionCount","Value":"9"},
{"Key":"MyActorService_TargetReplicaSetSize","Value":"3"},{"Key":
"StatefulBackendServiceMinReplicaSetSize","Value":"3"},{"Key":
"StatefulBackendServicePartitionCount","Value":"6"},
{"Key":"StatefulBackendService_TargetReplicaSetSize","Value":"3"},
{"Key":"StatelessBackendService_InstanceCount","Value":"-1"},{"Key":
"WebService_InstanceCount","Value": "-1"}],"Healthstate":"Error"}]}
```

The cluster of resources 1404 (i.e. indicated by the second information) may include the load balancer 1406 and the set of nodes 1408 as shown in FIG. 14. Each resource of the cluster of resources 1404 may be associated with the first service and may be managed by the first resource. As discussed above, each of the set of nodes 1408 may correspond to the virtual machine or the container and may contain the code, the configuration, and the data of at least one service of the set of services of the application hosted in the remote computing system 1506. In an embodiment, the set of services related to the first service are deployed in one or more resources of the cluster of resources 1404.

In some embodiments, the cluster of resources 1404 may include a huge number of resources. In such a scenario, the size of the second information may be large. In such case, the discovery computing system 1502 may paginate the second information into small number of manageable pages. The second information in each manageable page may be parsed and the CIs may be created.

The discovery computing system 1502 may be further configured to store information about each discovered resource of the cluster of resource 1404 as the configuration item (CI) in a corresponding table in the configuration management database (CMDB) of the service platform. The discovery computing system 1502 may be configured to generate a class model (as the relationship map) based on the stored information about each discovered resource of the cluster of resource 1404. The class model may include a plurality of classes, each of which may represent the CI. The details about the stored information about each discovered resource of the cluster of resource 1404 and the generated class model are provided, for example, in FIG. 16.

The discovery computing system 1502 may further determine a relation type between the plurality of classes and generate a dependency map (as the relationship map) between the cluster of resources 1404 based on the determined relation. The dependency map may graphically display the set of CIs and the relationships between the CIs in the set of CIs. The details about the determination of the relation type and the dependency map are provided, for example, in FIG. 17.

The discovery computing system 1502 may be further configured to output the generated relationship map. In some embodiments, the relationship map may be displayed on a display screen associated with the discovery computing system 1502.

It may be noted that above operations may also be applied on the microservice architecture based applications hosted on the managed network 1504. In such implementation, each of the set of nodes 1408 may correspond to a physical machine and the discovery computing system 1502 may be configured to transmit the initial query, the first API query, and the first set of queries to the managed network 1504 and may receive the datacenter information, the first information, and the second information from the managed network 1504.

Therefore, the disclosed discovery computing system 1502 may be able to discover (i.e. horizontal discovery) each resource on which at least one service of the set of services may be hosted. The disclosed discovery computing system 1502 may further determine the relationship (i.e. top-down discovery) between the first resource and the cluster of resources 1404, and present the discovered relationship between the discovered cluster of resources 1404 as a dependency map to provide a holistic view of the microservice architecture based application hosted in the remote computing system 1506.

In some embodiments, the discovery computing system 1502 may be further configured to detect the one or more services or resources that may be utilized by the discovered application. For example, the detected one or more services may include the database service, the storage service, the data visualization service, the device management service, the event ingestion service, the IoT service, the resource planning service, the customer relationship management service, or the messaging service. The discovery computing system 1502 may transmit a first query to the remote computing system 1506. The first query may be transmitted to discover the one or more services and/or resources that may be utilized by the discovered application. Each of the discovered one or more services may be stored as the configuration item (CI) in the CMDB of the service platform.

Figure 16:
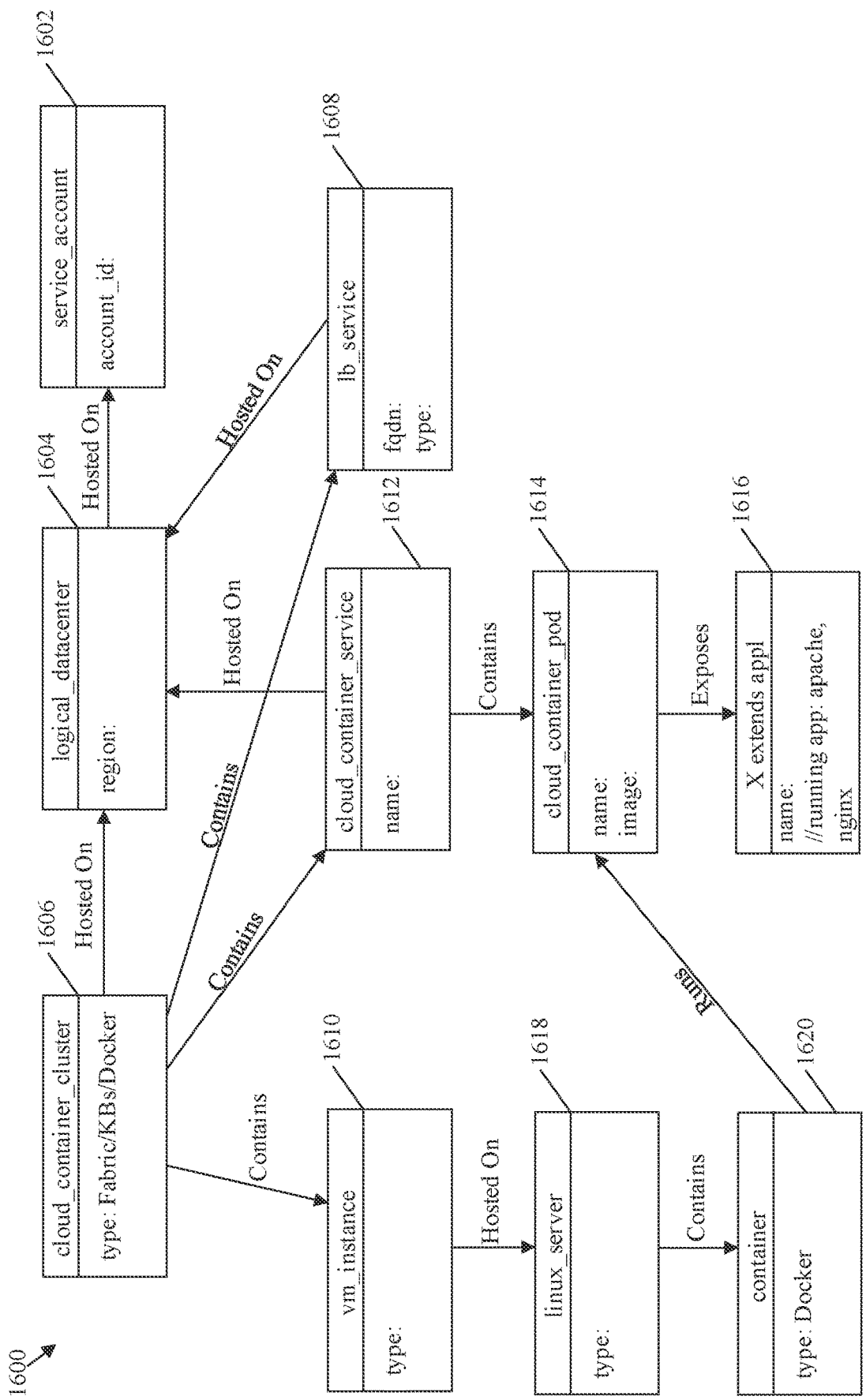
FIG. 16 is a scenario diagram that illustrates an exemplary class model for discovery of microservices architecture based applications, in accordance with example embodiments.

FIG. 16 is a scenario diagram that illustrates an exemplary class model for discovery of microservices architecture based applications, in accordance with example embodiments. FIG. 16 is explained in conjunction with elements from FIG. 12, FIG. 13, FIG. 14, and FIG. 15. With reference to FIG. 16, there is shown a class model 1600 for the cluster of resources 1404 (as described in FIG. 14). The class model 1600 may include a plurality of classes and relationships among two or more of the plurality of classes. Each of the plurality of classes may correspond to a configuration item (CI) and may include information about a corresponding CI. The class model 1600 in FIG. 16 is merely shown as an example and should not be construed as limiting for the disclosure.

After the discovery of the first resource and each of the cluster of resources 1404, the discovery computing system 1502 may be further configured to store information about each discovered resource of the cluster of resource 1404, the received account ID, and the discovered set of datacentres as the configuration item (CI) in a corresponding table in the configuration management database (CMDB) of the service platform.

In an embodiment received account identifier may be stored as a first configuration item (CI) in a first table. The first table may correspond to a "service_account" table in a persistent storage associated with the discovery computing system 1502. The first table (i.e. the "service_account" table) may include a plurality of fields, such as an account ID associated with the service account.

The discovery computing system 1502 may be further configured to store each of the set of datacentres a second CI in a second table. The second table may correspond to "logical_datacenter" table in the persistent storage. The second table (i.e. the "logical_datacenter" table) may include a plurality of fields, such as, but not limited to, the region. The region may correspond to the geographic region of the logical datacenter.

The discovery computing system 1502 may further be configured to store information related to the first resource as a third configuration item (CI) in a third table. The third table may correspond to "cloud_container_cluster" table of a configuration management database (CMDB) of the service platform. The third table (i.e. the "cloud_container_cluster" table) may be associated with the third CI. The CMDB of the service platform may be stored in the persistent storage associated with the discovery computing system 1502 or the network of the discovery computing system 1502. The third table (i.e. the "cloud_container_cluster" table) may include a plurality of fields, such as a type of container cluster. As an example, the type of container cluster may be either fabric, docker or Kubernetes.

The discovery computing system 1502 may generate a set of tables each for a first set of CIs. Each of the first set of CIs may include each resource of the cluster of resources 1404. Each of the first set of tables may be stored in the CMDB of the service platform. The CMDB may be further stored in the persistent storage associated with the discovery computing system 1502 or the network of the discovery computing system 1502.

By way of example and not limitation, the load balancer 1406 may be stored as a fourth CI in a fourth table. The fourth table may correspond to a "lb_service" table. The fourth table (i.e. the "lb_service" table) may include a plurality of fields such as, but not limited to, a type of the load balancer in the cluster of resources 1404.

The discovery computing system 1502 may be further configured to store the first node 1408A of the set of nodes 1408 may be stored as a fifth CI in a fifth table. The fifth table may correspond to a "vm_instance" table. Similarly, the first container of the set of nodes 1408 may be stored as a sixth CI in a sixth table. The sixth table may correspond to a "cloud_container_service" table.

The fifth table (i.e. the "vm_instance" table) may include a plurality of fields such as, but not limited to, a type of the first node 1408A. The sixth table (i.e. the "cloud_container_service" table) may include a plurality of fields such as, but not limited to, a name of the container service.

In some embodiments, the received second information may also include additional information about each resource of the cluster of resources 1404. By way of example and not limitation, the additional information associated with the first container may include information about a pod in which the first container may belong. The pod may correspond to a group of containers that may be deployed together on the same host. The discovery computing system 1502 may store the pod as a seventh CI in a seventh table. The seventh table may correspond to a "cloud_container_pod" table. The seventh table (i.e. the "cloud_container_pod" table) may include a plurality of fields such as, but not limited to, a name of the pod and an image of all the containers in the pod.

In some embodiments, the additional information may also include applications exposed by the pod. The applications exposed by the pod may be stored as an eighth CI in an eighth table. The eighth table may correspond to an "appl" table. The eight table (i.e. the "appl" table) may include a plurality of fields such as, but not limited to, a name of the application that may be exposed by the container pod.

In some embodiments, the additional information associated with the first node 1408A may include information about a server on which the first node 1408A may be hosted. By way of example and not limitation, if the operating system of the first node 1408A is Linux®, the information about the server may be stored as a ninth CI in a ninth table. The ninth table may correspond to a "linux_server" table. The ninth table (i.e. the "linux_server" table) may include a plurality of fields such as, but not limited to, a name of the Linux® server or a type of the Linux® server.

In some embodiments, the additional information may also include information about a container that runs the pod. The container may be stored as a tenth CI in a tenth table. The tenth table may correspond to a "container" table. The tenth table (i.e. the "container" table) may include a plurality of fields such as, but not limited to, a type of the container. As an example, the type of the container may be docker.

The discovery computing system 1502 may be further configured to determine a relationship between one or more CIs of a set of CIs. The set of CIs may include the first CI, the second CI, the third CI, the fourth CI, the fifth CI, the sixth CI, the seventh CI, the eighth CI, the ninth CI, and the tenth CI. As discussed above, the set of CIs may be related to the first resource and the cluster of resources 1404 discovered from the remote computing system 1506 based on the transmitted first API query and the set of queries.

The discovery computing system 1502 may be configured to transmit a set of probes or patterns to discover relationships between the one or more CIs of the set of CIs. Each discovered relationship between the one or more CIs may be stored as an eleventh CI in a "rel_ci" table.

In some embodiments, the "rel_ci" table may include a plurality of fields such as, but is not limited to, a parent CI, a child CI, and a type of the relationship that links the parent CI and the child CI. The type of relationship may correspond to, but is not limited to, "exposes", "hosted on", "contain", "virtualizes", "member of", "extends", and "registered on". By way of example and not limitation, if a Server1 is being managed by Server2, then the parent CI is Server2, the type of relationship is "Managed by".

The "rel_ci" table that stores the determined relationship between one or more CIs of the set of CIs may be presented in Table 9 below:

TABLE 9

"rel_ci" Table

| Parent CI and related Table | Child CI and related Table | Type of Relationship (as shown in FIG. 5) |
|---|---|---|
| First CI (service_account) | Second CI (logical_datacenter) | Hosted On |
| Second CI (logical_datacenter) | Third CI (cloud_container_cluster) | Hosted On |
| Fourth CI (lb_service) | Third CI (cloud_container_cluster) | Contains |
| Second CI (logical_datacenter) | Fourth CI (lb_service) | Hosted On |
| Sixth CI (cloud_container_service) | Third CI (cloud_container_cluster) | Contains |
| Second CI (logical_data_center) | Sixth CI (cloud_container_service) | Hosted On |
| Seventh CI (cloud_container_pod) | Sixth CI (cloud_container_service) | Contains |
| Eight CI (appl) | Seventh CI (cloud_container_pod) | Exposes |
| Seventh CI (cloud_container_pod) | Tenth CI (container) | Runs |
| Tenth CI (container) | Ninth CI (linux_server) | Contains |
| Fifth CI (vm_instance) | Third CI (cloud_container_cluster) | Contains |
| Ninth CI (linux_server) | Fifth CI (vm_instance) | Hosted On |

After the determination of the relationship between one or more CIs of the set of CIs, the discovery computing system 1502 may be configured to generate the class model 1600. The class model 1600 may include a plurality of classes that may be associated with the set of CIs (i.e. related to the cluster of resources 1404). The class model 1600 may include, but is not limited to, a first class 1602 associated with the first CI, a second class 1604 associated with the second CI, a third class 1606 associated with the third CI, a fourth class 1608 associated with the fourth CI, a fifth class 1610 associated with the fifth CI, a sixth class 1612 associated with the sixth CI, a seventh class 1614 associated with the seventh CI, an eighth class 1616 associated with the eighth CI, a ninth class 1618 associated with the ninth CI, and a tenth class 1620 associated with the tenth CI. Each class associated with a CI may correspond to the table in which the corresponding CI model may be stored. For example, (as shown in Table 9) the first class 1602 may be a "service_account" class, the second class 1604 may be a "logical_datacenter" class, the third class 1606 may be a "cloud_container_cluster" class, the fourth class 1608 may be a "lb_service", the fifth class 1610 may be a "vm_instance" class, the sixth class 1612 may be a "cloud_container_service" class, the seventh class 1614 may be a "cloud_container_pod" class, the eight class 1616 may be a "appl" class, the ninth class 1618 may be a "linux_server" class, and the tenth class 1620 may be a "container" class.

The discovery computing system 1502 may further determine a relation type between the plurality of classes. The relation between two classes may correspond to the relationship type between the associated CIs as provided in Table 9. For example, the relation between the first class 1602 and the second class 1604 may be "Hosted on". The discovery computing system 1502 may be further configured to output the generated class model 1600. As output, the discovery computing system 1502 may be configured to transmit the generated class model 1600 to another device associated with the managed network 1504. In an embodiment, the discovery computing system 1502 may be configured to render the generated class model 1600, via an output device, such as a display device.

Figure 17:
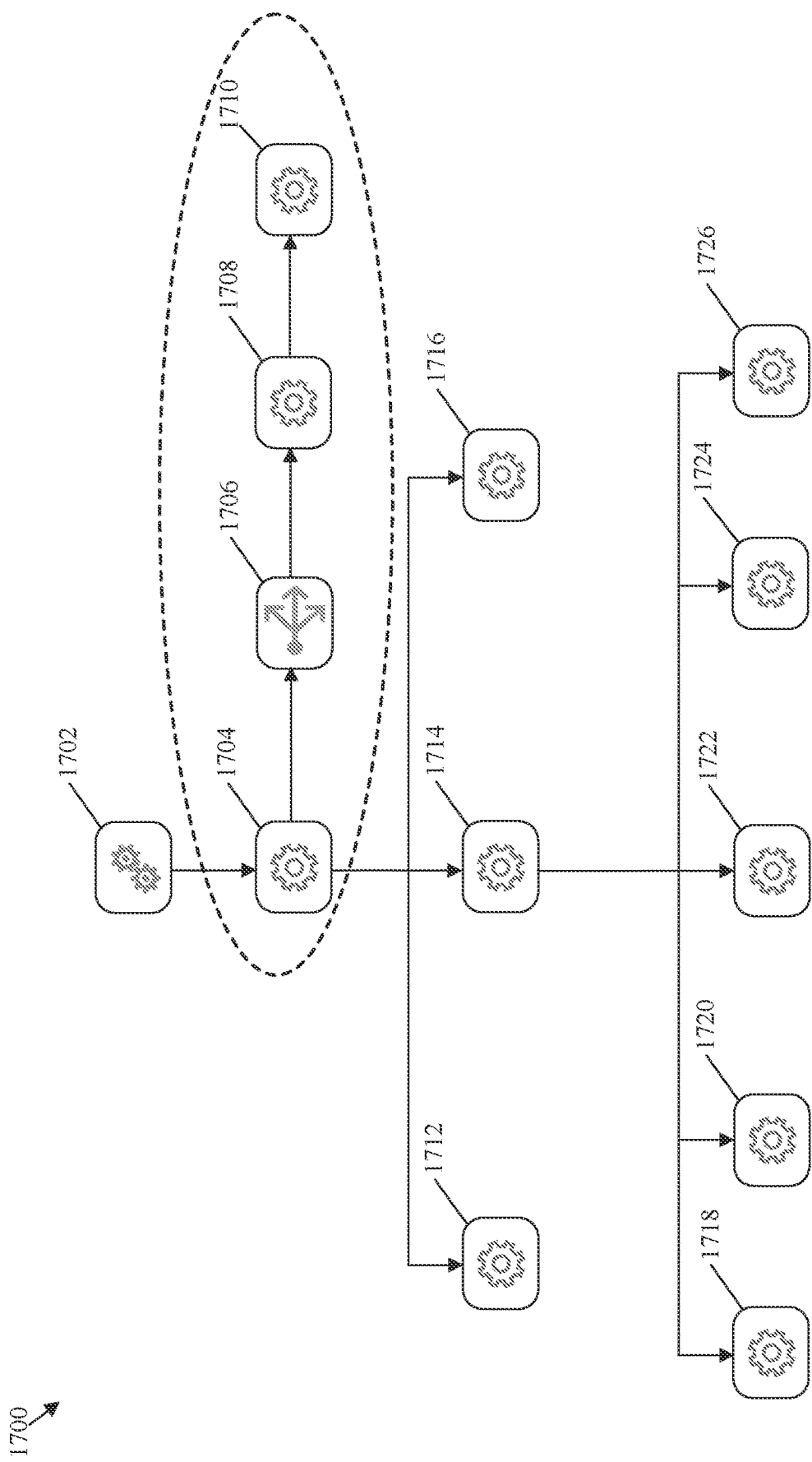
FIG. 17 is a scenario diagram that illustrates an exemplary relationship map of the first resource and the cluster of resources of FIG. 14, in accordance with example embodiments.

FIG. 17 is a scenario diagram that illustrates an exemplary relationship map of the first resource and the cluster of resources of FIG. 14, in accordance with example embodiments. FIG. 17 is explained in conjunction with elements from FIG. 12, FIG. 13, FIG. 14, FIG. 15, and FIG. 16. With reference to FIG. 17, there is shown a dependency map, as a relationship map 1700, including set of map icons. The set of map icons may include, but not limited to, a first map icon 1702, a second map icon 1704, a third map icon 1706, a fourth map icon 1708, a fifth map icon 1710, a sixth map icon 1712, a seventh map icon 1714, an eighth map icon 1716, a ninth map icon 1718, a tenth map icon 1720, an eleventh map icon 1722, a twelfth map icon 1724, and a thirteenth map icon 1726.

The first map icon 1702 may be associated with the discovered first service (e.g., "AZURE® Service Fabric") provided by the remote computing system 1506. The second map icon 1704 may be associated with the cloud container (e.g., snservicefabric). The third map icon 1706 may be associated with the discovered load balancer (e.g., AZURE® Load Balancer). The fourth map icon 1708 may be associated with the virtual machine (e.g., AZURE® VM), and the fifth map icon 1710 may be associated with a node (e.g., the AZURE® Service Fabric Node).

With reference to FIG. 17, the first resource may be the cloud container (e.g., snservicefabric), and the cluster of resources 1404 may include discovered load balancer (e.g., AZURE® Load Balancer), the first virtual machine (e.g., AZURE® VM), and the node (e.g., the AZURE® Service Fabric Node).

The relationship map 1700 may further include the seventh map icon 1714 that maybe associated with a first datacenter. The first datacenter may be associated with the service account associated with the received account identifier. The sixth map icon 1712, and the eighth map icon 1716 may be associated with a range of IP address provided by the remote computing system 1506 to the managed network 1504. Each of the ninth map icon 1718, a tenth map icon 1720, an eleventh map icon 1722, a twelfth map icon 1724, and a thirteenth map icon 1726 may be associated with an availability zone under the first datacenter represented by the seventh map icon 1714.

The discovery computing system 1502 may be further configured to output the generated relationship map 1700. As output, the discovery computing system 1502 may be configured to transmit the generated relationship map 1700 to another device associated with the managed network 1504. In an embodiment, the discovery computing system 1502 may be configured to render the relationship map 1700, via an output device, such as a display device.

In an embodiment, the dependency map (or the relationship map 1700) may be dynamic in nature and may get updated when the operations described above may be executed in future. For example, if a new node is added in the cluster of resources 1404 in future, then the new node may be visible in the dependency map. Similarly, if a node is deleted from the cluster of resources 1404, then the node may not be a part of the dependency map generated in future by the disclosed discovery computing system 1502.

In some embodiments, the discovered load balancer may also be a part of a second cluster of resources. A second application, of the managed network 1504, may be deployed in a second set of nodes of the second cluster of resources. The discovery computing system 1502 may be capable to discover the second set of nodes. To discover the second set of nodes associated with the load balancer, the discovery computing system 1502 may be further configured to transmit a second query to the remote computing system 1506. The second query may be transmitted to discover the second set of nodes associated with the load balancer. Each of the discovered second set of nodes may be populated as the configuration item (CI) in the CMDB of the service platform.

Figure 18:
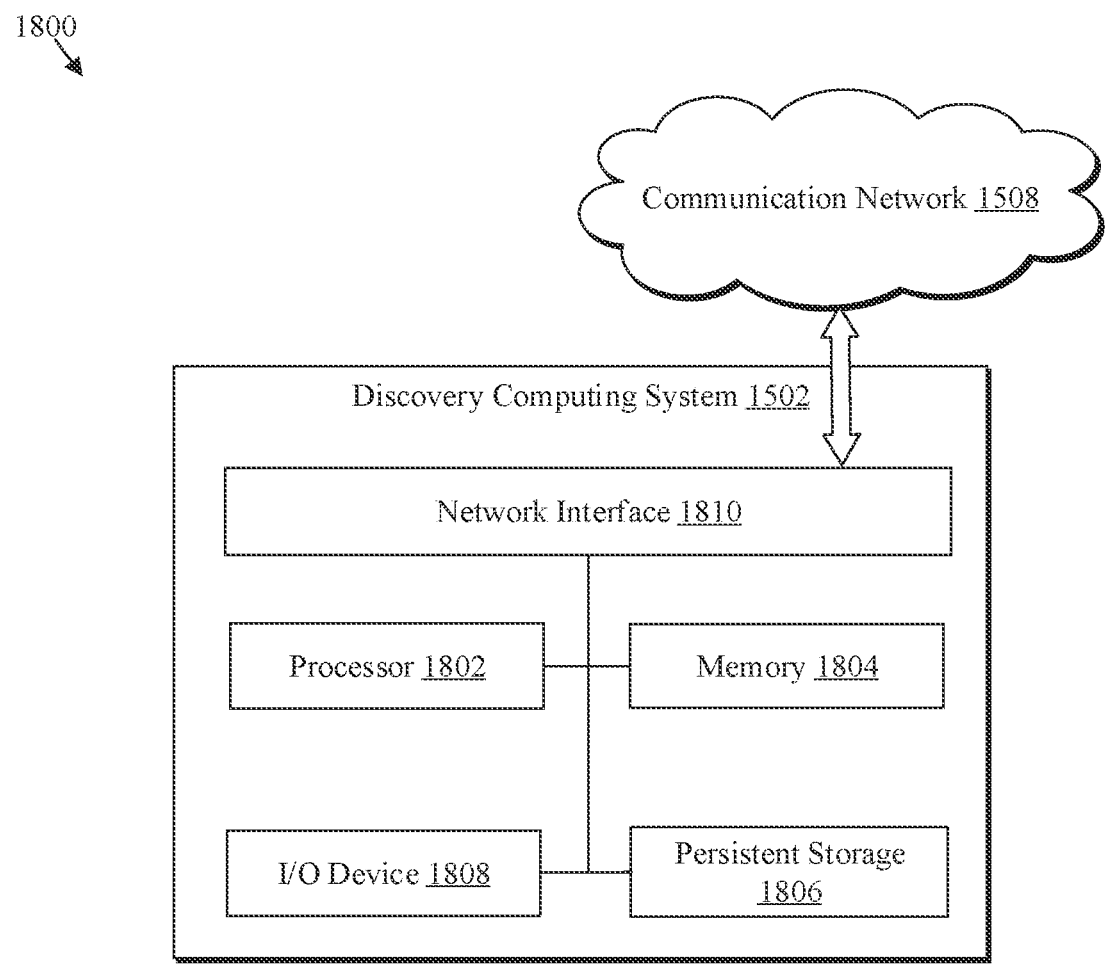
FIG. 18 is a block diagram of a discovery computing system for discovery of microservices architecture based applications, in accordance with example embodiments.

FIG. 18 is a block diagram of a discovery computing system for discovery of microservices architecture based applications, in accordance with example embodiments. FIG. 18 is explained in conjunction with elements from FIG. 12, FIG. 13, FIG. 14, FIG. 15, FIG. 16, and FIG. 17. With reference to FIG. 18, there is shown a block diagram 1800 of the discovery computing system 1502. The discovery computing system 1502 may include a processor 1802, a memory 1804, and a persistent storage 1806. The discovery computing system 1502 may further include an input/output (I/O) device 1808, and a network interface 1810.

The processor 1802 may include suitable logic, circuitry, and/or interfaces that may be configured to execute program instructions associated with different operations to be executed by the discovery computing system 1502. The processor 1802 may include any suitable special-purpose or general-purpose computer, computing entity, or processing device including various computer hardware or software modules and may be configured to execute instructions stored on any applicable computer-readable storage media. For example, the processor 1802 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 18, the processor 1802 may include any number of processors configured to, individually or collectively, perform or direct performance of any number of operations of the discovery computing system 1502, as described in the present disclosure.

In some embodiments, the processor 1802 may be configured to interpret and/or execute program instructions and/or process data stored in the memory 1804 and/or the persistent storage 1806. In some embodiments, the processor 1802 may fetch program instructions from the persistent storage 1806 and load the program instructions in the memory 1804. After the program instructions are loaded into memory 1804, the processor 1802 may execute the program instructions. Some of the examples of the processor 1802 may be a GPU, a CPU, a RISC processor, an ASIC processor, a CISC processor, a co-processor, and/or a combination thereof.

The memory 1804 may include suitable logic, circuitry, and/or interfaces that may be configured to store program instructions executable by the processor 1802. In certain embodiments, the memory 1804 may be configured to store the received account ID. The memory 1804 may be further configured to store the received first information and the received second information. The memory 1804 may include computer-readable storage media for carrying or having computer-executable instructions or data structures stored thereon. Such computer-readable storage media may include any available media that may be accessed by a general-purpose or special-purpose computer, such as the processor 1802.

By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1802 to perform a certain operation or group of operations associated with the discovery computing system 1502.

The persistent storage 1806 may include suitable logic, circuitry, and/or interfaces that may be configured to store program instructions executable by the processor 1802, operating systems, and/or application-specific information, such as logs and application-specific databases. The persistent storage 1806 may be configured to store the client identifier, the tenant identifier, and the key associated with the service account. In some embodiments, the persistent storage 1806 may be configured to store the class model, the first set of tables, and the generated relationship map. The persistent storage 1806 may include computer-readable storage media for carrying or having computer-executable instructions or data structures stored thereon. Such computer-readable storage media may include any available media that may be accessed by a general-purpose or special-purpose computer, such as the processor 1802.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1802 to perform a certain operation or group of operations associated with the discovery computing system 1502.

The I/O device 1808 may include suitable logic, circuitry, interfaces, and/or code that may be configured to receive the first request from the first device of the managed network 1504. The I/O device 1808 may include various input and output devices, which may be configured to communicate with the processor 1802 and other components, such as the network interface 1810. Examples of the input devices may include, but are not limited to, a touch screen, a keyboard, a mouse, a joystick, and/or a microphone. Examples of the output devices may include, but are not limited to, a display (such as a display device) and a speaker.

The network interface 1810 may include suitable logic, circuitry, interfaces, and/or code that may be configured to establish a communication between the discovery computing system 1502, the managed network 1504, and the remote computing system 1506, via the communication network 1508. The network interface 1810 may be implemented by use of various known technologies to support wired or wireless communication of the discovery computing system 1502 via the communication network 1508. The network interface 1810 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 1810 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), or Wi-MAX.

Modifications, additions, or omissions may be made to the discovery computing system 1502 without departing from the scope of the present disclosure. For example, in some embodiments, the discovery computing system 1502 may include any number of other components that may not be explicitly illustrated or described.

Figure 19:
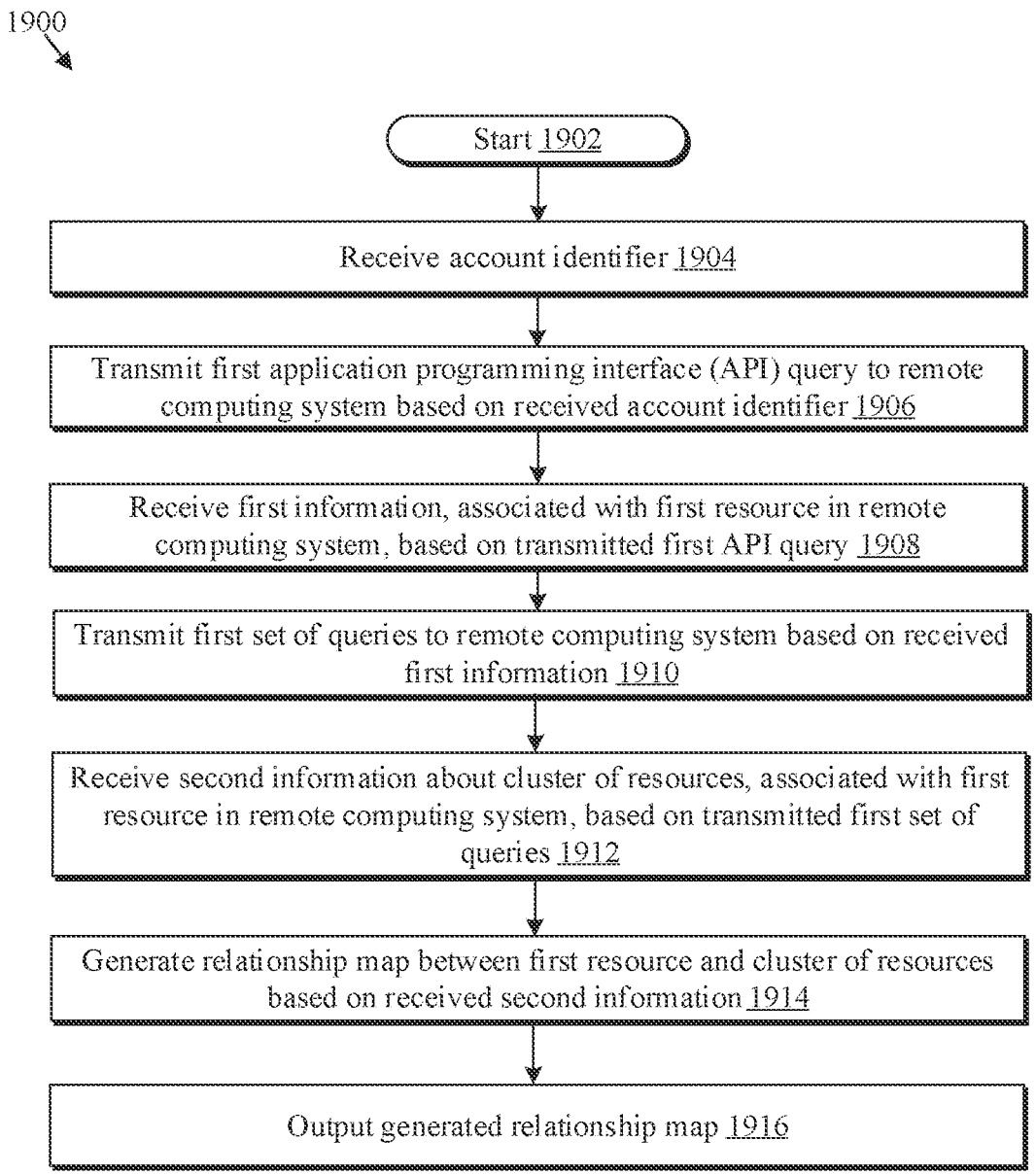
FIG. 19 is a flow chart that illustrates a method for license support and management, in accordance with example embodiments.

FIG. 19 is a flow chart that illustrates a method for license support and management, in accordance with example embodiments. FIG. 19 is explained in conjunction with elements from FIG. 12, FIG. 13, FIG. 14, FIG. 15, FIG. 16, FIG. 17, and FIG. 18. With reference to FIG. 19, there is shown a flowchart 1900. The exemplary method of flowchart 1900 may be executed by any computing system, for example, the discovery computing system 1502 of FIG. 15. The exemplary method of the flowchart 1900 may start at 1902 and proceed to 1904.

At 1904, an account identifier may be received. The account identifier may be associated with a service account in the remote computing system 1506. In one or more embodiments, the processor 1802 may be configured to receive the account identifier ID associated with the service account in the remote computing system 1506. The details about the reception of the account ID are described, for example, in FIG. 15.

At 1906, a first application programming interface (API) query may be transmitted to the remote computing system 1506. The first API query may be transmitted based on the received account ID. In one or more embodiments, the processor 1802 may be configured to transmit the first API query to the remote computing system 1506 based on the received account ID. The details about the transmission of the first API query are described, for example, in FIG. 15.

At 1908, first information may be received. The first information may be associated with the first resource in the remote computing system 1506 and may be received based on the transmitted first API query. In one or more embodiments, the processor 1802 may be configured to receive first information associated with the first resource in the remote computing system 1506 based on the transmitted first API query. The first resource may correspond to the cloud orchestrator 1402 associated with a first service provided by the remote computing system 1506. The details about the first resource are provided, for example, in FIG. 14.

At 1910, a first set of queries may be transmitted to the remote computing system 1506. The first set of queries may be transmitted based on the received first information. In one or more embodiments, the processor 1802 may be configured to transmit a first set of queries to the remote computing system 1506 based on the received first information.

At 1912, second information may be received. The second information may be about the cluster of resources 1404 associated with the first resource in the remote computing system 1506 and may be received based on the transmitted first set of queries. A set of services related to the first service may be deployed in one or more resources of the cluster of resources 1404. In one or more embodiments, the processor 1802 may be configured to receive the second information about the cluster of resources 1404, associated with the first resource in the remote computing system 1506, based on the transmitted first set of queries. The set of services related to the first service may be deployed in one or more resources of the cluster of resources 1404.

At 1914, the relationship map 1700 between the first resource and the cluster of resources 1404 may be generated. The relationship map 1700 may be generated based on the received second information. In one or more embodiments, the processor 1802 may be configured to generate the relationship map 1700 between the first resource and the cluster of resources 1404 based on the received second information, as described, for example, in FIGS. 15 and 17.

At 1916, the generated relationship map 1700 may be outputted. In one or more embodiments, the processor 1802 may be configured to output the generated relationship map 1700, as described, for example, in FIG. 15.

Control may pass to end. Although the flowchart 1900 is illustrated as discrete operations, such as 1902, 1904, 1906, 1908, 1910, 1912, 1914, and 1916. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage medium configured to store instructions that, in response to being executed, cause a system (such as the discovery computing system 1502) to perform operations. The operations may include receiving an account identifier (ID). The account identifier may be associated with a service account in a remote computing system (such as the remote computing system 1506). The operations may further include transmitting a first application programming interface (API) query to the remote computing system based on the received account identifier. The operations may further include receiving first information associated with a first resource in the remote computing system based on the transmitted first API query. The first resource may correspond to a cloud orchestrator associated with a first service provided by the remote computing system. The operations may further include transmitting a first set of queries to the remote computing system based on the received first information. The operations may further include receiving second information about a cluster of resources (such as the cluster of resources 1404), associated with the first resource in the remote computing system, based on the transmitted first set of queries, wherein the set of services may be related to the first service that may be deployed in one or more resources of the cluster of resources. The operations may further include generating a relationship map between the first resource and the cluster of resources based on the received second information and outputting the generated relationship map.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively, or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, Solid State Drive (SSD)s, compact disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures. While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A discovery computing system, comprising a processor configured to:
    receive an account identifier, wherein the account identifier is associated with a service account in a remote computing system;
    transmit a first application programming interface (API) query to the remote computing system based on the account identifier;
    receive, based on the first API query, first information associated with a cloud orchestrator in the remote computing system, wherein the cloud orchestrator is configured to:
        deploy and manage a cluster of resources provided by the remote computing system including a cloud container, a load balancer within the cloud container, and a set of nodes, wherein the set of nodes provides software services,
        synchronize, by way of service fabric components, each node in the set of nodes in the cluster of resources with code uploaded in relation to the software services, and
        rebalance partitions and instances of the software services across the set of nodes in response to addition of new nodes to the set of nodes;
    transmit a set of queries to the remote computing system based on the first information;
    receive, based on the set of queries, second information about the cluster of resources;
    generate a relationship map between the cloud orchestrator and the cluster of resources based on the second information, wherein the relationship map represents hierarchical relationships between the cloud container and the load balancer, and between the load balancer and the set of nodes; and
    output the relationship map.

2. The discovery computing system according to claim 1, wherein the account identifier comprises at least of: a client identifier, a tenant identifier, or a key associated with the service account.

3. The discovery computing system according to claim 1, wherein the software services correspond to microservices deployed in the cluster of resources.

4. The discovery computing system according to claim 1, wherein each node of the set of nodes corresponds to at least one of: a virtual machine, a physical machine, or a further cloud container.

5. The discovery computing system according to claim 1, wherein the second information comprises at least one of: a name of each resource of the cluster of resources, a type of each resource of the cluster of resources, or a geographic region associated with each resource of the cluster of resources.

6. The discovery computing system according to claim 1, wherein generating the relationship map comprises:
   determining relationships between the cloud orchestrator and each of the resources in the cluster of resources; and
   generating the relationship map between the cloud orchestrator and the cluster of resources further based on the relationships.

7. The discovery computing system according to claim 1, wherein the processor is further configured to:
   transmit an initial API query to the remote computing system based on the account identifier;
   receive datacentre information from the remote computing system based on the transmitted initial API query, wherein the datacentre information comprises information about one or more datacentres associated with the service account; and
   transmit the first API query to the remote computing system further based on the datacentre information.

8. The discovery computing system according to claim 1, further comprising a persistent storage, and wherein the processor is further configured to:
   store information about each of the cloud orchestrator and the cluster of resources, as configuration items, in the persistent storage;
   generate a class model associated with each of the configuration items corresponding to the cloud orchestrator and the cluster of resources; and
   store the class model in the persistent storage.

9. The discovery computing system according to claim 1, further comprising a persistent storage, and wherein the processor is further configured to:
   generate a table associated with a configuration item, wherein the configuration item is associated with the cloud orchestrator;
   generate a set of tables each associated with a configuration item of a set of configuration items, wherein the set of configuration items are associated with the cluster of resources; and
   store the table and the set of tables in a configuration management database (CMDB), wherein the CMDB is further stored in the persistent storage.

10. A method comprising:
    receiving an account identifier, wherein the account identifier is associated with a service account in a remote computing system;
    transmitting a first application programming interface (API) query to the remote computing system based on the account identifier;
    receiving, based on the first API query, first information associated with a cloud orchestrator in the remote computing system, wherein the cloud orchestrator is configured to:
       deploy and manage a cluster of resources provided by the remote computing system including a cloud container, a load balancer within the cloud container, and a set of nodes, wherein the set of nodes provides software services,
       synchronize, by way of service fabric components, each node in the set of nodes in the cluster of resources with code uploaded in relation to the software services, and
       rebalance partitions and instances of the software services across the set of nodes in response to addition of new nodes to the set of nodes;
    transmitting a set of queries to the remote computing system based on the first information;
    receiving, based on the set of queries, second information about the cluster of resources;
    generating a relationship map between the cloud orchestrator and the cluster of resources based on the second information, wherein the relationship map represents hierarchical relationships between the cloud container and the load balancer, and between the load balancer and the set of nodes; and
    outputting the relationship map.

11. The method according to claim 10, wherein the account identifier comprises at least of: a client identifier, a tenant identifier, or a key associated with the service account.

12. The method according to claim 10, wherein the software services correspond to microservices deployed in the cluster of resources.

13. The method according to claim 10, wherein each node of the set of nodes corresponds to at least one of: a virtual machine, a physical machine, or a container.

14. The method according to claim 10, wherein the second information comprises at least one of: a name of each resource of the cluster of resources, a type of each resource of the cluster of resources, or a geographic region associated with each resource of the cluster of resources.

15. The method according to claim 10, wherein generating the relationship map comprises:
    determining relationships between the cloud orchestrator and each of the resources in the cluster of resources; and
    generating the relationship map between the cloud orchestrator and the cluster of resources further based on the relationships.

16. The method according to claim 10, further comprising:
    transmitting an initial API query to the remote computing system based on the account identifier;
    receiving datacentre information from the remote computing system based on the transmitted initial API query, wherein the datacentre information comprises information about one or more datacentres associated with the service account; and
    transmitting the first API query to the remote computing system further based on the datacentre information.

17. The method according to claim 10, further comprising:
    generating a table associated with a configuration item, wherein the configuration item is associated with the cloud orchestrator;
    generating a set of tables each associated with a configuration item of a set of configuration items, wherein the set of configuration items are associated with the cluster of resources; and
    storing the table and the set of tables in a configuration management database (CMDB), wherein the CMDB is further stored in persistent storage.

18. A non-transitory computer-readable medium storing instructions that, when executed by a processor, cause a computing device to perform operations comprising:
    receiving an account identifier, wherein the account identifier is associated with a service account in a remote computing system;
    transmitting a first application programming interface (API) query to the remote computing system based on the account identifier;

receiving, based on the first API query, first information associated with a cloud orchestrator in the remote computing system, wherein the cloud orchestrator is configured to:
- deploy and manage a cluster of resources provided by the remote computing system including a cloud container, a load balancer within the cloud container, and a set of nodes, wherein the set of nodes provides software services,
- synchronize, by way of service fabric components, each node in the set of nodes in the cluster of resources with code uploaded in relation to the software services, and
- rebalance partitions and instances of the software services across the set of nodes in response to addition of new nodes to the set of nodes;

transmitting a set of queries to the remote computing system based on the first information;

receiving, based on the set of queries, second information about the cluster of resources;

generating a relationship map between the cloud orchestrator and the cluster of resources based on the second information, wherein the relationship map represents hierarchical relationships between the cloud container and the load balancer, and between the load balancer and the set of nodes; and outputting the relationship map.

19. The non-transitory computer-readable medium of claim 18, wherein the operations further comprise:

transmitting an initial API query to the remote computing system based on the account identifier;

receiving datacentre information from the remote computing system based on the transmitted initial API query, wherein the datacentre information comprises information about one or more datacentres associated with the service account; and transmitting the first API query to the remote computing system further based on the datacentre information.

* * * * *